United States Patent [19]

Watanabe et al.

[11] Patent Number: 5,400,244
[45] Date of Patent: Mar. 21, 1995

[54] RUNNING CONTROL SYSTEM FOR MOBILE ROBOT PROVIDED WITH MULTIPLE SENSOR INFORMATION INTEGRATION SYSTEM

[75] Inventors: Mutsumi Watanabe; Kazunori Onoguchi, both of Kobe, Japan; In S. Kweon, Seoul, Rep. of Korea

[73] Assignee: Kabushiki Kaisha Toshiba, Kawasaki, Japan

[21] Appl. No.: 904,039

[22] Filed: Jun. 25, 1992

[30] Foreign Application Priority Data

| Jun. 25, 1991 | [JP] | Japan | 3-153225 |
| Aug. 30, 1991 | [JP] | Japan | 3-220294 |
| Aug. 30, 1991 | [JP] | Japan | 3-220392 |

[51] Int. Cl.$^6$ ............................................. G06F 15/50
[52] U.S. Cl. ........................... 364/424.02; 364/424.01; 364/449; 364/461; 318/587; 318/580; 180/79.1
[58] Field of Search .............. 364/424.02, 443, 444, 364/449, 461, 424.01; 901/1, 9, 10, 11; 318/587, 580, 570, 574; 180/79.1, 98, 167, 168, 169

[56] References Cited

U.S. PATENT DOCUMENTS

| 4,119,900 | 10/1978 | Kremnitz | 318/587 |
| 4,747,458 | 5/1988 | Andre et al. | 180/79 |
| 5,001,635 | 3/1991 | Yasutomi et al. | 364/424.02 |
| 5,073,749 | 12/1991 | Kanayama | 318/587 |
| 5,083,968 | 1/1992 | Hart | 446/431 |
| 5,109,425 | 4/1992 | Lawton | 382/1 |
| 5,170,352 | 12/1992 | McTamaney et al. | 364/424.02 |

OTHER PUBLICATIONS

Roundtable Discussion on Vision-Based Vehicle Guidance '90, Jul. 2, 1990, Larry S. Davis, et al., "Algorithms for Road Navigation", pp. 2-1 to 2-7.
Proceedings of the IEEE International Conference on Robotics and Automation, 1988 Larry Matthies, et al., "Integration of Sonar and Stereo Range Data Using a Grid-Based Representation", pp. 232-238 Apr. 1988.
IEEE/RSJ International Workshop on Intelligent Robots and Systems '89, Sep. 4-6, 1989, Volker Graefe, "Dynamic Vision Systems for Autonomous Mobile Robots", pp. 12-23.
1987 IEEE, Rodney A. Brooks, "A Hardware Retargetable Distributed Layered Architecture for Mobile Robot Control", pp. 106-109 Apr. 1987.

Primary Examiner—Kevin J. Teska
Assistant Examiner—Jacques Harold Louis-Jacques
Attorney, Agent, or Firm—Oblon, Spivak, McClelland, Maier, & Neustadt

[57] ABSTRACT

A running control system for a mobile robot has the functions necessary for motion clustered into a danger avoidance portion, a safe region advance portion and an interest region follow portion, and these are coupled to a motion actuator control portion which directly controls each movement of the robot, and fused in the motion actuator control portion. Operation commands are configured from a moving distance and a moving direction of the mobile robot. In addition, there is also a coupling in the direction of the safe region advance portion from the danger avoidance portion but internal situations such as the failure and end of processing and like are transmitted using these couplings of portions. Interference between intelligent behavior and reflexive behavior is basically performed via the motion actuator control portion. The control amount for the motion actuator is determined by fusing a plural number of types of operation commands relating to the various types of behavior of the mobile robot, and it is possible to have real-time running of the mobile robot. In addition, when there is a failure in the various types of processing and which can occur in a dynamic environment, the inducing of a operation command of an auxiliary function portion enables the positive escape from a status of failure.

13 Claims, 40 Drawing Sheets

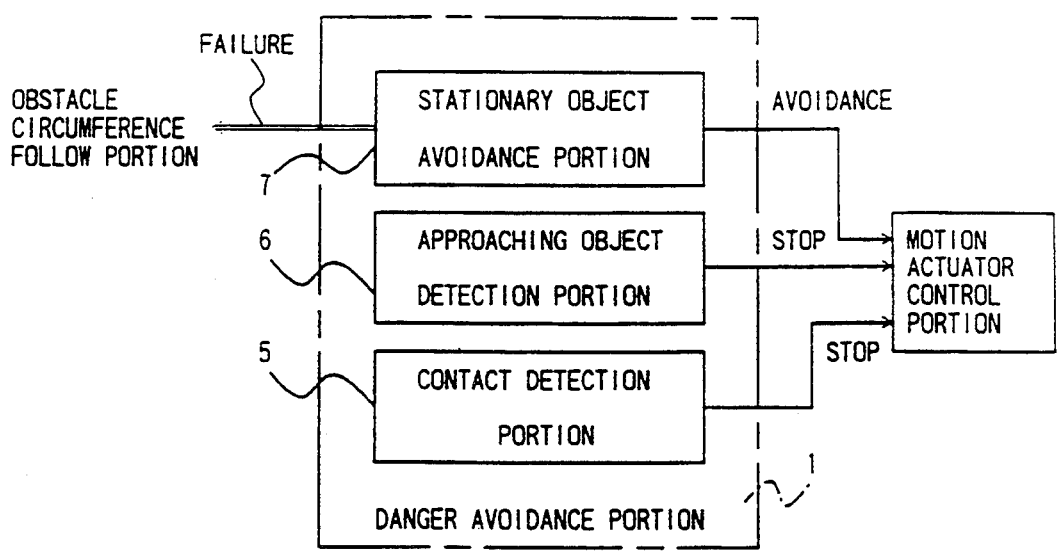
F I G. 4
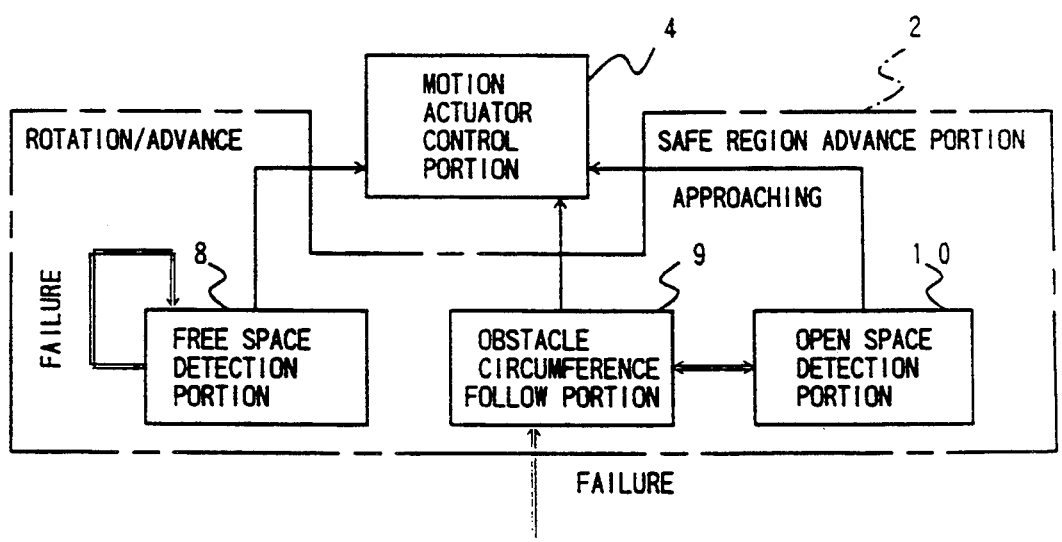
F I G. 5

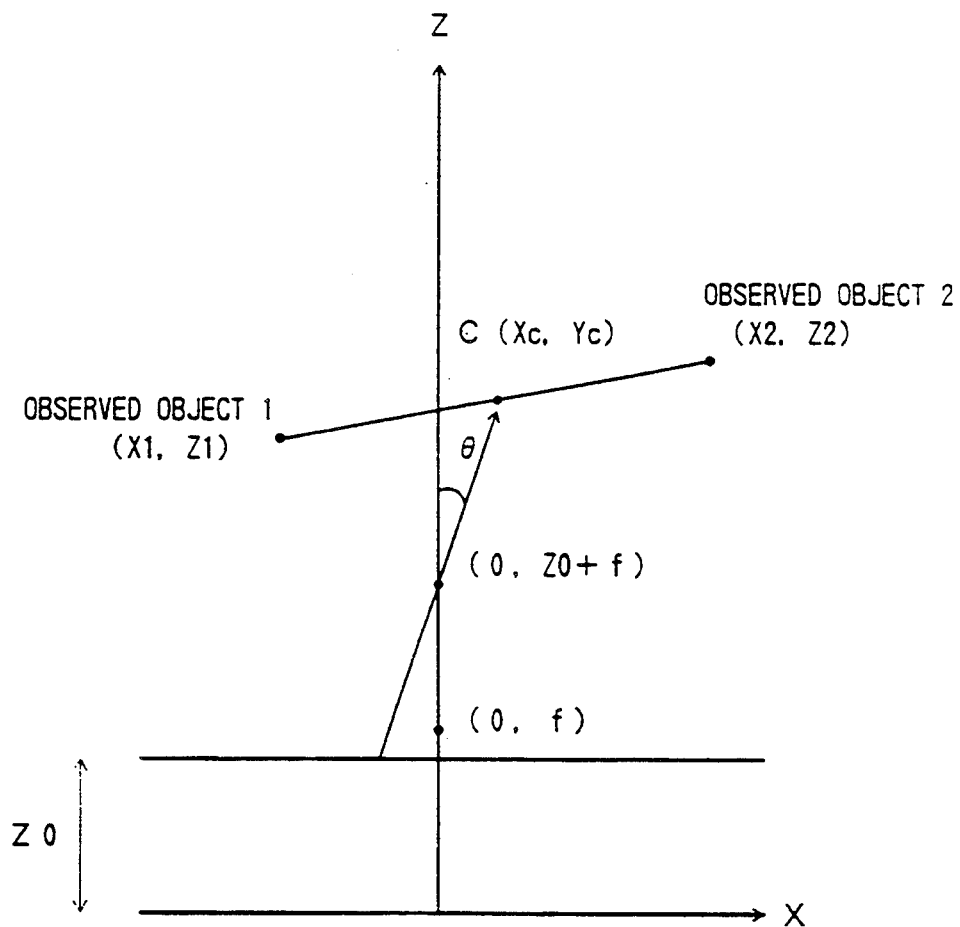
F I G. 21

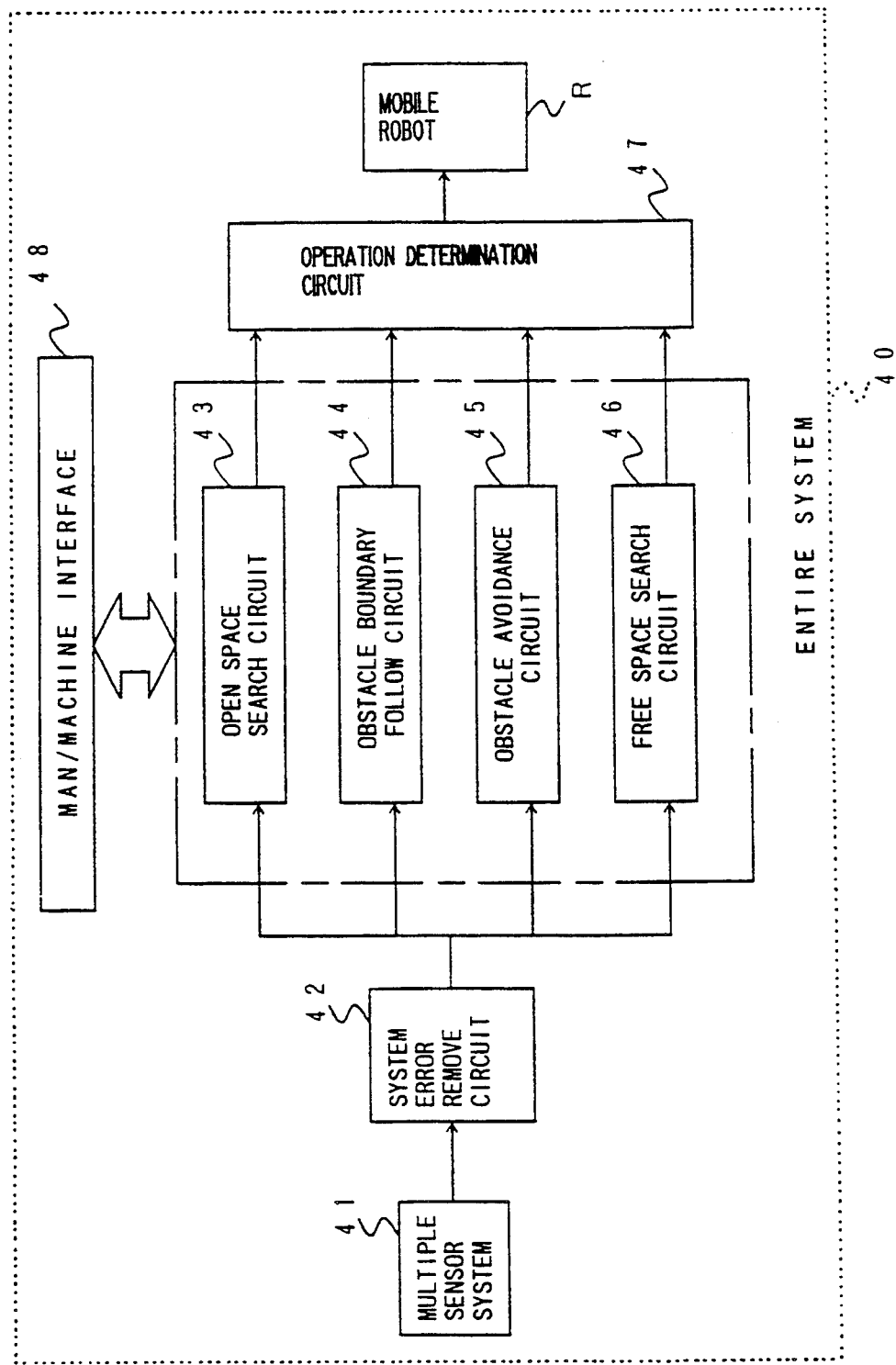
F I G. 22

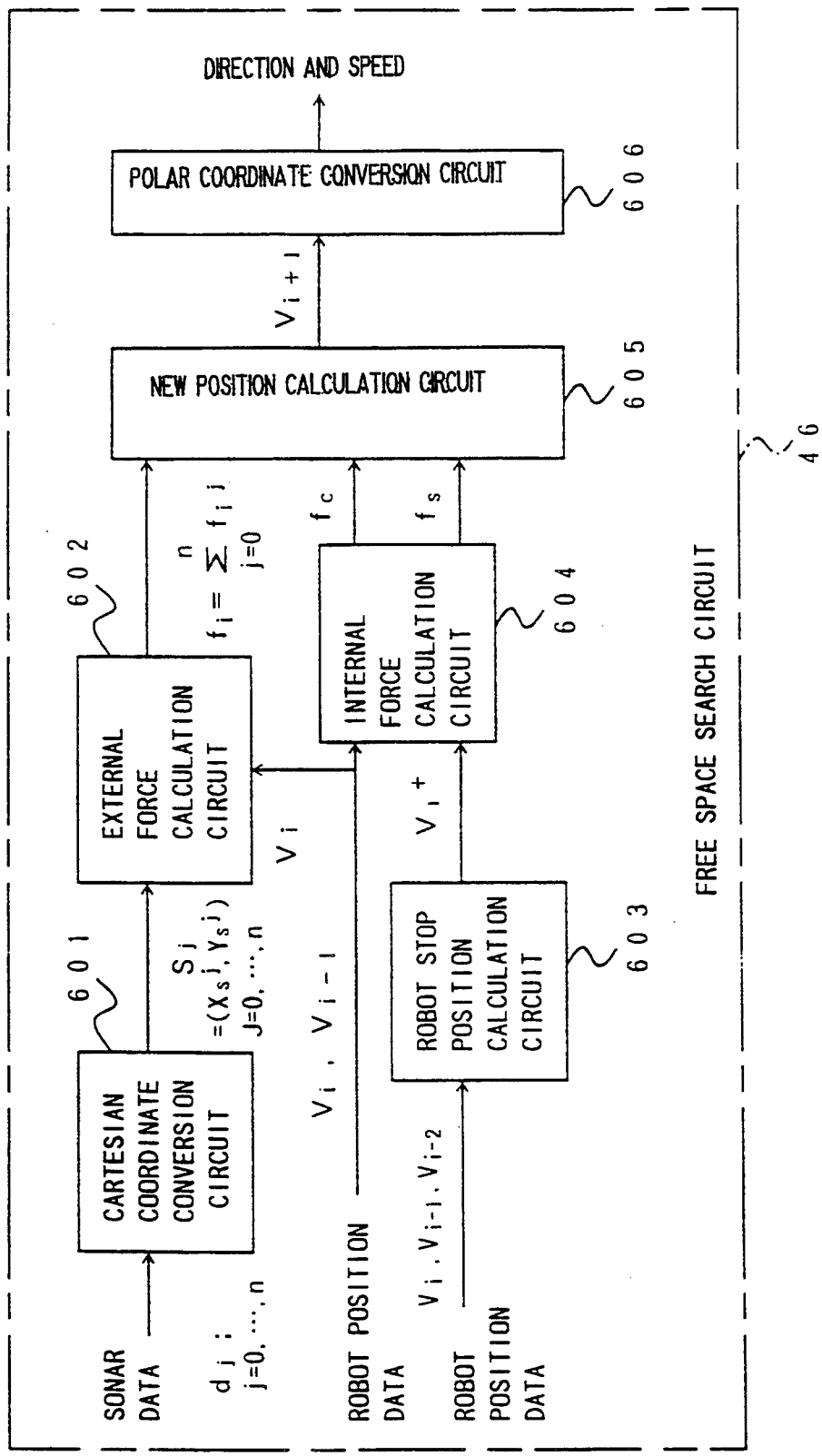
F I G. 27

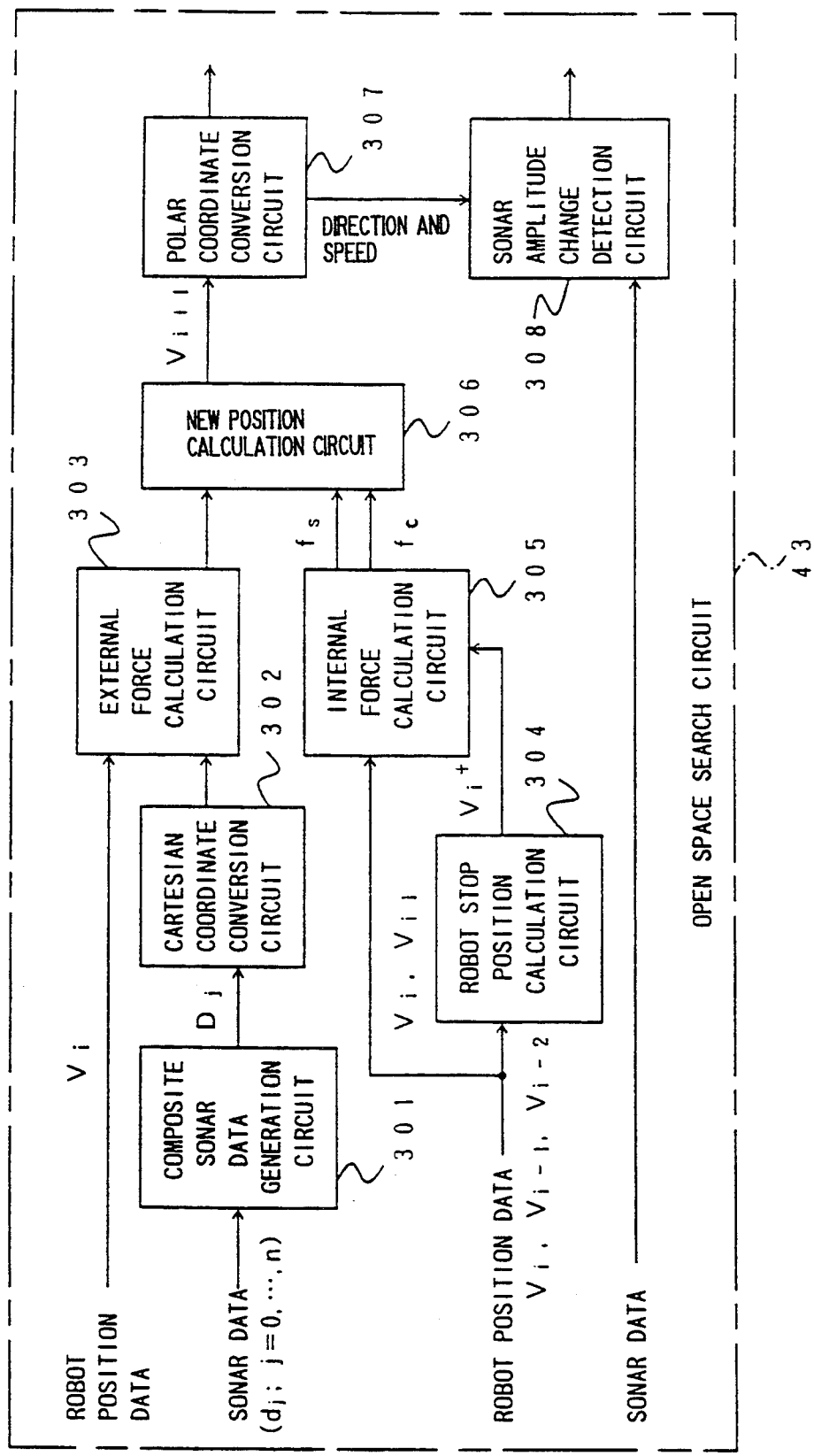
F I G. 30

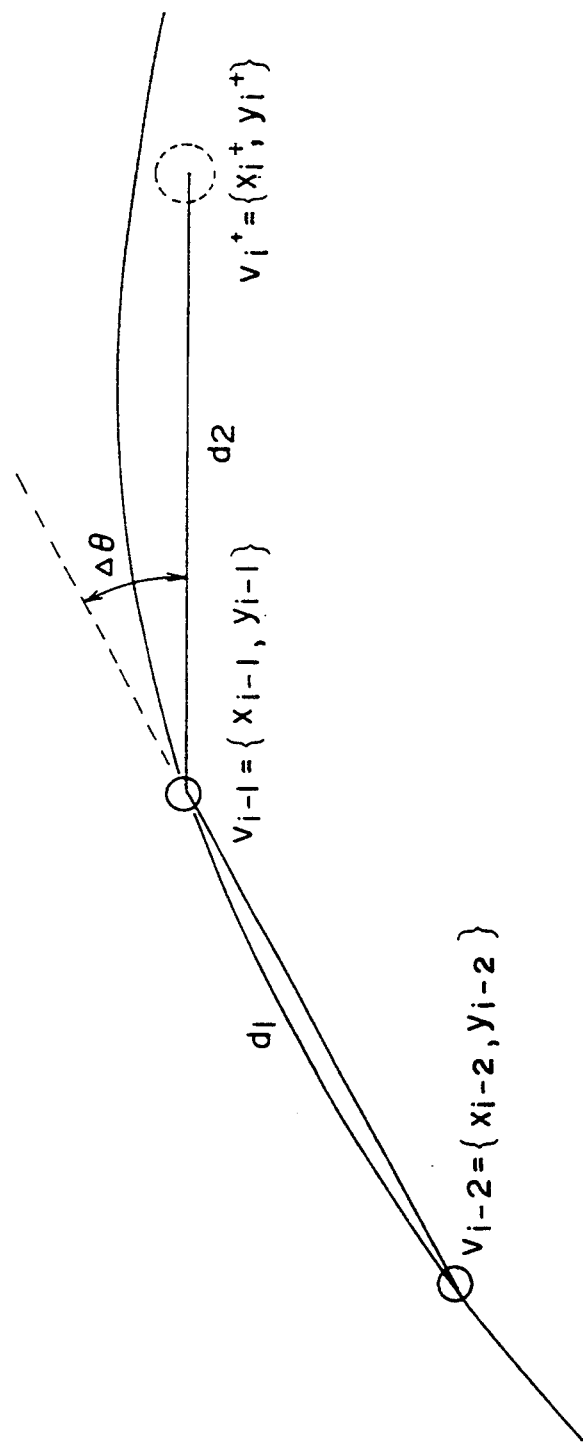
F I G. 33

RUNNING CONTROL SYSTEM FOR MOBILE ROBOT PROVIDED WITH MULTIPLE SENSOR INFORMATION INTEGRATION SYSTEM

BACKGROUND OF THE INVENTION

The present invention relates to a running control system for a mobile robot used in robots which move in an environment which changes, such as department stores and offices and the like, and more particularly, relates to a running control system using a multiple sensor information integration system which effectively fuses information of multiple sensors and removes systematic errors of each non-contact sensor. Moreover, in this specification, the terms "navigation system" and "running control system" are used with the same intended meaning.

Conventionally, a method of moving whereby a path of motion has been set by guidance lines and landmarks, and this is detected by a robot has been practically used for unmanned conveyor vehicles in factories and the like.

Marks and the like are installed on the floor surface or guidance lines are used as the navigation system used in such mobile robots, and steering control is performed by measuring the environment and referring to map data to calculate the present position, generate the running path and guide the mobile robot to an objective position. Alternatively, the ends of a path or corridor can be followed in image, in a steering control system whereby the mobile robot runs along a path or corridor.

However, with these conventional navigation system, it is necessary to have the prior installation within the environment of facilities when guidance lines and marks are used and so in the case where it is necessary to change the moving path, there has been the problem that this requires much trouble and expense to reinstall the marks and guidance lines. In addition, the measurement of environments using stereo vision, rangefinders, ultrasonic wave sensors and the like and the referral to map data to calculate the present position requires time for the measurement of the environment and so there are practical problems as far as application to navigation is concerned, and not only this, it is necessary to measure the environment to a high degree of precision in order to generate an accurate path for the robot. This poses problems for real-time running and places restrictions upon the environment in which the robot can run. Not only this, when there is navigation along a path or corridor end, it is only possible to have application in places where there are path ends or corridor ends and so there is the problem that there are added restrictions upon the running conditions.

Still furthermore, this method is effective in stationary environments in which the paths of motion are fixed, but in a general environment where there are moving objects such as persons and the like as is the case for banks, department stores, offices and the like, it is necessary to change the path of motion in accordance with the temporary positions of persons and so motion control cannot be performed quickly in environments such as these.

There has been much research into control methods which can correspond to such dynamic environments.

The level of this research is such that there is a linear method consisting of measurement→creation of environment notation→motion plan creation, and with this method, robot control is performed by functions for the creation of the map of the motion environment and the creation of the motion plan, there is the detection of positions of landmarks given beforehand, the determination of the present position by referral to the maps, and tracking after the optimum path has been inferred.

However, when this linear type of control method is used, there are many cases where it is easy for changes in the environmental conditions such as the illumination change in addition to changes in the conditions of the dynamic environment, and when there is a failure of the intermediate processing due to a drop in the reliability of measurement, it is not possible to create the plan for the running of the robot and so there is a large loss in the integrity of the most important elements for mobile robots. In addition, the extraction of landmarks, the increase of the referral cost, large increases in the cost of creating the environmental maps and the like cause extremely difficult problems for the creation of the optimum path on the basis of the measurement results, and it is difficult to apply this to real-time running.

On the other hand, in recent years, there has been proposed a subsumption architecture in which behavior levels such as obstacle avoidance, patrol, landmark search and the like are stratified and operated in parallel and when there has been a failure on the higher order level, there is transfer of the operating level to a lower level. Much research has been performed into this method. According to this method, there is prior stratifying into motion behavior units and so from measurement until the determination of movement is performed within the one step, and so there is the advantage of being able to perform safe motion control without the high-performance motion plan creation functions described above.

However, since the steps are fixed and are independent, there is no mechanism for positively solving the problem of failure of a certain motion. When this occurs, it is difficult for the motion of higher-order levels to be guided and it becomes difficult for the mobile robot to fulfill its duties. For example, if the case for when a mobile robot at a certain point is to be moved to an end objective, reflexive behavior such as obstacle avoidance is usually placed on the lower order levels and moving on an intelligent levels such as running to an objective position is ranked in one of the higher order levels. Accordingly, if the mobile robot loses sight of the objective, and the intermediate processing of the higher order level is lost, then there is shift to obstacle avoidance behaviors which is of a lower level. In dynamic environments there is a large possibility that the objective will be lost sight of and in these cases, there is a high possibility that only the lower order (reflexive levels) behavior levels such as obstacle avoidance will be selected and so it is difficult for higher level (intelligent level) behaviors to be guided.

It has not yet been possible to realize a system that can effectively perform intelligent behavior such as tracking and search of objective points using only reflexive action such as obstacle avoidance in dynamic environments as has been described above.

In complex dynamic environments, one important technology for the realization of running control systems such as status monitoring apparatus and autonomous systems and the like, is a technology which fuses multiple sensor information so as to improve the robustness and degree of autonomy.

Conventionally, there have been proposed various types of technologies for unifying multiple sensors and based on this probability theory research. In this probability theory research, a model of random errors is made by probability analysis. Then, a plural number of probability analyses are unified into a single probability analysis by one of many methods such as the Baysian research method, the Dempster-Shafer Theory, fuzzy set theory or simple probability multiplication and addition method. The probability method is fairly well established and is applicable to removing random errors. These random errors can compensate for prior characteristics due to careful correction procedures. Accordingly, if a random error of a sensor is known then those results can be used for the processing of that sensor information.

However, systematic error is determined by the random error as well as by incompleteness of sensor functions.

Many mobile robot systems use acoustic sensors. The reason for this is that they are an inexpensive means of judging the proximity of an object item through measurement of the time for the transmission of an echo.

However, these acoustic sensors have a problem in the interpretation of the signals which are returned by the sensor because of specular reflections and corner reflections and because of this, many researchers have introduced ancillary sensor systems and systems which use only sound have fallen into disuse. These systems are called sensory systems and use probability research methods (such as in L. Matthies and A. Elfes, IEEE Int. Conf. Robotics and Automation, 1988, 727–733.) In recent years, the avoidance of obstacles and navigation using only sound is using both specular reflections and corner reflections. However, such systems have an extremely limited navigational performance for wall tracking and obstacle avoidance. Furthermore, such systems are not applicable to unspecified dynamic environments.

There are various types of mobile robot systems which use active laser scanners. An active laser scanner transmits laser signals generated by a laser diode which is driven in a near infrared band and so measure the distance from the transmission time of infrared light reflected from an object. This type of active laser scanner also has its own characteristic problems. More specifically, the strength of the laser beam which is reflected is dependent upon the color, material and the surface status of the surface of the object of scanning. For example, with an artificial laser scanner, it is not possible to provide an effective bandwidth with respect to objects which are black. Many researchers have had limited success with the use of various discovery algorithms and attempts are being made to remove systematic errors but this still involves much difficulty.

Measures with respect to systematic errors of conventional non-contact sensor information are still largely lacking.

SUMMARY OF THE INVENTION

In the light of this situation, a general object of the present invention is to provide a mobile robot control system which can realize motion control and which can effectively perform intelligent behaviors such as search and tracking of an object using only reflexive behavior such as obstacle avoidance even in the case of dynamic environments.

Another object of the present invention is to provide a navigation system which is both economical and effective in the real time execution of mobile robot guidance which is not limited by the running environment.

Still another object of the present invention is to provide a multiple sensor information integration system which can integrate multiple sensor information for an autonomous system such as a mobile robot and which removes the influence of systematic error.

A running control system for a mobile robot of the present invention is characterized in being provided with operation command means which executes information processing required for the various types of movement of mobile robot, and which in accordance with the results, outputs a plural number of types of behavior command respectively relating to specific operation, and motion actuator control means which receives the plural number of types of operation commands in parallel and performs fusion processing to determine a control amount with respect to a motion actuator of the mobile robot.

A navigation system according to a first aspect of the present invention is configured so as to be provided with camera means which takes an image in a direction of scanning of a mobile robot, observed object tracking means which tracks an object to be observed from the image taken by the camera means, running control amount calculation means which calculates a running control amount so that a direction of motion of the mobile robot becomes a required direction with respect to the observed object from movement of the observed object in the image, and running control means which controls running of the mobile robot by the running control amount calculated by the running control amount calculation means.

A mobile robot control system according to a second aspect of the present invention is configured so that a motion actuator control means is characterized in being provided with control amount determination means which determines a motion actuator control amount by a weighted sum of operation commands of a plural number of types, and operation analysis means which adjusts a weighting of the control amount determination means in accordance with the results of an analysis of the behavior history of a motion actuator.

A mobile robot control system according to a third aspect of the present invention is configured so as to be provided in the operation command means with failure notification means which detects failure of results where information relating to specific movement of a mobile robot is disabled and performs failure notification, auxiliary function means which in response to the failure notification, induces operation commands for moving a mobile robot to a status obtained from results which enable the specific behavior of the mobile robot.

A mobile robot control system according to a fourth aspect of the present invention is configured so that the operation command means is grouped into a danger avoidance portion which has the function of detecting the presence of dangerous objects on the basis of the output of sensors provided to a mobile robot and of removing the mobile robot from danger due to the dangerous object, a safe region advance portion which uses the sensor output to determine the region which is safest for the mobile robot and to move the mobile robot in the direction of that safe region, and a region of interest tracking portion which moves the mobile robot to a region of interest on the basis of the sensor output.

A mobile robot control system according to a fifth aspect of the present invention is configured so that the danger avoidance portion has means for stopping the mobile robot when the dangerous object is detected, and means for inducing a behavior command from a safe region advance portion when a time for which the mobile robot is stopped exceeds a certain time.

A mobile robot control system according to a sixth aspect of the present invention is characterized in being configured so that the safe region advance portion is provided with an obstacle circumference follow portion which outputs operation commands for moving the mobile robot around the periphery of an obstacle, and a free space detection portion which outputs operation command to move the mobile robot in a direction in which there is free space, and so that the obstacle circumference follow portion and free space detection portion operate alternately as failure notification means and auxiliary function means.

Furthermore, seventh through twelfth aspects of the present invention for a running control system and which relate to improvements of a multiple sensor information integration system are as described below.

A multiple sensor information integration system according to a seventh aspect of the present invention is provided with control data acquisition means which acquires sensor information from a multiple sensor set which combines a plural number of types of non-contact sensors, as control data candidates, and system error remove means which corrects the sensor information of a plural number of types and outputs optimum sensor information which has no systematic error, as control data.

A multiple sensor information integration system according to an eighth aspect of the present invention is provided with control data acquisition means which acquires sensor information from a multiple sensor set which combines a plural number of types of non-contact sensors, as control data candidates, and system error remove means which changes a direction of at least one of a plural number of types of sensors and outputs sensor information from which systematic error has been removed, as control data.

A multiple sensor information integration system according to a ninth aspect of the present invention is provided with control data acquisition means which acquires sensor information from a multiple sensor set which combines a plural number of types of non-contact sensors and which includes at least one non-contact sensor and at least one contact sensor, as control data candidates, and systematic error recognition means which corrects sensor information from at least one non-contact sensor as control data when all system error has been recognized.

A multiple sensor information integration system according to a tenth aspect of the present invention wherein a multiple sensor set includes an infrared sensor and an ultrasonic sensor as the non-contact sensors.

A system according to an eleventh aspect of the present invention is an guidance system for a mobile robot and which is an application of the described sensor information integration system, wherein the guidance system is provided with distance data acquisition means configured so that control data acquisition means acquires distance data, snake-based action determination means which predicts a position of a motion actuator from minimizing an internal energy of the motion actuator on the basis of an external force from distance data and the track smoothness reference, free space search means which extracts a safest region by the action determination means, obstacle avoidance means which guides the motion actuator by the action determining means so that there is no collision with an obstacle, obstacle boundary follow means which uses a force in a direction of contact and calculated from distance data reflected from an obstacle close to the motion actuator, and tracks a boundary of an stationary obstacle, and free space discovery means which calculates a change in the volume surrounded by a virtual wall and the distance data to extract a free space.

An guidance system according to a twelfth aspect of the present invention has a multiple sensor system mounted to the motion actuator.

The running control system of the mobile robot according to the present invention and provided with the various configurations and aspects described above has the following functions.

According to the present invention, the fusion of a plural number of types of operation commands relating to various types of behavior of a mobile robot enables the determination of a control amount for a control actuator and so it is possible to realize control of the motion actuator without always operating the means which creates a complex behavior plan, and for real-time running of the mobile robot to be enabled.

In addition, when the fusion logic is the weighted sum of a plural number of types of operation commands, it is possible to adjust the weighted sum to activate the arbitrary operation command means.

Then, in the present invention, when there is a failure in the various types of processing due to the dynamic environment, an operation command is induced in the auxiliary function means and so it is possible to have positive escape from failure statuses.

For example, when there is a failure in the function means for the intelligent behavior level, this is analyzed and setting the means for the activation of the function means for escape from the failure status enables the escape from the status wherein only behavior of a reflexive behavior level is performed. Not only this, unlike a conventional linear control method, this means is coupled with means for performing normal operation control and is not subservient to it and so there is no possibility that a failure of this could lead to a failure of the control of the motion actuator. In addition, in cases where the function means which performs danger avoidance is activated and the robot is stopped for more than a certain period of time, a behavior command to move the mobile robot to a safe region is induced so that it is possible to escape from a deadlock situation, and for long-term optimized behavior to be realized.

In all, the integrity of the most important elements is ensured, and it is possible to realize mobile robot control with is both flexible and suited to the purpose.

Furthermore, according to the first aspect of the present invention, the tracking of an observed object in an image enables steering control of a mobile robot so that the observed object can be approached or so that there can be passage between two observed objects. Because of this, it is possible to guide a mobile robot at high speed to an observed object when the observed object is selected as an objective object and, in addition, for there to be high-speed guidance of a mobile robot in the direction of the center of the cross point when an angle of both edges of the cross point is selected as the observed object. Furthermore, when a characteristic point on a wall surface or an obstacle is selected as the observed object, it is possible for there to be running to avoid the obstacle. By this, the observed object can be switched in accordance with the situation and high-speed mobile robot navigation can be realized even under complex environments and without the environment being manipulated.

The multiple sensor information integration system according to the second aspect of the present invention corrects each of the sensor information from the plural number of types of sensors and outputs the optimum sensor information which has no systematic error as the control data, and makes the systematic errors of a plural number of pairs of sensors complement each other.

The multiple sensor information integration system according to the third aspect of the present invention changes the direction of a sensor and outputs sensor information from which that sensor error has been removed, as control data, and the function movement of the sensor itself removes the systematic error.

The multiple sensor information integration system according to the fourth aspect of the present invention corrects the sensor information from the non-contact sensor, and when systematic error is recognized in all, the sensor information from the contact sensor is output as control data and errors of non-contact sensors are backed-up by contact sensors which have safe and effective operation.

The multiple sensor information integration system according to the fifth aspect of the present invention has the multiple sensor set include an infrared sensor and an ultrasonic wave sensor as the non-contact sensors, with both having a complementary relationship. This is to say that the ultrasonic wave sensor has problem with specular reflections and the infrared sensor has problems due to the influence of the color of the object but each does not have the problem of the other.

Therefore, the sensor information which has the smaller amount of systematic error is selected. A contact sensor is used when both of these non-contact sensors has systematic error.

The motion unit guidance system according to the sixth aspect of the present invention has a plural number of behaviors based on the movement determination means which determines snake-based behavior by control data from the sensor information integration system, and free space search, obstacle avoidance, obstacle boundary follow and free space discovery are provided in parallel.

The guidance system according to the seventh aspect of the present invention configures a mobile robot which has the multiple sensor system mounted to a motion actuator.

The following is a detailed description of each.

The feature of the present invention is that there is developed means for integrating the many types of sensor information to compensate for systematic errors.

Such a system includes various types of means to eliminate systematic errors. More specifically, these means are the system error remove means which uses self-turning operation, separate system error remove means used in the individual sensors, and separate systematic error compensation means used in the sensors.

The following are the specific means are included in the mobile robot.

(1) Each of the sensor means are rotatable (that is, they perform self-turning operation) so as to eliminate the problem of specular reflections for the ultrasonic sensors.

(2) Other means for the elimination of the problem of specular reflection involve rotating the robot and using self-turning operation to search for changes in the values read for the ultrasonic waves.

(3) When there is a specular reflection from an ultrasonic sensor, it is possible to use a corresponding IR (Infrared Radiation) sensor for the removal of systematic error.

(4) On the other hand, when there is no response from an IR sensor because of as black body, the corresponding acoustic data at that time is used for the removal of systematic error of the IR sensor.

(5) In the worst possible case when there us systematic error in the sensor information from both the ultrasonic sensor and the IR sensor, the system calls the systematic error detection means which uses a contact sensor.

The following is a description of the application to a mobile robot. The mobile robot system relating to the present invention and which is provided with multiple sensors uses the system error remove means to guide the mobile robot in a known dynamic environment. In order for the system to have robustness and flexibility, this system is provided with layered behavior. More specifically, there is obstacle avoidance, free space search, obstacle boundary follow and empty space search. Each of the operations is affiliated with a level which is either low, medium or high in accordance with its importance and the reflexivity of the robot.

In the low level, the system performs obstacle avoidance movement. This movement can protect the robot from impact with stationary or dynamic obstacles. In the middle level, there is the discovery of the safest region, and there free space search operation to guide the robot to that region. In addition, in this middle level, it is possible to have the use of obstacle boundary follow and empty space search behavior. The obstacle boundary follow operation uses the systematic error detection means to detect specular reflections from a surface of an obstacle, to drives the robot while holding the specular reflection along the boundary of the obstacle. The empty space search behavior detects an empty space such as an open door of a room and guides the robot so that it passes through that empty space.

According to the invention described above, the fusion of a plural number of types of operation commands relating to the various types of behavior of the mobile robot determines the control amount of the motion actuator and enables the realization of motion actuator control, and enables the real-time running of the mobile robot.

In addition, when the fusion processing uses the weighted sum of a plural number of operation commands, it is possible to adjust the weighting so that there is the activation of the arbitrary operation command means.

Then, with the present invention, when there is a failure in the various types of processing obtained in a dynamic environment, an operation command of auxiliary function means is induced so that it is possible to have positive escape from failure situations.

For example, when there is a failure in the function means of the intelligent behavior level, the provision of means for the analysis of this and the activation of function means to escape from the situation of failure enables there to be escape from a situation where there is a repetition of only behavior of a reflexive behavior level. Not only this, unlike a conventional linear type of control level, this means is coupled with means for always performing operation control but is not controlled by this means and so there is no loss of control of the motion actuator due to failure. In addition, when the function means for danger avoidance has discovered a danger and the robot is stopped for more than a predetermined period of time, it is possible to induce a operation command for advance to a safe region and for there to be escape from a deadlock status so as to realize long-term optimized behavior.

The navigation system of the present invention is not restricted to running environments, and the tracking of an observed object in an image enables mobile robot guidance while coming close to observed objects and passing between them. There are also the advantages of realizing this in real-time and economically.

BRIEF DESCRIPTION OF THE DRAWINGS

FIG. 4 is a block diagram showing details of a danger avoidance portion in the system of the first embodiment;

FIG. 5 is a block diagram showing details of a safe region advance portion in the system of the first embodiment;

FIG. 21 is a view describing the method of steering control angle calculation for two cases of the observed point in the system shown in FIG. 14;

FIG. 22 is a block diagram showing the entire system of a mobile robot running control system according to a fourth embodiment of the present invention;

FIG. 27 is a conceptual view for describing the basic principle of each of the free space search circuits in a running control system of a fourth embodiment;

FIG. 30 is a block diagram showing the empty space search circuit in a running control system of a fourth embodiment;

FIG. 33 is a geometrical line diagram describing the operation of a smooth motion stop position calculation circuit of a mobile robot;

DETAILED DESCRIPTION OF THE PREFERRED EMBODIMENTS

The following is a detailed description of a first and a second embodiment of the present invention, with reference to the appended drawings.

Figure 1:
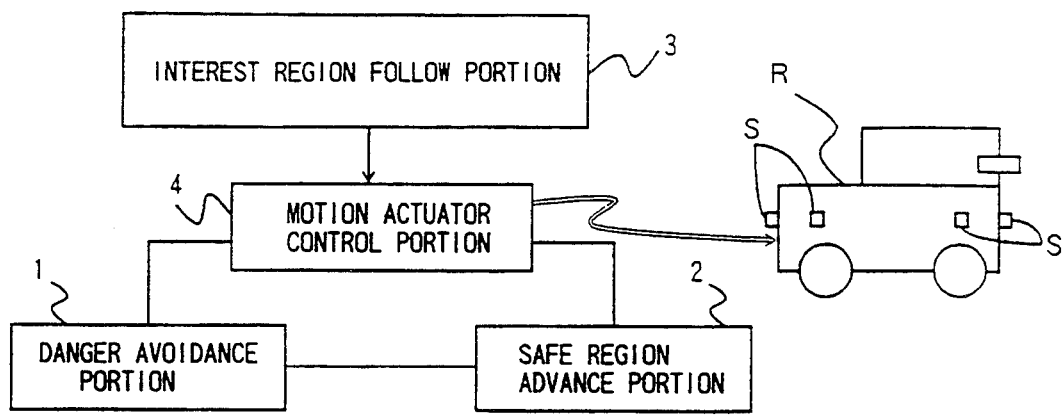
FIG. 1 is a block diagram showing the overall configuration of a running control system of a mobile robot according to a first embodiment of the present invention.

FIG. 1 is a block diagram showing the overall configuration of the present invention.

In this figure, the control system according to a first embodiment has the functions necessary for movement clustered into a danger avoidance portion 1, a safe region advance portion 2 and an interest region follow portion 3, and each of these movements of the robot is coupled to a motion actuator control portion 4. A mobile robot R is provided with a plural number of sensors S such as ultrasonic sensors, infrared sensors and touch sensors and is also provided with one television camera. The danger avoidance portion 1 detects the presence of dangerous objects on the basis of the sensor output of a sensor provided to the mobile robot R, and this has the role of making the mobile robot R avoid danger due to dangerous objects. The safe region advance portion 2 determines the safest region for the mobile robot R on the basis of the sensor output, and advances the robot in the direction of that safe region. The motion actuator control portion 4 is coupled in the same manner and this coupling transfers the operation commands output by each of the function means, to the motion actuator control portion 4, and these are fused inside the motion actuator control portion 4. The operation commands are configured from a movement direction and a movement distance of the mobile robot R. In addition, there is also a coupling from the danger avoidance portion 1 to the safe region advance portion 2 and these couplings of pairs of means transmit internal statuses such as failure or end of processing and the like. In this cluster described above, the danger avoidance portion 1 corresponds to reflexive behavior, and the safe region advance portion 2 and the interest region follow portion 3 correspond to intelligent behavior (with the safe region advance portion 2 being quasi-intelligent behavior). Interference between the intelligent behavior and the reflexive behavior is basically performed via the motion actuator control portion 4.

Figure 2:
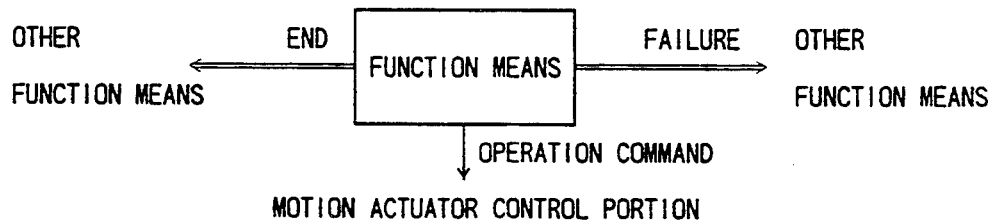
FIG. 2 is a block diagram showing one basic configuration of a unit function portion which configures each cluster in the system of the first embodiment.

FIG. 2 shows one example of a basic configuration of each of the function means which will be described later and which configure each of the operation command portions 1, 2 and 3. Each function means communicates internal situation such as failure or end of processing and the like, to the other function means or to the failure analysis means. In addition, each of the function means continues to communicate the operation commands to the motion actuator control portion 4 while the processing is being successful.

Figure 3:
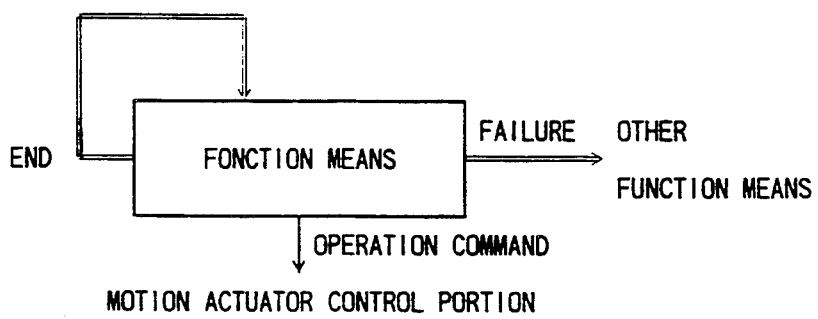
FIG. 3 is a block diagram showing one basic configuration of a unit function portion which configures each cluster in the system of the first embodiment.

FIG. 3 shows another example of the basic configuration of the function means. As shown in FIG. 2, the internal status is not only communicated to the other function means but as shown in FIG. 3, can have various types of modifications made to the operation commands through feedback. For example, in the function means which performs tracking of the objective point, an operation command to move in that direction is output while there is advance to the objective but the command is changed to the stop command when the objective point has been reached and the processing ends.

The following is a detailed description of each of the portions of FIG. 1.

FIG. 4 shows one example of the configuration of the danger avoidance portion 1. The danger avoidance portion 1 is configured from the three function means of a contact detection portion 5, an approaching object detection portion 6 and a stationary object avoidance portion 7.

The contact detection portion 5 is realized through the use of a touch sensor for example and so detects whether or not the mobile robot R has touched another object, and when it is judged that there has been contact, a stop command is transmitted to the motion actuator control portion 4. The approaching object detection portion 6 is realized through the use of an infrared sensor for example and so when an object has entered into the proximity of the robot the stop command (that is, an operation command for a movement distance of "0") is transmitted to the motion actuator control portion 4. The contact detection portion 5 and the approaching object detection portion 6 are stable function means of the lowest level of all of the reflexive levels (and with the approaching object detection portion 6 being of a slightly higher level than the contact detection portion 5) and so the stop command is given the highest priority in the motion actuator control portion 4. Detection of failure of processing is not performed internal to the contact detection portion 5 and the approaching object detection portion 6.

The stationary object avoidance portion 7 does not command a stop command as an operation command, but transmits avoidance operation commands to the motion actuator control portion 4. After the distance information until an object on the periphery of the mobile robot R has been obtained using an ultrasonic sensor for example, there is a comparison of the values of each direction and threshold values for which avoidance is possible and the direction information for the obstacle can then be determined. Internal to the stationary object avoidance portion 7 there is the analysis of the distance information by the ultrasonic sensor and failure detection processing is performed from this. For example, if there is a sudden loss of reflected ultrasonic waves (i.e. a measurement failure) when avoidance behavior is being performed, or if there is no space region (i.e. failure of avoidance behavior) greater than the avoidance possible threshold value in the periphery of the mobile robot R, then these situations are judged as failures. When a failure has been detected, the activation of an obstacle circumference follow portion 9 in FIG. 5 as the function means for performing obstacle circumference follow (to be described later), enables the positive escape of the mobile robot R from a danger status of imminent collision.

In the danger avoidance portion 1, these plural number of function means 5 through 7 always perform danger avoidance processing in parallel, and their commands are applied in parallel to the actuator control portion 4. This enables the stable realization of danger avoidance which is the most important element for the mobile robot R.

Here, in the status where a certain amount of time has elapsed after the contact detection portion 5 has operated, the object has been contacted and the mobile robot R is stationary (that is, when there is the status of contact with a stationary object), the motion actuator control portion 4 realizes an operation command of the free space detection portion 8 which will be described later so that there is escape from a deadlock status. Details of this will be described in the section describing an embodiment of the motion actuator control portion 4.

FIG. 5 shows an example of the configuration of the safe region advance portion 2. This groups lies within quasi-intelligent behavior, that is, between intelligent behavior and reflexive behavior.

Figure 10:
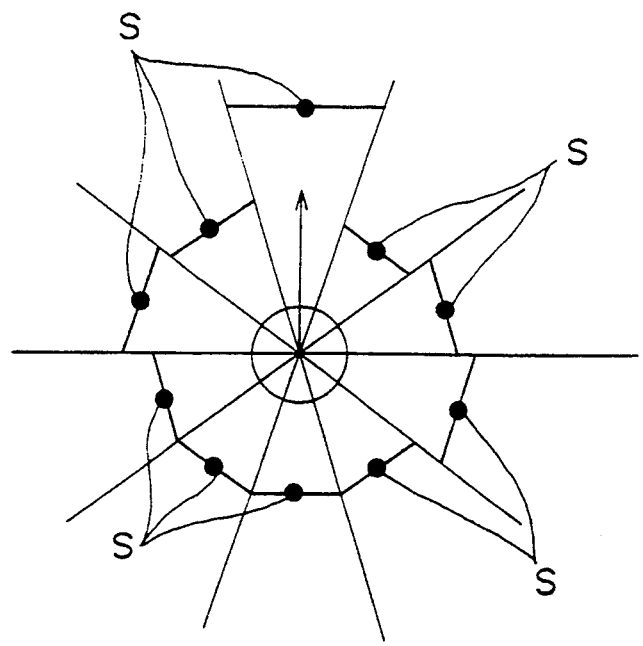
FIG. 10 is a view describing the function of a free space detection portion in a system according to the first embodiment and the second embodiment of the present invention.

First, a free space detection portion 8 acquires information for the distance to the object in the periphery of the robot and outputs an operation command for advance in the direction which is greatest (in which there is the largest amount of free space). This is achieved by comparing the outputs of a plural number of ultrasonic sensors for example, positioned on the periphery of the robot, and detecting the largest free space from the largest distance information. As shown in FIG. 10, each of the sensors S are arranged equidistant around the periphery of the mobile robot R and the measured distances (shown by [●—●] in the figure) are taken as representative values of each of the fields of view, and as shown by the arrow in the figure, the direction for which the largest distance was measured from the position of the mobile robot R is made the largest free space region.

Internally, the free space detection portion 8 performs measurement processing failure detection processing and auxiliary processing. For example, when it is not possible to secure a free angle range within which the mobile robot R can pass, there is the possibility that it is not possible to obtain a stable free space because for example, of there being an object between the places where the sensors S are arranged and so the mobile robot R switches for the output of a behavior command to rotate so that more dense sensor data can be obtained at the same place. This is one of the examples shown in FIG. 3.

The obstacle circumference follow portion 9 outputs an operation command to move to observe the periphery when an obstacle is approached. On the contrary, an open space detection portion 10 detects the direction in which the free space widens such as in the case of an opening at the end of a path, and outputs an operation command for movement in that direction. The obstacle circumference follow portion 9 and the open space detection portion 10 are realized in the same manner as the free space detection portion 8 by processing the output of a plural number of ultrasonic sensors.

Figure 11:
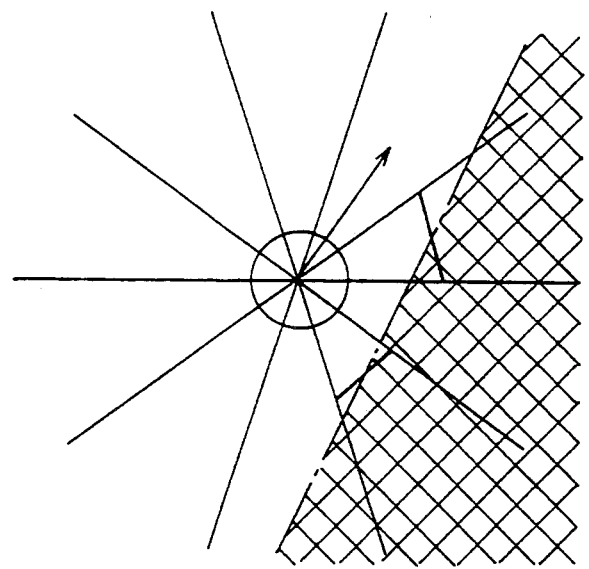
FIG. 11 is a view describing the function of an obstacle tracking portion in a system according to the first embodiment and the second embodiment of the present invention.

As shown in FIG. 11, the obstacle circumference follow portion 9 detects the direction as a direction along an obstacle when a roughly linear distance data array has been obtained between adjacent sensors S.

Figure 12:
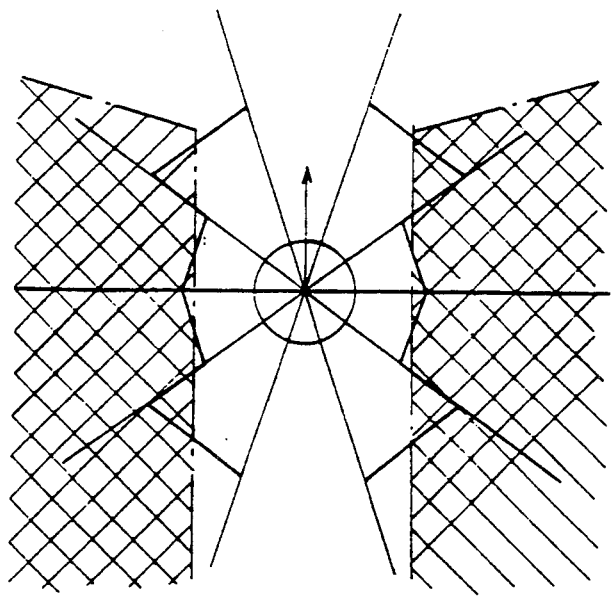
FIG. 12 is a view describing the function of an open space detection portion in a system according to the first embodiment and the second embodiment of the present invention.

As shown in FIG. 12, when the open space detection portion 10 makes a large change to the distance between adjacent sensors and there is the maximum distance that can be measured between sensors, then that direction is detected as the open space. FIG. 12 shows an example where there is an open space in the front and when there are obstacles on both sides of the mobile robot R. There is the possibility of obtaining the direction of advance of the mobile robot R and the opposite direction (direction of retreat) as the maximum distance direction but only the direction of advancing motion is selected.

In these obstacle circumference follow portion 9 and open space detection portion 10, there is the judgment of failure when largely different information is obtained from the measurement results at past points. For example, in the obstacle circumference follow portion 9, there is judgment of failure when no information has been obtained from the sensor direction for which substantially linear distance data has been obtained from measurement at a past point. In the open space detection portion 10, there is judgment as failure when distance information which gives the largest detection distance of sensors is not obtained in the direction of advance when there is judgment as an open space.

Figure 13:
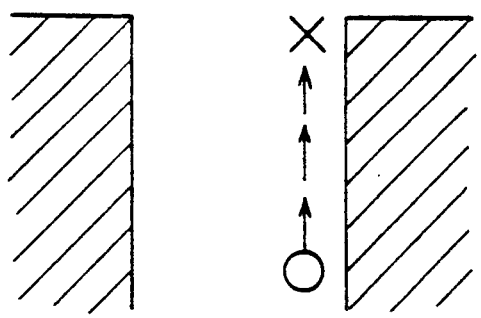
FIG. 13 is a view describing an example of failure of an open space detection portion in a system according to the first embodiment and the second embodiment of the present invention.

As shown in FIGS. 11 and 12, the obstacle circumference follow portion 9 and the open space detection portion 10 have a mutually complementary relationship and so when there is a failure of one, an operation command is induced in the others so that it is possible for the mobile robot R to escape from a deadlock situation. FIG. 13 shows the situation of a failure of the obstacle circumference follow portion 9 as one example. This mutually complementary relationship is such that at the position indicated by X, there is a wall on the right side of the mobile robot R and the distance data in the direction of contact with the obstructing wall is not quickly obtained and so there is a failure of the obstacle circumference follow portion 9 but there is success of the open space detection portion 10 and so it is possible to guide the mobile robot R.

Figure 6:
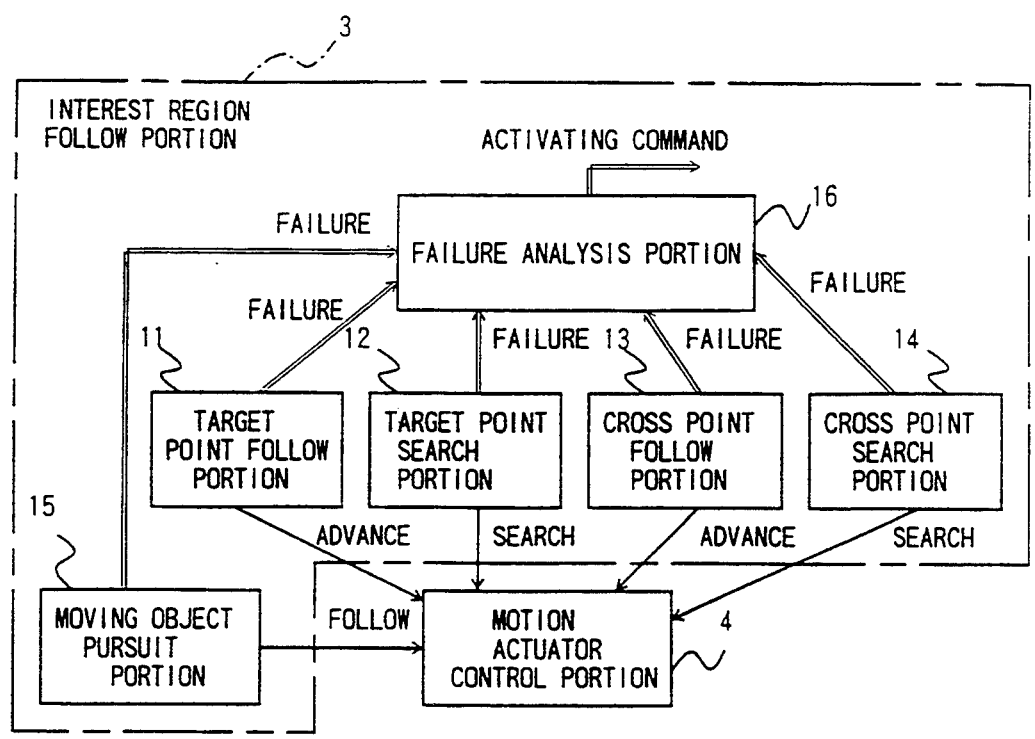
FIG. 6 is a block diagram showing details of a region of interest tracking portion in the system of the first embodiment.

FIG. 6 shows an example of the configuration of the interest region follow portion. The interest region follow portion 3 is provided with a target point follow portion 11 as a tracking function means which calculates the direction in which the objective is within the field of view of the television camera when, for example, there is the objective of reaching an objective point, an objective point search portion 12 as function means for searching for that objective when the objective is not within the field of view of the television camera, cross point follow means 13 as means for tracking for guiding the mobile robot R to a point midway (i.e. a cross point of) when there is no discovery as the result of search, and a cross point portion 14 as means for searching a crossing point. Operation commands such as for tracking and search are transmitted to the motion actuator control portion 4. In addition, there is also a moving object pursuit portion 15 which has the function of tracking moving objects when a moving object has entered into the range of view. These target point functions means 11 through 15 are realized by a television camera image being used for example to extract the object of tracking, for search of a close region using a reference index such as correlation or the like, and movement parameter calculation using a moving image processing method, and the like.

However, these function means can fail easily when compared with those associated with reflexive behavior and the reasons for this failure can be diverse and so it is not always possible to have function means which compensate for this failure. Because of this the interest region follow portion 3 is provided with a failure analysis portion 16 as function means for analysis of failures, and this receives the failure statuses from each of the function means 11 through 15, and a judgment is made for which function means has to be activated to rectify the failure, with the configuration being such that an activation command is applied to the motion actuator control portion 4 which has to be activated. The function means which the object of this selection need not be one inside the interest region follow portion 3 but can also be function means inside the other groups 1 and 2.

The detection of failure is performed internal to each of the function means 11 through 15. For example, in the case where there was tracking of an objective point and there has been a failure of objective detection while there was movement, there is the possibility of the two types of failure of an instantaneous failure due to a change in the degree of illumination or a loss of sight when there has been a failure of movement control. The failure analysis portion 16 first assumes the former and the free space detection portion 8 secures free space in the direction of advance, the mobile robot R continues to advance in the same direction. When the mobile robot R is advancing and it is not possible to discover the objective, and when no free space can be obtained in the direction of advance, it is judged that there is not an instantaneous failure, that the objective has been lost, and the robot stops at that position while there is the activation of the target point search portion 12 for search of the objective point, and the point tracking continues but when the point is lost, the activation of the cross point search portion 14 searches for a midpoint (a cross point in this example) for which there is a large possibility that the objective object will be seen. If the objective is discovered, then the cross point follow portion 13 realizes behavior to guide the robot to this other point. During this time, the target point search portion 12 is always activated and if it is successful, then the advance of the robot is stopped and there is switching to target point follow. If the cross point can also not be discovered, then the output of the open space detection portion 10 guides the robot to a region where there is better view.

Figure 7:
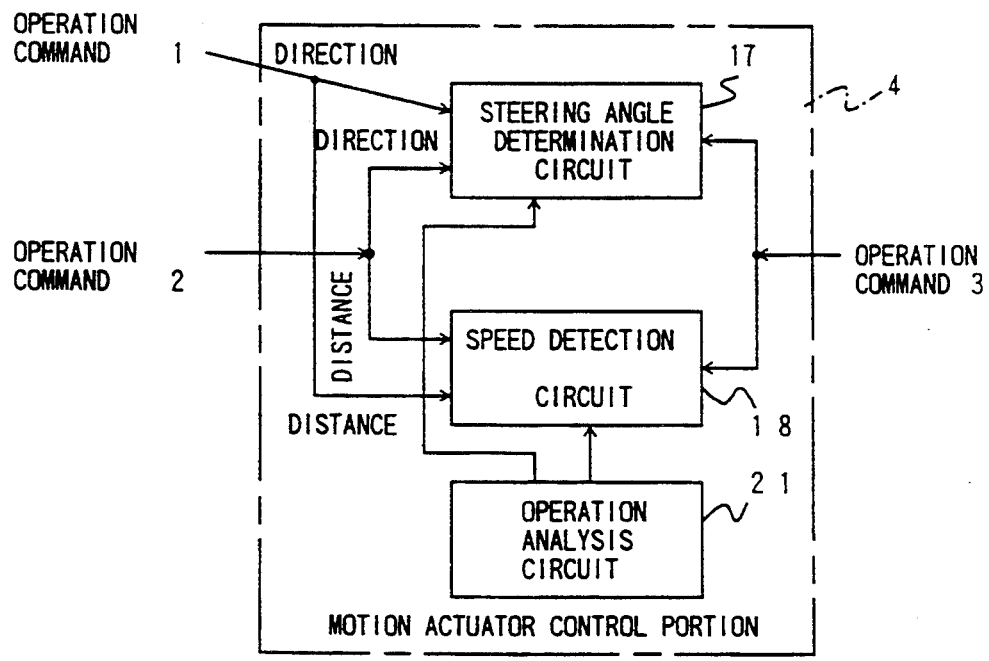
FIG. 7 is a block diagram showing details of a motion actuator control portion in the system of the first embodiment.
Figure 8:
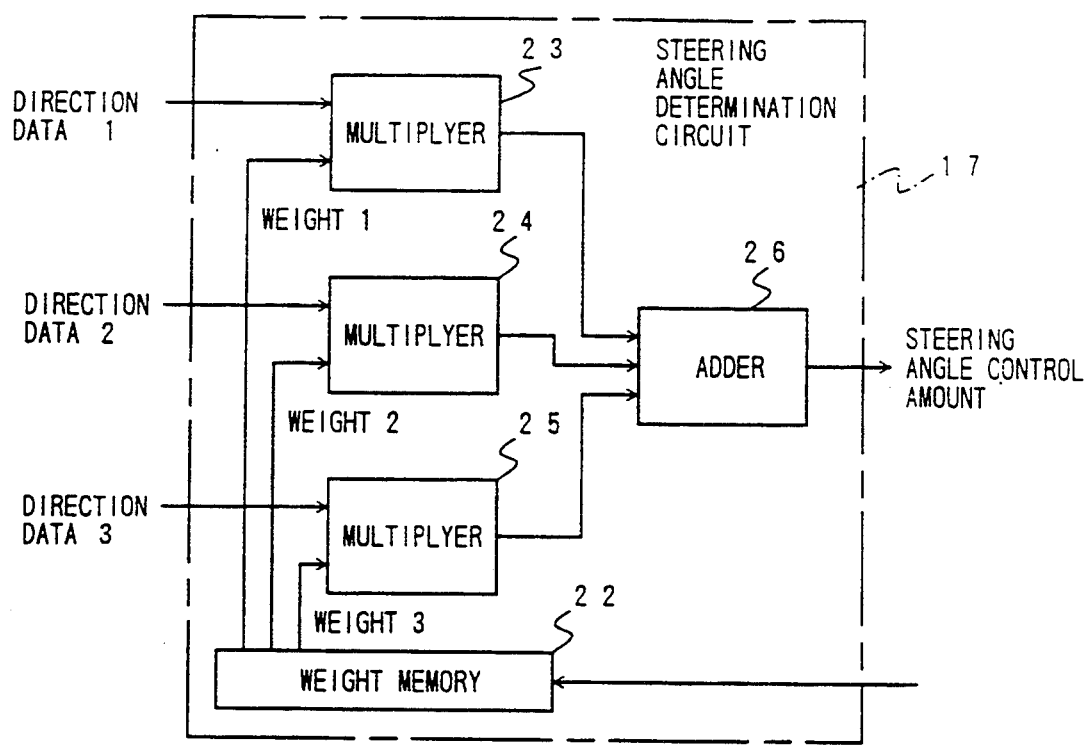
FIG. 8 is a block diagram showing details of a steering angle determination circuit in the control portion shown in FIG. 7.

FIG. 7 shows an example of the configuration of a motion actuator control portion 4. The operation command which is transmitted to the motion actuator control portion 4 is comprised of the various distance information and direction information described above and so these are separated, with the direction information being input to a steering angle determination circuit 17 and the distance information being input to a speed determination circuit 18, and then there is determination of the advance distance and the vehicle direction at the next point and transmission to the running controller not shown in the figure. The circuits 17 and 18 determine the control amount by fusion of the various types of information. This fusion can be realized by the weighted sum of each of the behavior outputs for example. FIG. 8 shows an example of the configuration of the steering angle determination circuit 17. The weighting values stored in a weighting memory 22 are multiplied in the multipliers 23, 24 and 25 with each of the direction information and their addition in an adder 26 obtains the steering angle control amount. The weighting memory 22 is controlled by the operation analysis circuit 21. This analyzes the operation history of the robot, and when there is a lack of a local optimum status, raising the correlation of the weighting of the operation command to avoid this enables escape from a deadlock status and realizes long-term optimum behavior. For example, in the danger avoidance portion, when there is the discovery of a contact detection portion 5 by a contact sensor, the weighting of the stop command is normally the largest and so the mobile robot R stops irrespective of the other commands. If the object is a stationary object, then that stopped status becomes a local optimum status and the mobile robot R cannot start movement. In this case, if it is judged that a certain amount of time has elapsed while the robot is stopped, then the weighting of the operation command of the free space detection portion 8 is made relatively larger so that there is control to have escape from the deadlock status. Once the mobile robot R has started to move in the direction of a safe region, the weighting of the stop operation is raised once again.

By using the configuration described above, it is possible to have behavior determination by fusion of the operation commands output from each of the function means even if the means for planning complex behavior is not always operating.

In addition, it is also possible to have effective processing for various types of failure which can occur in dynamic environments.

Figure 9:
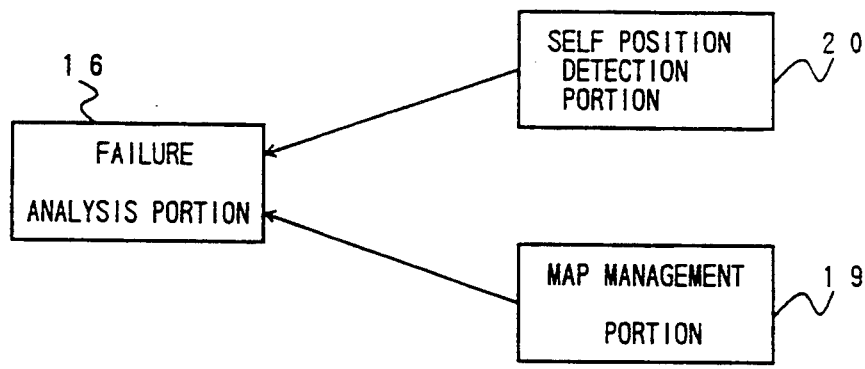
FIG. 9 is a block diagram showing an outline of a region of interest tracking portion in a mobile robot running control system according to a second embodiment of the present invention.

Moreover, the present invention is not limited to the first embodiment described above. For example, as shown by the second embodiment in FIG. 9, the addition of a map management portion 19 which manages the environment map information for the mobile robot R, and a self position detection portion 20 which detects the position of the mobile robot R on the basis of the environment map information and the operation history of the mobile robot R enable the self position of the mobile robot R within an environment to be known when there has been a failure and so there can be effective selection of a cross point which has to be advanced to when the objective is lost sight of. The open space detection portion 10 can be realized through the use of a gyrosensor for example.

In addition, it is also possible to have various other modifications without departing from the scope of the present invention.

The following is a description of a running control system of a mobile robot, according to a third embodiment of the present invention and with reference to FIGS. 14 through 21. Moreover, for the sake of convenience, the running control system according to this third embodiment may sometimes be termed a navigation system.

Figure 14:
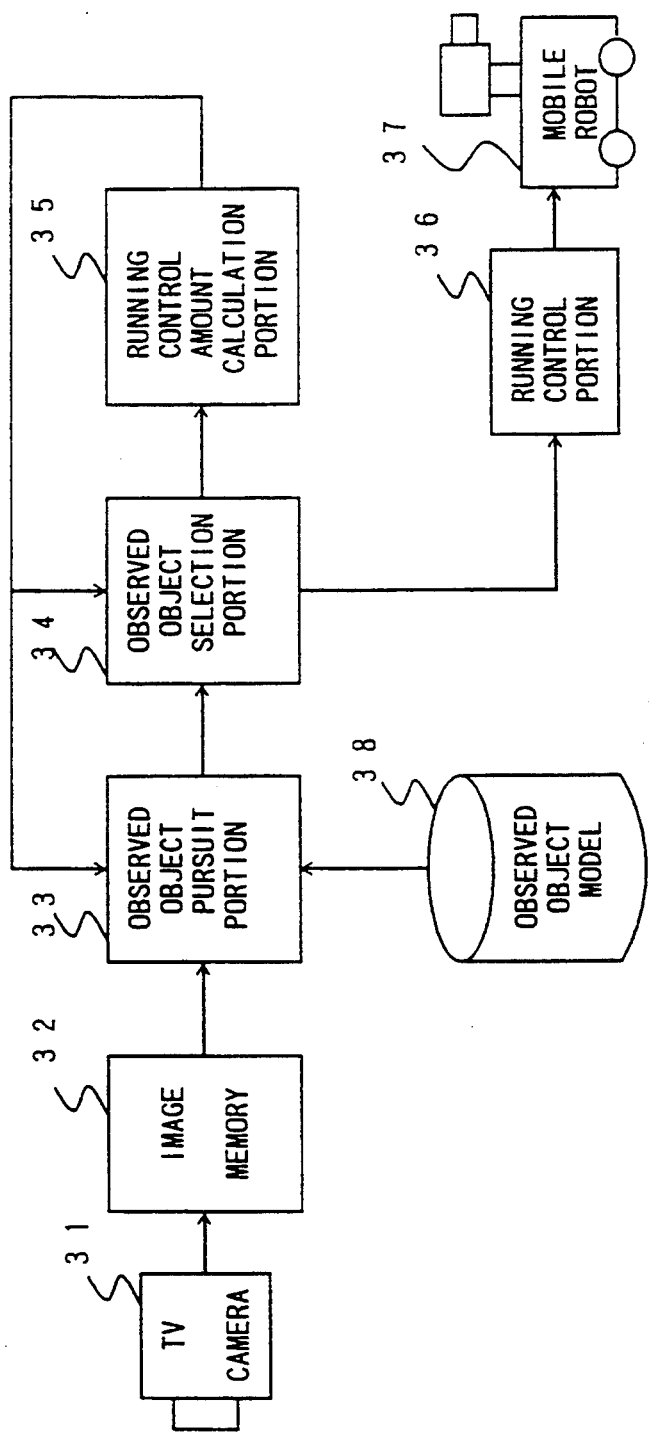
FIG. 14 is a block diagram showing an outline configuration of a running control (navigation) system for a mobile robot and according to a third embodiment of the present invention.

FIG. 14 shows an outline configuration of a navigation system according to this embodiment and is comprised from a television camera 31, an image memory 32 which stores image data, an observed object pursuit portion 33, an observed object selection portion 34, a running control amount calculation portion 35, a running control portion 36, a mobile robot 37 and an observed object model 38.

In this configuration, the image data for the direction of advance of the mobile robot 37 and which is input from the television camera 31 is sent to the image memory 32. In the image memory 32, the image data is temporarily stored. Then, the image data which is read from the image memory 32 is sent to the observed object pursuit portion 33.

In the observed object pursuit portion 33, the observed object which has been stored beforehand in the observed object model 38 is found from the image data which has been successively read from the image memory 32 and the tracking of this determines the position in the image of the observed object.

Figure 15:
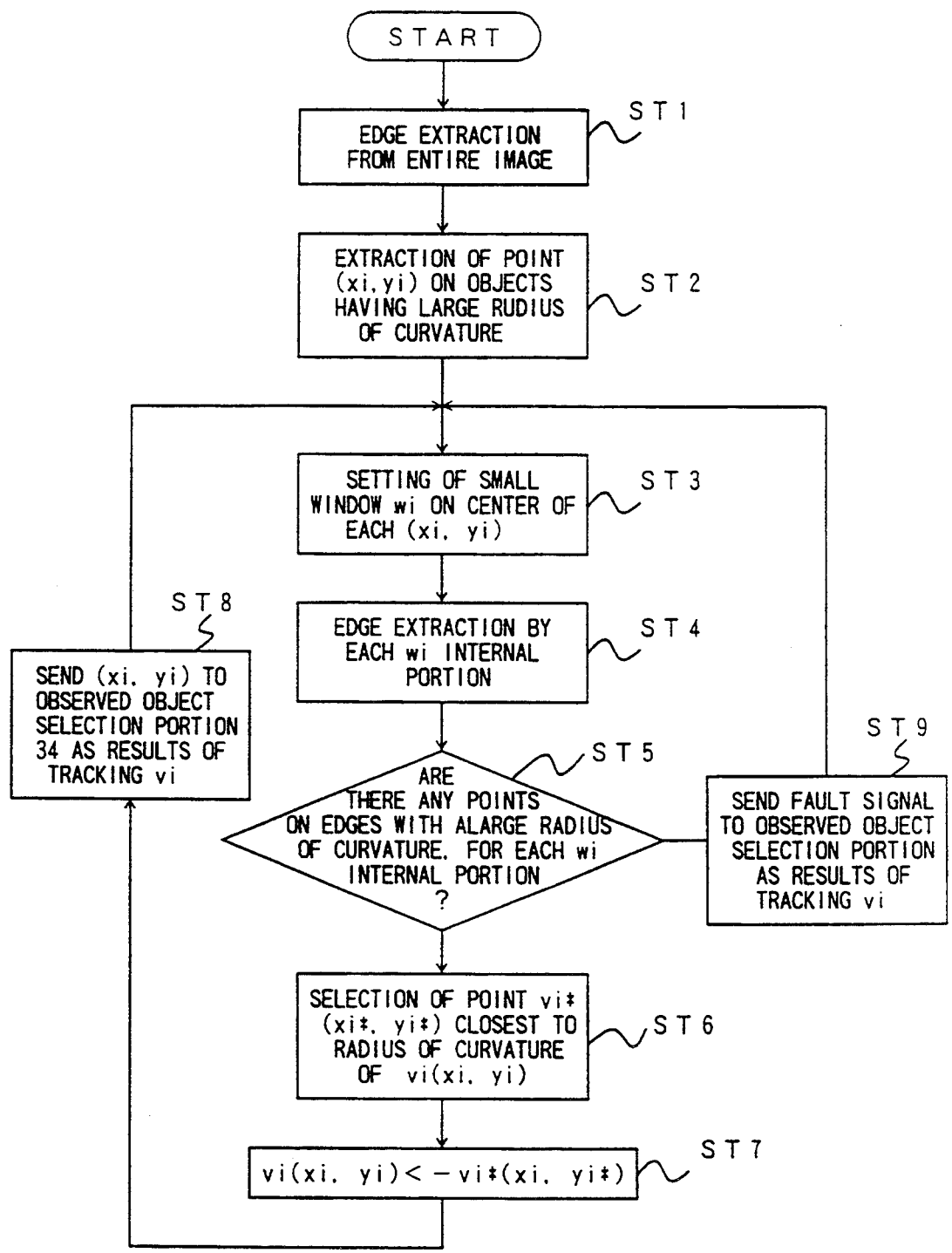
FIG. 15 is a flow chart showing the processing in the case where an observed object of an observed object tracking portion has been selected as an angle point in the system shown in FIG. 14.

FIG. 15 shows the flow of the processing of the observed object pursuit portion 33 for the case where the observed object described in the observed object model 38 is an angle point.

In this case, there is first edge detection in the entire image (step ST1), and tracking along the edge determines the point vi (xi, yi) with a large radius of curvature as an angle point (step ST2). After this, a small window wi is set with each (xi, yi) as the center and after edge detection for each wi, the point vi* (xi*, yi*) which has a radius of curvature closest to vi is determined and the position (xi*, yi*) is sent to the observed object selection portion 34 (from step ST3 to step ST8). Then, vi* (xi, vi*) is repeatedly processed as vi (xi, yi) and the position of the angle point is sent to the observed object selection portion 34. If there is no point on the edge having a large radius of curvature inside wi, then there is NO in step ST5 and the tracking of the angle point vi is lost and a failure signal is sent to the observed object selection portion 34 (step ST9).

This processing is also the same for when the observed object is a specific objective such as a mark. For these cases, the observed object is extracted from an overall image in accordance with extraction procedures for observed objects and which are described in the observed object model 38 and then a small window is generated at the periphery of each observed objects and observed object extraction processing is performed internally and that position is sent to the observed object selection portion 34.

Figure 16:
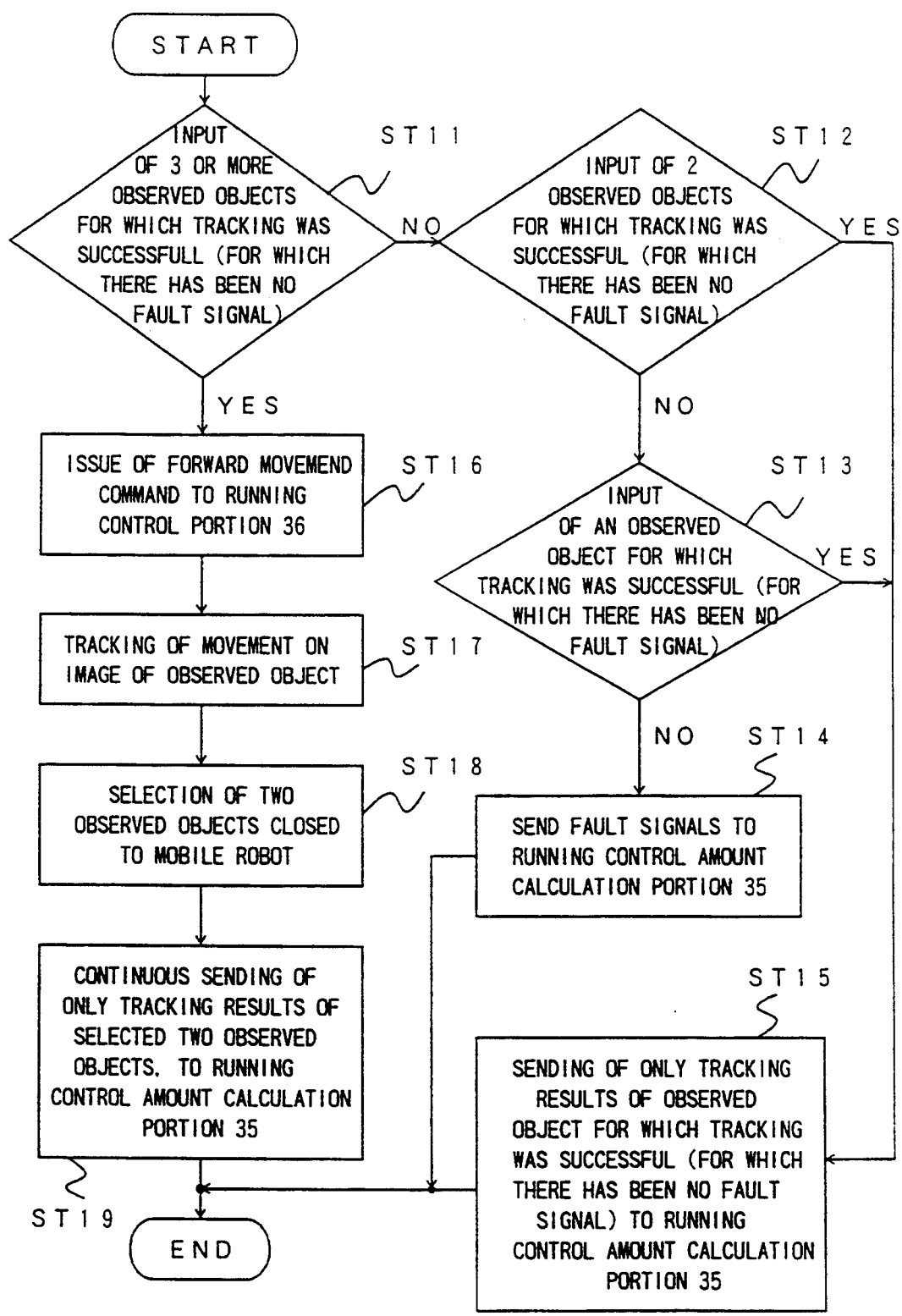
FIG. 16 is a flow chart showing the processing of an observed object selection portion used in the system shown in FIG. 14.

FIG. 16 shows the flow of the processing inside the observed object selection portion 34.

In this case, a success (non-failure) signal is sent to the contact detection portion 5 when there is the observed object amongst the tracking results for the observed object input from the observed object tracking portion 33 and a failure signal is sent when the observed object is not amongst the tracking results (step ST11 through ST14). On the other hand, when there are one or two observed objects for which tracking has been successful, only the tracking results for these observed objects is continued to be sent to the running control amount calculation portion 35 (steps ST11 through ST15). In addition, in cases where there are three or more observed objects for which tracking has been successful, the two observed objects closest to the mobile robot are selected by the procedures (1) through (3) described below and only the tracking results of those selected observed objects is continued to be sent to the contact detection portion 5 (step ST11, step ST16 through ST19).

(1) A command for advance straight forward by a certain distance Z0 is sent to the running control portion 36 and the robot 37 is made to advance straight forward (step ST16).

Figure 17:
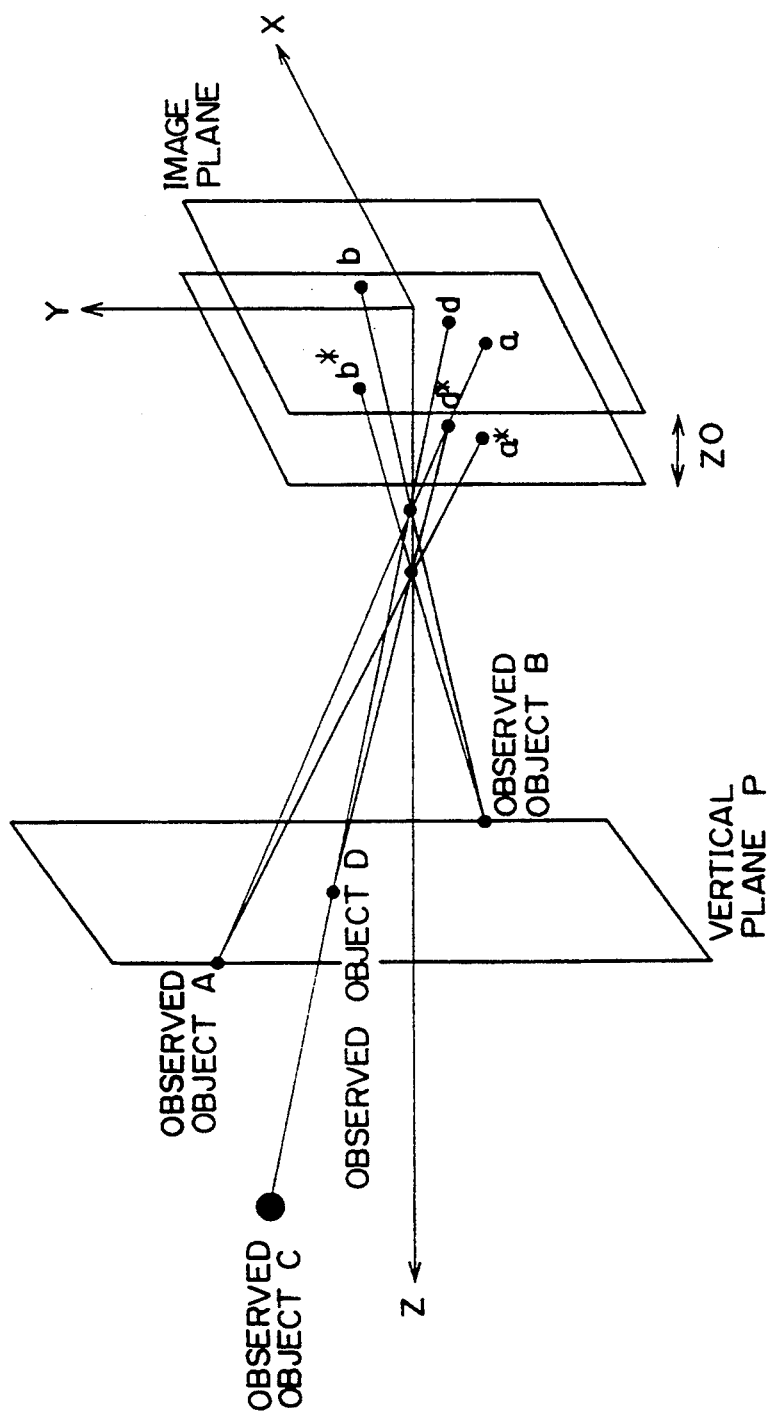
FIG. 17 is a view describing the method of observed object selection in the system shown in FIG. 14.
Figure 18:
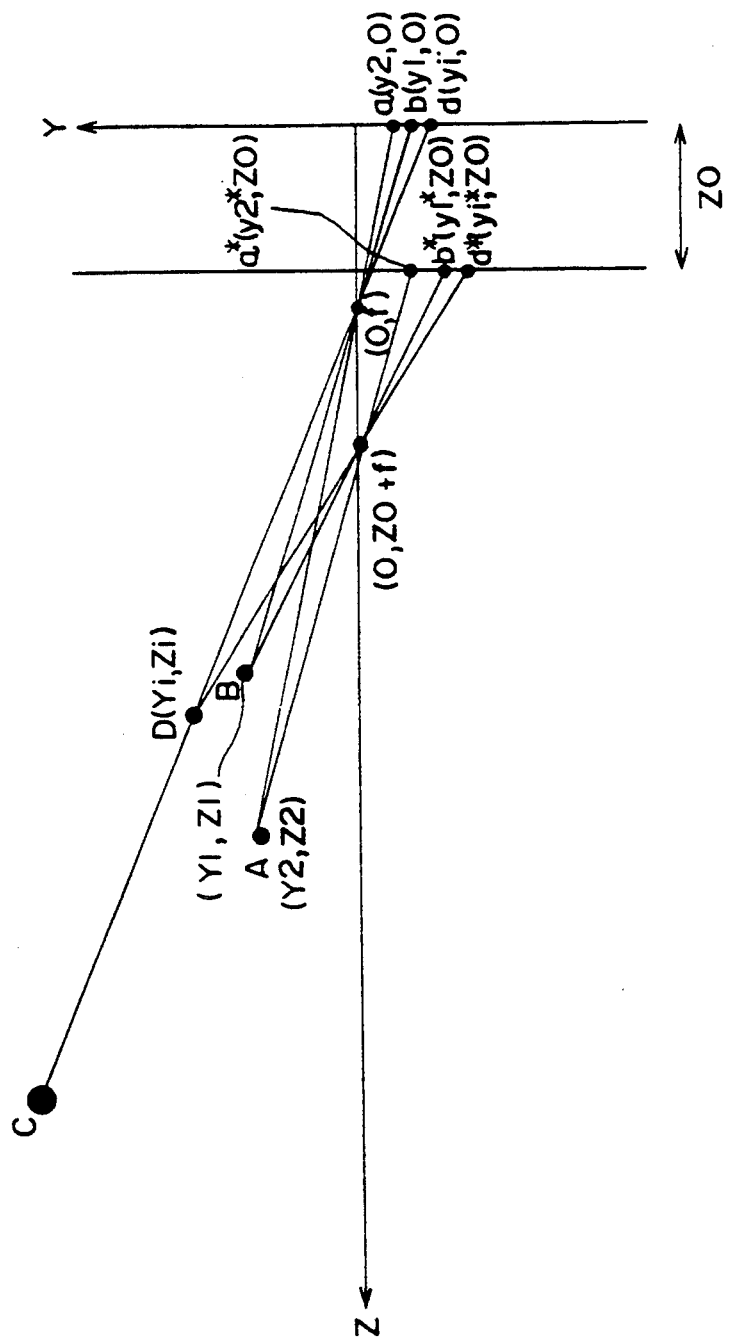
FIG. 18 is a view describing the method of observed object selection in the system shown in FIG. 14.

(2) The is tracking of the movement of the observed object on the screen (step ST17). In this case, two observed objects are selected and a judgment is made for whether or not an observed object between these two is behind or in front of an plane vertical to the floor surface and which includes the selected observed object. In this case, the optical axis of the television camera 31 is set so that it is horizontal to the floor surface. In addition, the coordinate system is set as shown in FIGS. 17 and 18. Here, the two observed objects are A (X2, Y2, Z2), B (X1, Y1, Z1), the photographing position on the image of A, B prior to advance are a (x2, y2, z0), b (x1, y1, z0), the photographing position on the image of A, B prior to advance are a* (x2*, y2*, z*0), b* (x1*, y1*, z0), the planar surface vertical to the floor plane Z-X and through which A and B pass is made P, the observed object for which before and after judgments are made is made C, the photographing position on the image of C prior to advance is made d (xi, yi, 0), the point at which the straight line linking C intersects P is made D, the photographing point in the image of D after advance when the observed object is positioned at D is made d* (xi*, yi*, Z0) and the focussing distance is made f.

Then, if the position of d* is determined from the position of a, b, d, a*, b* obtained on the image and from this status, the relationship of large and small with the flow of the observed object C which is actually observed, and the flow obtained from d, d* is used to obtain a judgement for whether C is in front of or behind P.

Here, if the navigation environment of the mobile robot 37 is a flat surface, then the rotation of the X axis and the Z axis, and the parallel movement of the Y axis can be ignored. Because of this, the amount of movement in the direction of the Y axis on the screen receives less influence of movement error to occur when there is straight advance, when compared to the amount of movement in the direction of the X axis. Because of this, the movement of the screen of the Y coordinate value is used to determine the distance Z1, Z2 to the observed object A, B. Here, the relationship shown in FIG. 18 and FIG. 17 shows the status photographed on the Y-Z plane, and the following relationships are determined from FIG. 18.

$$-f/y1 = (Z1-f)/Y1 \quad (1)$$

$$-f/y2 = (Z2-f)/Y2 \quad (2)$$

$$-f/y1^* = (Z1-Z0-f)/Y1 \quad (3)$$

$$-f/y2^* = (Z2-Z0-f)/Y2 \quad (4)$$

and so $$Z1 = f + Z0\, y1^*/(y1^* - y1) \quad (5)$$

$$Z2 = f + Z0\, y2^*/(y2^* - y2) \quad (6)$$

Figure 19:
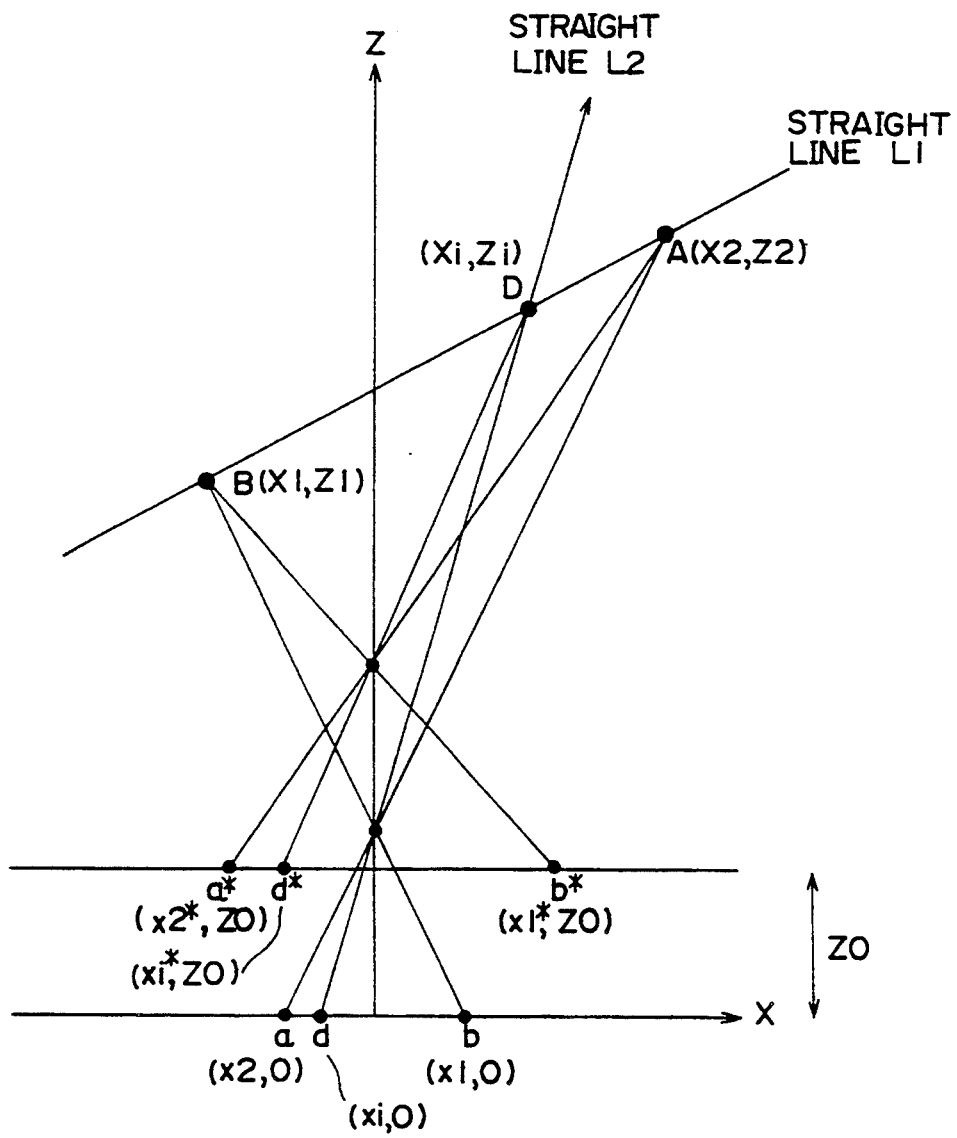
FIG. 19 is a view describing the method of observed object selection in the system shown in FIG. 14.

In addition, FIG. 19 shows the status where the relationship shown in FIG. 17 is projected to the X-Z plane and the following relationships are determined from FIG. 19.

$$-f/x1 = (Z1-f)/X1 \quad (7)$$

$$-f/x2 = (Z2-f)/X2 \quad (8)$$

and from equations (5), (6) (7) and (8), $$X1 = -x1\, y1'\, Z0/f(y1'-y1) \tag{9}$$

$$X1 = -x2\, y2'\, Z0/f(y2'-y2) \tag{10}$$

Accordingly, in FIG. 19, when the vertical plane P shown in FIG. 17 is projected to the X-Z plane, the straight line is made L1, and the straight line when the straight line passing through the two points D, d is projected to the X-Z plane is made L2, then L1: $Z = k1\, X + k2$
$k1 = (Z1-Z2)/(x1-X2)$
$k2 = -k1\, X1 + Z1$
L2: $Z = -f\, X/xi + f$ and when the cross point of these two straight lines is determined $$Zi = k1\, (f-k2)/(k1-f/xi) + k2 \tag{11}$$

is established.

In addition, from FIG. 18, the following relationships are established $$Zi = -f\, Yi/yi + f \tag{12}$$

$$Zi = -f\, Yi/yi^* + f + Z0 \tag{13}$$

and from equations (11), (12) and (13), the following is obtained $$yi^* = \frac{yi - k1\, yi/(k1 - f/xi)}{1 - k1/(k1 - f/xi) + Z0/(f - k2)} \tag{14}$$

Then, when the Y coordinate value on the image of the observed object C immediately after advance is made yr, and $$\mathrm{dif} = |yr - yi| - |yi^* - yi|$$

then, if dif>0, then observed object C is in front of P and if dif<0 then it is behind. In this manner, the tracking of the motion of an observed object on a screen when there is advance straight forward by a certain distance enables a judgment to be made for whether or not an observed object is in front of or behind a plane P vertical to the floor surface and which configures two observed objects, and some other observed object C.

(3) The judgment (2) for behind or in front of is performed with respect to all of the observed objects other than the two observed objects which have been selected. Then, when all of the observed objects are behind the vertical plane which configures the two observed objects being observed, it is possible to judge that those two observed objects are those which are closest to the mobile robot and so these two observed objects are selected (step ST18 in FIG. 16).

In the running control amount calculation portion 35, the input observed object tracking results are used to calculate the steering angle of the mobile robot and which is necessary to either approach the observed object or to pass between two observed objects. In this case, there are the following three types of control performed in accordance with the number of observed objects input from the observed object selection portion 34.

(1) When there is no observed object (when a FAILURE signal has been input:

An instruction for itinerant motion is applied to the running control portion 36 to search for the observed object and the observed object pursuit portion 33 and the observed object selection portion 34 are restarted and re-extraction and re-selection of the observed object are performed.

(2) When there is one observed object.

Figure 20:
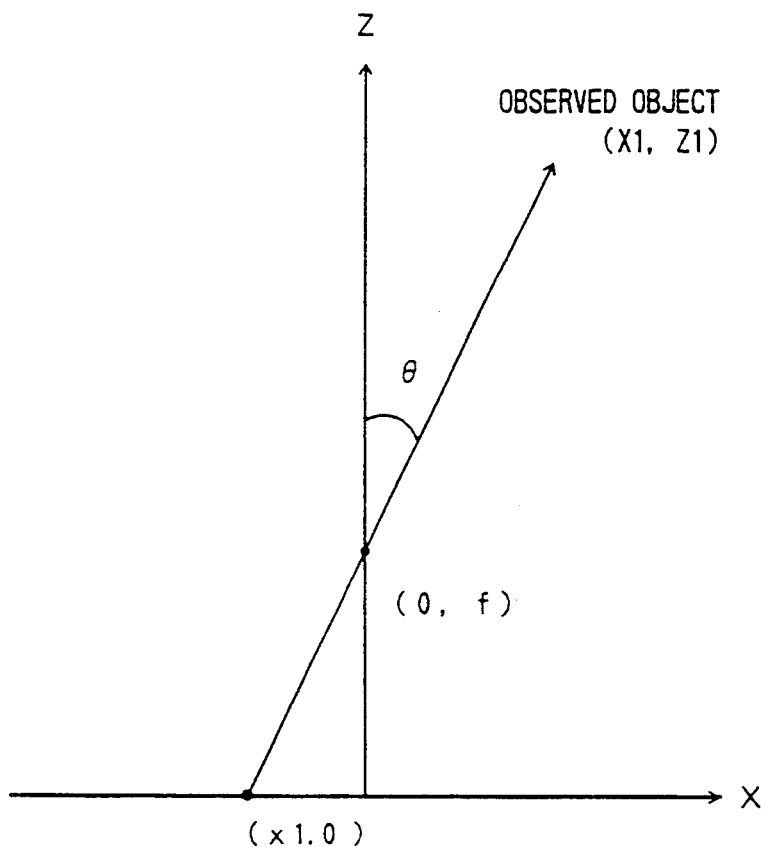
FIG. 20 is a view describing the method of steering control angle calculation for one case of the observed point in the system shown in FIG. 14.

The steering control amount for approaching the observed object is calculated from the tracking results of the observed object on the screen. In this case, as shown in FIG. 20, when the photography position on the screen of the observed object (X1, Z1) which is being tracked is made (x1, 0), then the angle $\theta$ between the observed object and the direction of advance of the mobile robot 37 can be determined from $$\tan\theta = -x1/f$$

Then, this $\theta$ is applied to the running control portion 36 and control of the steering guides the mobile robot 37 to the observed object. Here, when there is a failure of the tracking for the observed object which is being tracked, that is, when there tracking results change to the FAILURE signal, control the same as (1) described above is performed for the re-exraction and re-selection of the observed object.

(3) When there are two observed objects

The steering control amount in the direction of the middle of two observed objects is calculated from the results of tracking the observed objects on the screen. In this case, as shown in FIG. 21, if the position of the middle of the two observed objects (X1, Z1), (X2, Z2) is made C (Xc, Zc), then the motion of the observed object on the screen when the mobile robot has advanced straight forward by the amount Z0 can be used to determine the angle $\theta$ formed between the direction of C and the direction of advance of the mobile robot so that the angle $\theta$ becomes the steering control angle for steering the mobile robot in the direction of the middle of the two observed objects.

Here, the projected position on the image prior to the advance towards the two observed objects is made (x1, y1), (x2, y2), and the the projected position on the image after to the advance towards the two observed objects is made (x1*, y1*), (x2*, y2*), then equations (5), (6), (9), (10) and the relationships $Xc = (X1 + X2)/2$
$Zc = (Z1 + Z2)/2$ can be used to obtain $$\tan\theta = Xc/(Zc - Z0 - f) = \tag{15}$$
$$\frac{-x1\, y1^*\, (y2^* - y2) - x2\, y2^*\, (y1^* - y1)}{f\{y1\, (y2^* - y2) + y2\, (y1^* - y1)\}}$$

Accordingly, the tracking results in the images when there is advance towards two observed objects are used to calculate the steering control amount $\theta$ for steering the direction of the mobile robot after advance straight forward the direction of the middle of the observed objects and this $\theta$ is output to the running control portion 36. Here, when there is a failure in the tracking of either of the observed objects being tracked, that is, when the tracking results have changed to the FAIL-URE signal, control the same as (1) described above is performed for the re-extraction and re-selection of the observed object.

In the running control portion 36, the steering control angle applied from the running control amount calculation portion 35 is used as the basis for control of the steering angle and the mobile robot 37 is made to advance straight forward in accordance with the advance command for a certain distance and which is instructed by the observed object selection portion 34.

Accordingly, by use of the above manner, an observed object model which describes the observed object in the image projected by the television camera 31 and the observed object described in the observed object model are tracked in the image by the observed object pursuit portion 33 and here, when there are three or more observed objects, the two observed objects closest to the mobile robot when judged by the front behind relationships are selected by the observed object selection portion 34 and the tracking and selection results for these are used for the running control amount calculation portion 35 to calculate the steering control angle for the advance of the mobile robot 37 to approach the observed objects or the advance of the mobile robot 37 so as to pass between the two observed objects, and these calculation results are then used as the basis for the running control portion 36 to control the actual running of the mobile robot 37. From this, it is possible to judge the front-behind relationships between observed objects from only the results of tracking the observed object in the image, for a single observed object to be approached, and for the mobile robot 37 to be advanced in the direction of between two objects. Because of this, when a destination observed object has been selected as the observed object, the destination object is tracked as a single observed object and it is possible to control the mobile robot so as to approach this destination object, and when an angle point which configures across point of a path has been selected as the observed object, pairs of two angle points which are closest are selected from between the observed objects and it is possible to lead the mobile robot to the center of this cross point by guiding the mobile robot towards the middle, and furthermore, when a mobile robot moves on a path in which there are many obstacles, a characteristic point of the obstacle and the end of the moving path is selected as the observed object and it is possible to use this method to select the two observed objects closest to the mobile robot and to advance the mobile robot to between them. In addition, when the observed object goes out of the field of view, it is possible to have the extraction and tracking of a new observed object and for the two observed objects closest to the mobile robot to be selected in the same manner and for there to be advance to between them. As the result of this, it is possible to realize steering control so as to move a mobile robot between obstacles, by using only the tracking of an observed object in a screen. This is to say that by switching an observed object in accordance with the conditions of use, it is possible to execute real-time navigation of a mobile robot so as to approach an observed object or to pass between two observed objects. In addition, when compared to conventional methods using marks and guide lines, it is possible to eliminate much trouble and expense since it is not necessary to have the installation of such marks and guide lines, and it is not necessary for them to be changed even if it is necessary to change the path of movement.

Moreover, the present invention is not limited only to the third embodiment described above, as various modifications can be made without departing from the scope of the present invention.

The following is a description of a running control system of a mobile robot and according to the fourth embodiment of the present invention, with reference to FIGS. 22 through 49.

FIG. 22 is a view of an entire mobile robot system relating to a fourth embodiment of the present invention.

In FIG. 22, 41 is a multiple sensor system, 42 is a system error remove circuit, 43 is an open space search circuit, 44 is an obstacle boundary follow circuit, 45 is an obstacle avoidance circuit, 46 is a free space search circuit, 47 is an operation determination circuit, 48 is a man-machine interface (hereinafter termed a man-machine IF), and R is a mobile robot. The multiple sensor system 41 is provided with a plural number of sets of sensor sets comprising touch sensors and a plural number of types of non-contact sensors, and the sensor information from these plural number of sensor sets is incorporated a control data candidates. The system error remove circuit 42 corrects the plural number of types of sensor information and outputs optimum sensor information that has been no system error as control data. This control data is applied to each of the operation calculation circuits 43 through 46. Circuits after this comprise the mobile robot guidance system. The operation calculation circuits 43 through 46 use the path smoothness reference and the external output due to the distance data from the multiple sensors as the basis for minimizing the internal energy of the mobile robot R using a method whereby there is snake-based operation which predicts the position of the mobile robot R. The open space search circuit 43 extracts free space which as an open door or exit from a path for example. The obstacle boundary follow circuit 44 tracks the boundary of a stationary obstacle uses the force of a direction of a contact line calculated from the distance data reflected from an obstacle which is approaching the mobile robot R. The obstacle avoidance circuit 45 guides the mobile robot R so that it does not collide with the obstacle. The free space search circuit 46 extracts the region which is safest for the mobile robot. The circuits 43 through 46 output behavior commands for the mobile robot R and apply these to the operation determination circuit 47, in which there is the selection of a behavior pattern and the selected operation commands are input to the motion actuator drive control portion of the mobile robot R.

Figure 31:
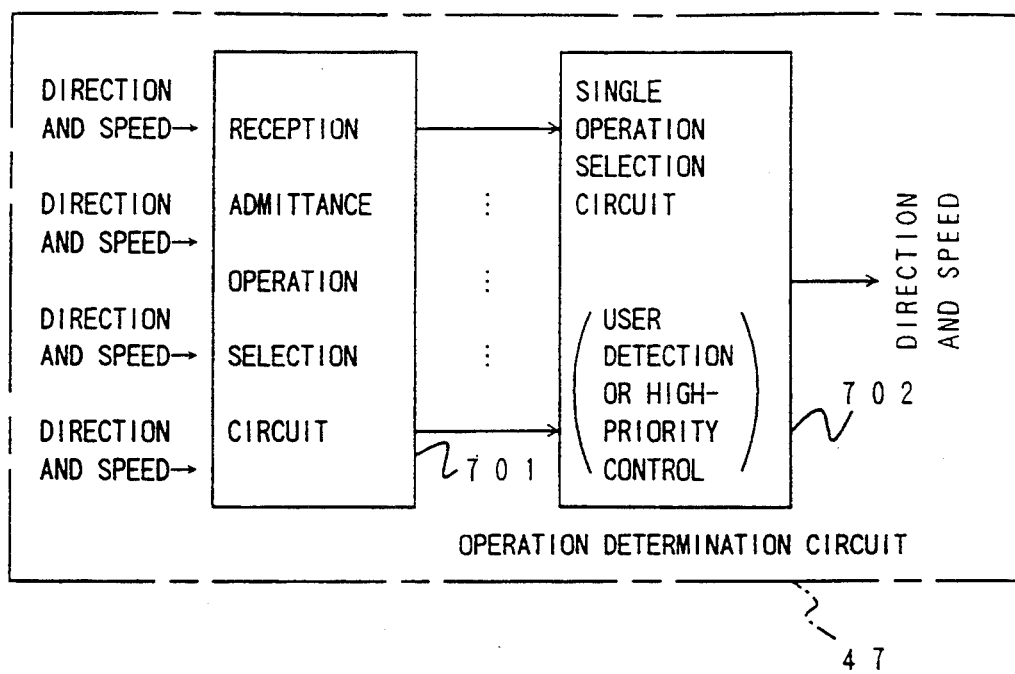
FIG. 31 is a block diagram showing the operation determination circuit in a running control system of a fourth embodiment.

As shown in FIG. 31, the operation determination circuit 47 is configured from a reception admittance operation selection circuit 701 and a single operation selection circuit 702 and the operation commands from each of the opeation command circuits 43 through 46 is searched in the reception admittance operation selection circuit 701 from which there is the selection and output of either one or two or more operation commands. The single operation selection circuit 702 operates so as to reduce the output signals for the operation commands from the reception admittance operation selection circuit 701 to only one and so this determination is by user specification using the man-machine IF 48 or is performed by highest priority control.

Figure 32:
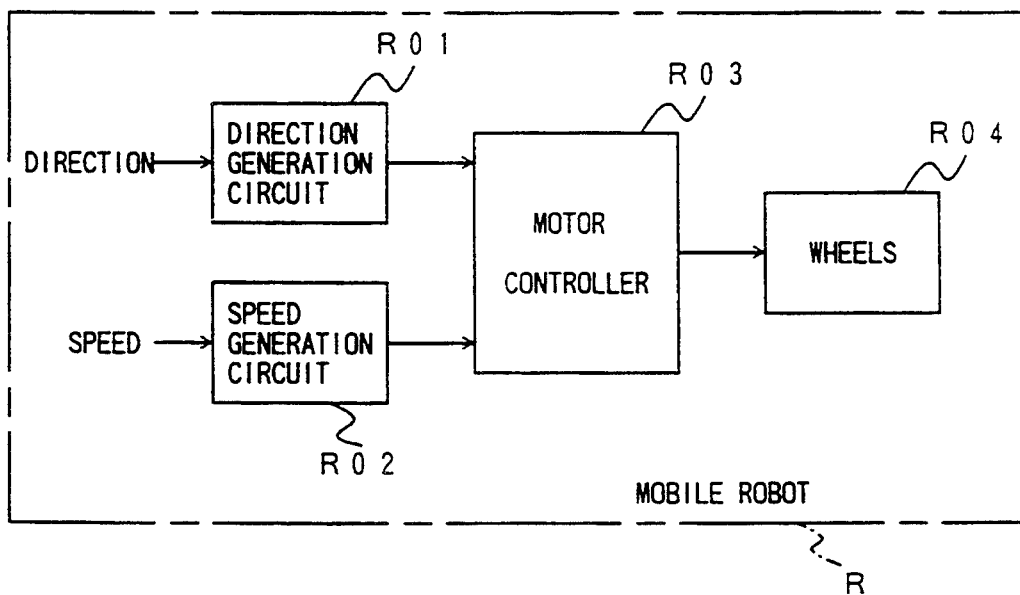
FIG. 32 is a block diagram showing the mobile robot system in a running control system of a fourth embodiment.

As shown in FIG. 32, the mobile robot R is provided with a direction generation circuit R01, a speed generation circuit R02, a motor controller R03 and wheels R04. Each of the operation commands relating to the direction and speed are respectively received by the corresponding direction and speed generation circuits R01 and R02 where steering angle and speed control signals for the actuators are generated, and applied to the motor controller R03. This motor controller R03 drives the actuators of the wheels R04 according to the input control signals.

Figure 38:
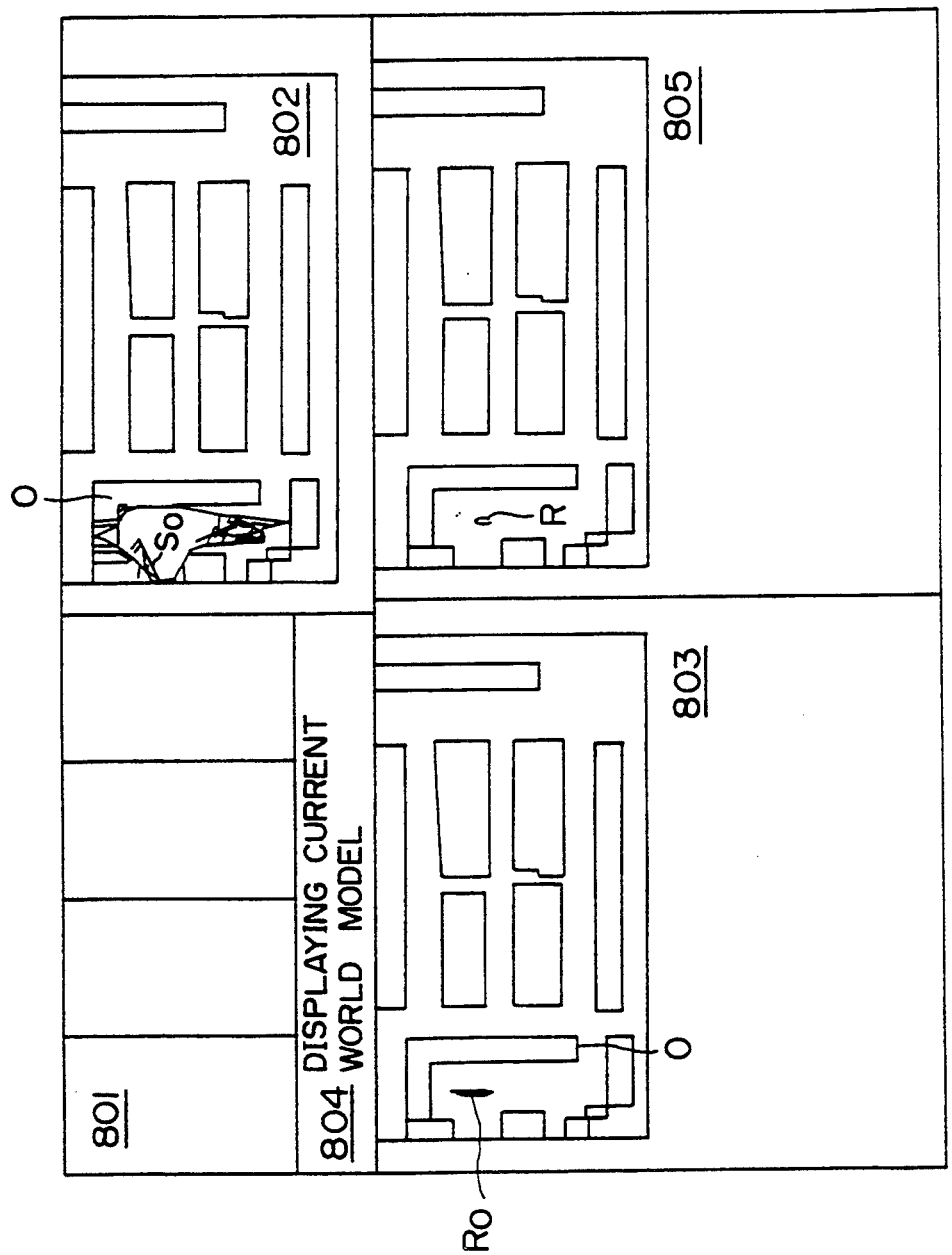
FIG. 38 is a view showing the surface of a display having a man-machine interface and according to a running control system of a fourth embodiment.

The man-machine IF 48 is for an operator to perform monitoring of the mobile robot R and for the input of commands with respect to the mobile robot R and the display screen is as shown in FIG. 38. In FIG. 38, there are a plural number of windows 801 through 805 which are the configuring elements of the screen of the display portion.

The window 801 includes a menu window, two display with respect to the sonar data for the current position of the robot and the current model, a message window for the display of messages from each of the menus, and a window for dialog between the operator and the robot.

The menu window has three sub-windows. More specifically, there are a menu window which includes a set of patterns for the control of the sensors and the robot R, a menu window which includes a set of patterns for the creation of targets and the creation of stationary and moving obstacles and for the reading of the model, and a menu window which includes a set of patterns for the display of the operation history and the current model. The operator can refer to and use the patterns for the creation of many stationary and moving obstacles and for the selection of the desirable behavior for the robot R.

The display windows 802 and 803 are for the display of the current situation for the robot R and its periphery, and for the display of what is being seen by the robot R while the display window 802 displays the current sonar measurement data. The display window 803 displays other sensor information such as video images and the like.

The message window 804 displays the current messages from the selected menu. These messages include error messages, alarm messages and status messages.

The dialog window 805 is the main interface for dialog between the operator and the robot R. The operator uses this window 805 to design the position of the speed and direction of moving obstacles, the position of obstacles and the target position of the robot.

Moreover, in FIG. 38, $R_0$ is the track of the robot, $S_0$ is the ultrasonic wave scan path by the sonar of the periphery of the robot R, and O is an obstacle.

The following is a detailed description of each of the configuring elements of this system.

Figure 23:
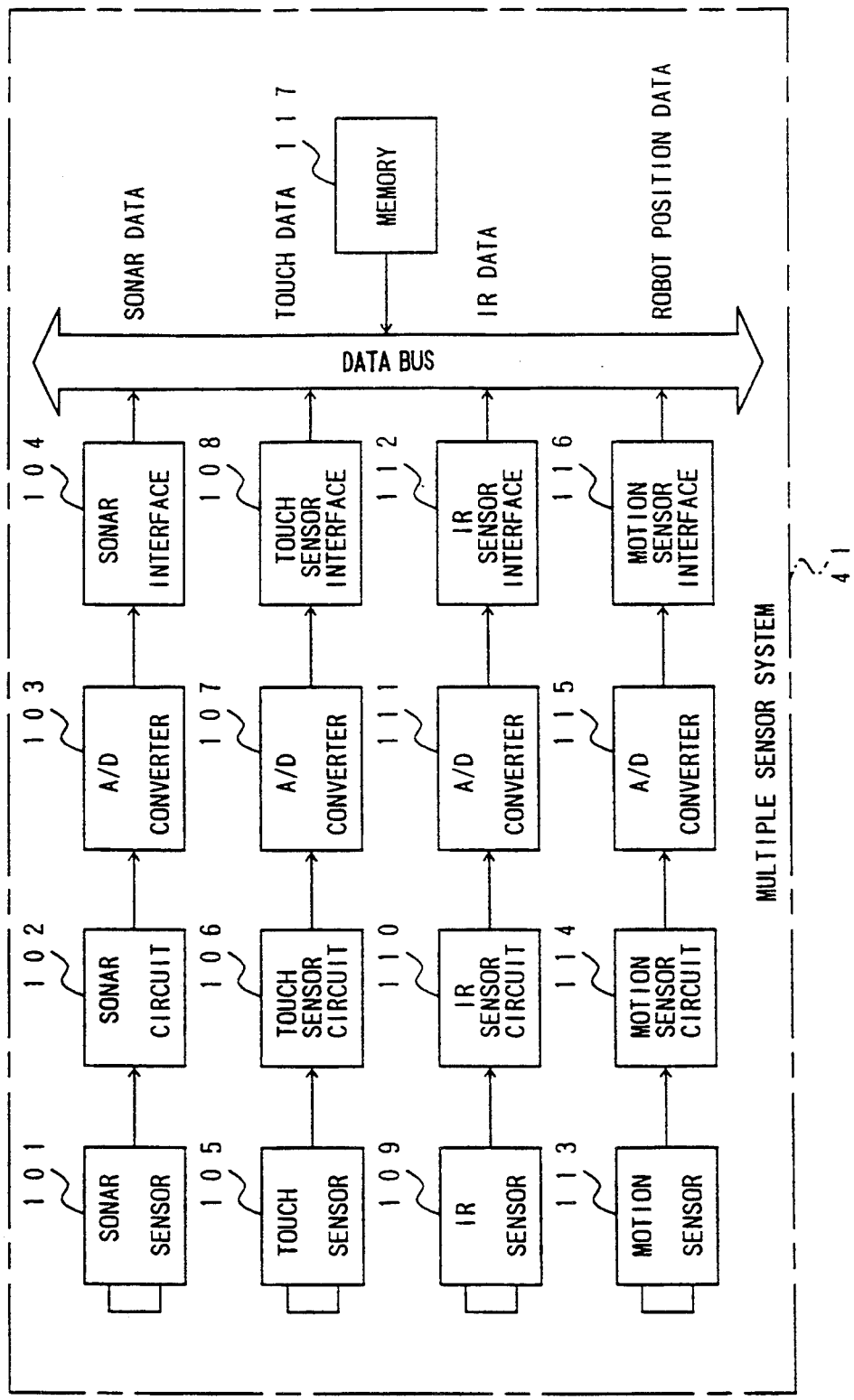
FIG. 23 is a block diagram of one electrical circuit system of a multiple sensor system in a running control system of a fourth embodiment.

As shown in FIG. 23, the circuit system of the multiple sensor system 41 is provided with a sonar (sound navigation ranging) sensor system, a touch sensor system, an IR (infrared radiation) sensor system and a motion sensor system.

The sonar sensor system is comprised of a sonar sensor 101, a sonar circuit 102, A/D converter 103, and a sonar interface 104. The sonar sensor 101 generates ultrasonic waves and senses their reflection, and outputs signals which indicate the time until the arrival of the reflections of those waves which have been generated and so those output signals are amplified in the sonar circuit 102, are digitalized by sampling by the A/D converter 103, and are sent to a data bus as distance data for from the sonar sensor 101 to the reflection position.

The touch sensor system is configured from a touch sensor 105, a touch sensor circuit 106, an A/D converter 107, and a touch sensor interface 108. The touch sensor 105 senses contact with respect to an object and outputs signals which indicate the presence of an object and so these output signals are amplified by the touch sensor circuit 106, sampled and digitalized by the A/D converter circuit 107, and are sent via the touch sensor interface 108 to the data bus as data indicating the presence of an obstacle.

The IR sensor system is configured from an IR sensor 109, an IR sensor circuit 110, an A/D converter 111 and an IR sensor interface 112, and the IR sensor 109 generates infrared radiation laser light, senses the level of reception of the dispersed and reflected light, and output signals which indicate the degree of attenuation from the received light level from the generated light level. These output signals are amplified by the IR sensor circuit 110, are digitalized by the A/D converter 111, pass through the IR sensor interface 112, and are sent to the data bus as distance data for from the IR sensor 109 to the position of reflection.

The motion sensor system comprises a motion sensor 113, a motion sensor circuit 114, an A/D converter 115, and a motion sensor interface 116. The motion sensor 113 comprises a gyrosensor for example, and senses the operation amount of the motion actuator of the mobile robot R as a vector quantity, and that detected signal is amplified in the motion sensor circuit 114, digitalized in the A/D converter 115, passed through the motion sensor interface 116 and is sent to the data bus as movement data for the mobile robot R.

117 is a memory, and the data from each of the sensor system is stored in the memory 117 by the memory access control portion not shown in the figure, and is read from the memory 117 and applied to the circuit of the next stage.

Figure 24:
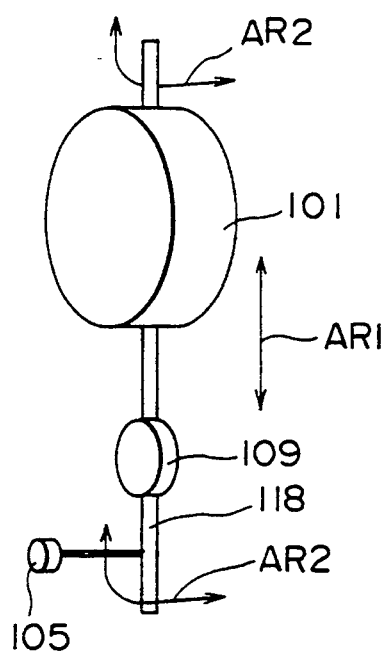
FIG. 24 is a block diagram of a supporting function system in a multiple sensor system in a running control system of a fourth embodiment.

These sensors 101, 105, 109 and 113 are all mounted to the mobile robot R, and of these, as shown in FIG. 24, the sensors 101, 105 and 109 are mounted as a set. The mobile robot R has a plural number of such sets arranged on it at equidistant intervals in the direction of the periphery of the mobile robot R.

As shown by the arrows AR1 and AR2 in FIG. 24, each sensor set is supported by the support member 118 which moves the sensor sets up and down and rotates them forwards and backwards, so as to change their directions. In other words, these support members perform sensor directivity operation.

The most general ultrasonic wave sensor (such as a that by the Polaroid Corporation, 1982) measures the distance by calculating the time of transmission of an reflected ultrasonic wave. Mirror reflections are one major problem for ultrasonic wave distance sensors and in principle, mirror reflection are generated when the reflected signals arrive directly to the ultrasonic wave sensor. This is to say that when there is a status where the surface status of any object is such that it can be seen by a sonic sensor, it is possible for favorable measurement to be performed irrespective of mirror reflections. Many researchers have proposed sonic sensors which attempt to solve the problem of mirror reflections.

One proposal has been for an active infrared radiation sensor which gives accurate distance measurement of the shortest distance and which does not have the problem of mirror reflections. However, active infrared radiation sensors have their own characteristic problems such as the accuracy of measurement deteriorating with respect to black objects.

Touch sensors can always respond to any type of contact with an object and are the most stable type of sensor for sensing operation. However, their major drawback is that they cannot tell of the existence of an obstacle until it is touched.

In the present invention, these three types of sensors are actively integrated so that each of their operations mutually complements that of the others and so multiple sensor sets have come to be used so that the characteristic system errors of each sensor is eliminated.

According to a multiple sensor set configuration, it is possible to eliminate the problem of mirror reflections using three methods. That is, the directivity operation of the mobile robot R or the rotation mechanism of the support member 118 in a system where rotational operation is used, through the use of an infrared radiation sensor, and through the use of touch sensors to confirm the phenomenon.

Figure 25:
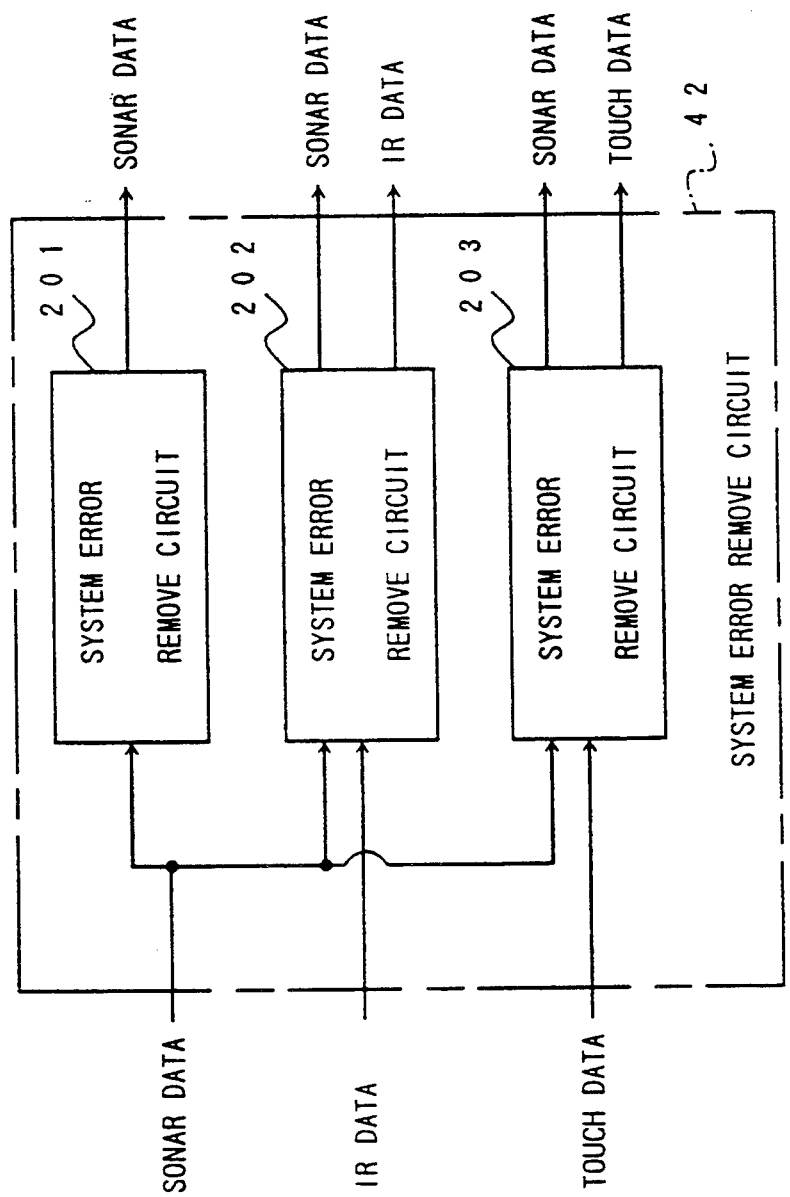
FIG. 25 is a block diagram of a system error remove circuit in a running control system of a fourth embodiment.
Figure 26:
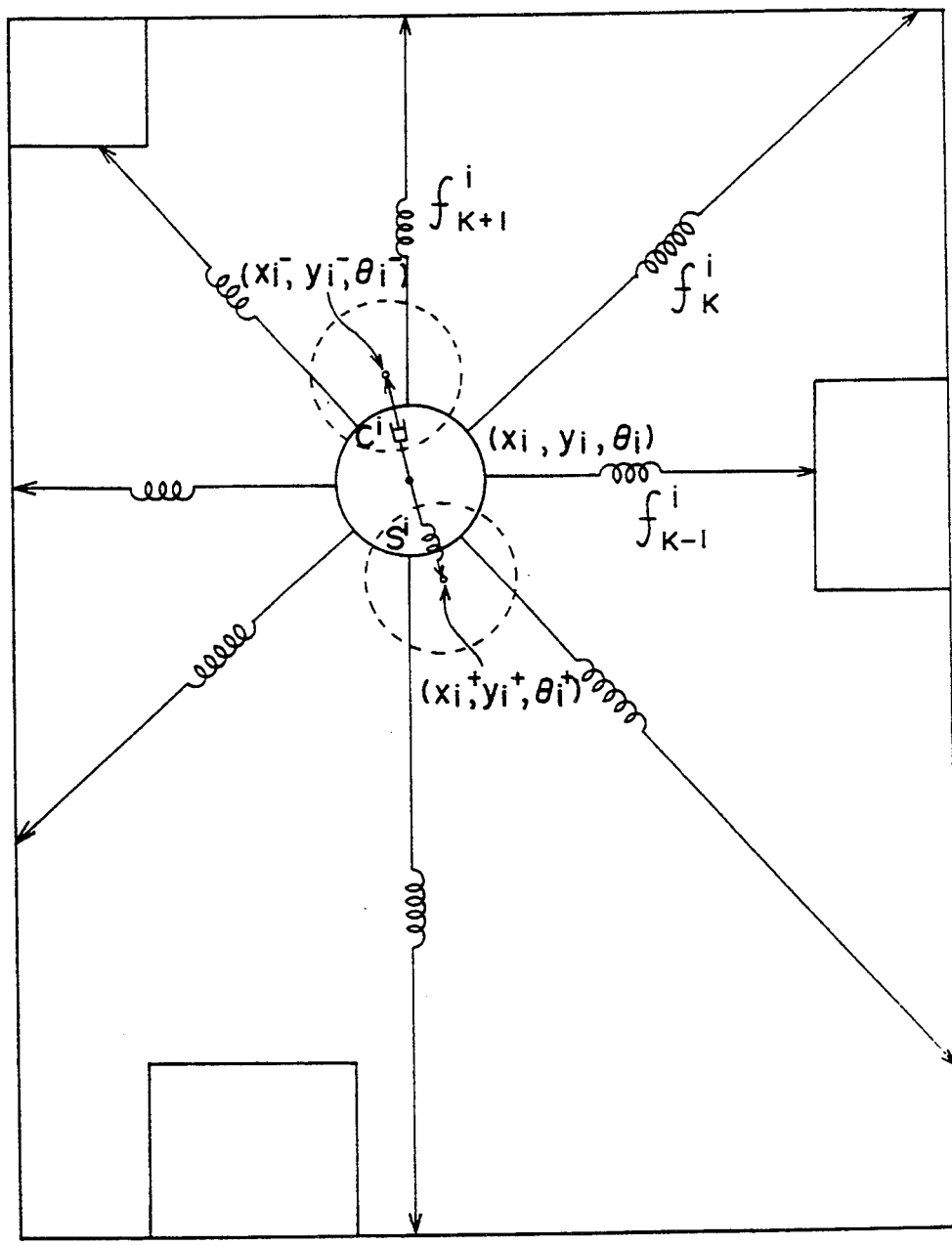
FIG. 26 is a conceptual view for describing the basic principle of each of the operation command circuits in a running control system of a fourth embodiment.

The system error remove circuit 201 commands the operation for the removal of the related system errors and so as shown in FIG. 25, includes the the system error remove circuits 201 through 203. The following is a detailed description of the functions of each of these circuits.

The system error remove circuit 201 uses a rotation mechanism in that the directivity operation or the rotation operation of the mobile robot R is used to remove the systematic error of the sonar sensor 101. More specifically, when there is a response in which one close sonar measurement value is a distance smaller than the effective reflection distance, that sonar sensor is rotated and the value read for that sonar sensor is changed. When this change is larger than a random error for a sonar sensor, that value measured for the shortest distance is used as the object data. In addition, all of the effective sonar data is used and the average distance is calculated, and used in an evaluation for the distance. The method described above involves rotating the sonar sensors but when the mobile robot R is rotated by 30° for example, the sonar data is taken in for every 5° rotation. According to this method, the system can determine whether the sensed data is favorable data or erroneous data.

Moreover, this has been a description for only a sonar sensor but exactly the same algorithm can be used for determining the worth (favorable or erroneous) of data of an infrared radiation sensor.

The system error remove circuit 202 compares the other sensor information and operates to remove systematic error by always compensating (comparing) the distance value obtained from the sonar sensor and the infrared radiation sensor. More specifically, there is no problem in the case where there is no difference between two values, but if there is, there are the three instances of (i) when the distance measurement value from the sonar sensor is poor due to specular reflections and the distance measurement value from the infrared radiation sensor can be used but if or (ii) the opposite case, or (iii) the case when the distance measurement values from the two sonar sensors are poor. In case (i), the infrared radiation sensor read value is used, and in case (ii) the sonar sensor read value is used, and in case (iii) operation is entrusted to the system error remove circuit 203.

Accordingly, the system error remove circuit 203 returns a poor distance measurement value even if the two system error remove methods described above are used for the sonar and the infrared radiation sensors and when this occurs, the mobile robot R continues to move towards the obstacle until contact of the mobile robot R with an obstacle is detected simply by contact of the touch sensor.

Then, the four operation command portions 43 through 46 in this system determine the optimum speed and position of the robot using a method known as the "Snakes" method made known by Kass, Witkin and Terzopoulos (Int. J. Comput. Vision 1, 1987, 321–331) and which makes use of an energy minimization curve. FIG. 5 shows the principle of this method. In this method, snakes (c(s)) is calculated by minimizing the function E.

$$E = \int_s (E_{int} + E_{ext}) ds) \\ = \int_s \alpha \, ||c'(s)||^2 + \beta \, ||c''(s)||^2 + P(c(S)) ds \quad (16)$$

In this equation (16), the start function comprises an integral and P shows the potential which is related to an external force. The applicability and the hardness of the model are controlled by a and b.

Assuming that c is a minimum value for the track with respect to e, then, this satisfies the related Euler-Lagrange equation.

$$-(\alpha c')' + (\beta c'')'' + \Delta P(c) = 0 \quad (17)$$

In this equation, each of the elements are expressed as forces along the line of curvature described above. The solution expresses a balance between the forces in accordance with this line.

In the present invention, there is proposed the same algorithm for the calculation of the direction and the position of the mobile robot R so that this balance between forces is maintained. The force acting upon the mobile robot R includes both internal and external forces.

The internal forces consider a smooth stop of the mobile robot R on the track in the smooth force fs and also considers the braking force fc derived from robot dynamics.

In addition, the mobile robot R moves to the position where the mirror image force fi from the compound distance measurement values balances the mirror image force (or the safest position).

Furthermore, other external forces ft (such as the force of an object) are added to induce the mobile robot R.

Here, $$\text{vector } v = (x, y) \quad (18)$$

and so the contour (or position) of the robot is expressed. Here, (x, y) are the Cartesian coordinates of that position.

$$fs = a(vi + - vi) \quad fc = c(vi - vi - 1) \quad (19)$$

Here, $vi+$ is the position (i-th) calculated from a smooth stop, and $vi$ and $vi-1$ express the current and former robot positions. $\alpha$ and c are parameters for control of the smoothness and motion characteristics of the robot.

The mirror image force is calculated from the following equation.

$$fij = k(sk - vi) \quad (20)$$

Here, $sj = (xsj, ysj)$ is the Cartesian coordinate value of the j-th distance read value, and k is the amplification of the mirror image force.

The new position is calculated from the following formula.

$$vi + 1 = vi + \sum_{j=0}^{n} fij + fc + fs \quad (21)$$

Here, n is the number of ultrasonic wave sensors. The new position is controlled by three parameters. More specifically, the $\alpha$, c and K with respect to the smooth stop, the braking force, and the ultrasonic wave detector force.

The following is a description of the operation of each of the operation command portions on the basis of "Snakes" theory.

The free space search circuit 46 first removes the systematic error in the infrared radiation sensor and the sonar sensor on the basis of the "Snakes" theory described above. In order to direct the robot R to the largest free space corresponding to a safe region for the mobile robot R, a touch sensor is not used to confirm what systematic error there may be for the two sensors. In order to efficiently reach the objective, the free space search circuit 46 uses a snake-based method having a single periphery k. The distance force from the sensor has a large influence and the internal force of the mobile robot R has a small result. In this case, the mobile robot R moves to a position where there is a balance between the forces sensed by the sensor information.

As shown in FIG. 27, the free space search circuit 46 is provided with a Cartesian coordinate conversion circuit 601, an external force calculation circuit 602, a robot stop position calculation circuit 603, an internal force calculation circuit 604, a new position calculation circuit 605 and a polar coordinate conversion circuit 606.

The Cartesian coordinate conversion circuit 601 inputs sonar distance measurement data dj (j=0, 1, , , n) from each of the sensors, converts them into values of Cartesian coordinates, and outputs that converted data $Sj = (xsj, ysj)$.

More specifically, calculation processing is performed for $$xj = dj \cos\theta j$$

$$yj = dj \sin\theta j \quad (22).$$

Moreover, the suffix j corresponds to all of the sonar sensors.

The external force calculation circuit 602 inputs the current value $vi$ and the prior value $vi - 1$ for the robot position data from the motion sensor 113, and the Cartesian coordinate calculation value Sj, and uses these as the basis for the calculation of the external force in "Snakes" described above (and displayed with an upwards arrow to the right of the absolute value, that is, when the absolute value is "f", the display is for "f ↑ ") and these results are then output.

More specifically, first, the external force $fij \uparrow$ at the i-th robot position is calculated from equation (20) using the j-th sonar.

In addition, $Sj \uparrow$ is expressed as $Sj \uparrow [xsj, ysj]$ and is the Cartesian coordinate value of the j-th sonar measurement value. Furthermore, the $d_{threshold}$ is a threshold distance for detection of a close obstacle and Kj is a spring constant.

Then, the determined $fij \uparrow$ are totalled and the total force $fi \uparrow$ is obtained by $$fi \uparrow = \sum_{j=0}^{n} fij \uparrow. \quad (23)$$

Here, n is the number of sonar sensors.

The robot stop position calculation circuit 603 inputs the current position data and the position data for one or two time durations before for the mobile robot R and calculates the position $vi^+ = (xi^+, yi^+)$ for making the path of the mobile robot R smooth.

$$xi^+ = 2xi - 1 - xi - 2 - 2(yi - 1 - yi - 2) \tan(\Delta\theta/2)$$

$$Yi^+ = 2yi - 1 - yi - 2 - 2(xi - 1 - xi - 2) \tan(\Delta\theta/2) \quad (24)$$

Here, each of the variables are shown in FIG. 33. More specifically, $(yi-1-yi-2) = vi-2$, $(xi-1-yi-2) = vi-1$, $(xi^+, yi^+) = vi^+$.

Figure 34:
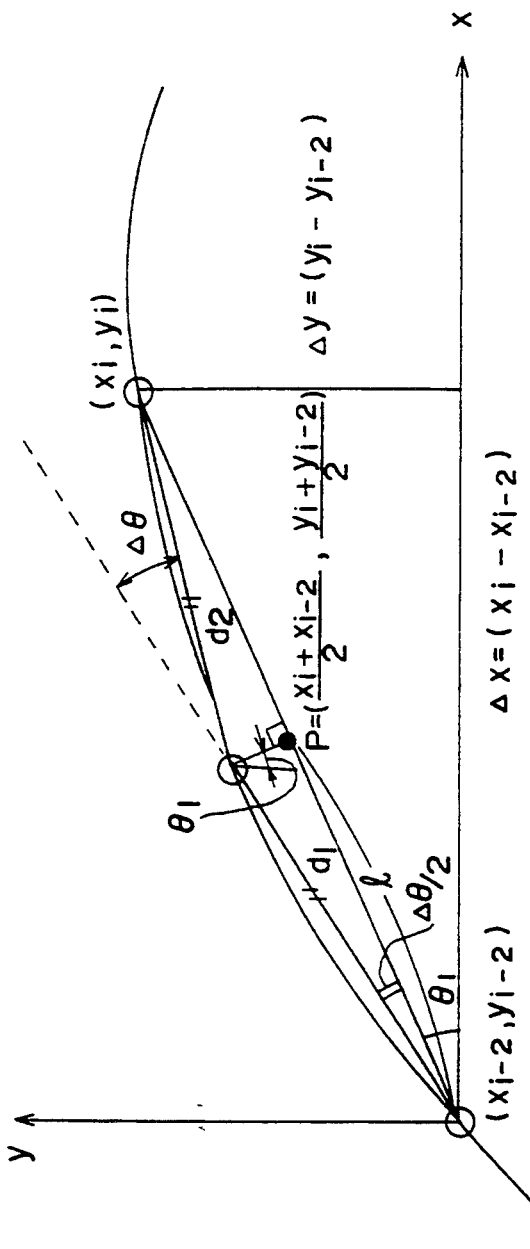
FIG. 34 is a geometric line diagram describing the guidance of the equation shown in FIG. 33.

As shown in FIG. 34, in the related equation (24), this is based on the principle that when the two arcs linking $vi-2$ and $vi-1$, and $vi-1$ and $vi^+$ are equal, the curve linking $vi-2$ and $vi-1$, and $vi^+$ is smooth.

According to the method of triangles, $$1 = (\Delta x/2)/\cos\theta 1 = (\Delta y/2)/\sin\theta 1$$

and therefore, $$xi - 1 = ((xi + xi - 2)/2) + 1 \tan(\Delta\theta/2) \sin$$
$$\theta 1 = ((xi + xi - 2)/2) + (\Delta y/2) \tan(\Delta\theta/2) \quad (25)$$

In the same manner, $$yi - 1 = ((yi + yi - 2)/2) + 1 \tan(\Delta\theta/2) \sin$$
$$\Delta 1 = ((yi + yi - 2)/2) + (\Delta x/2) \tan(\Delta\theta/2) \quad (26)$$

The internal force calculation circuit 604 inputs the robot position data $vi$, $vi-1$ and $vi^+$ and this data is used as the basis for the performance of a calculation indicated by equation (19) for "Snakes" and for determining the internal forces fc and fs.

The new position calculation circuit 605 uses the output of the internal force calculation circuit 604 and the external force calculation circuit 602 as the basis for using the "Snakes" of equation (21) to determine the new position $vi+1$ of the mobile robot R.

The polar coordinate conversion circuit 606 calculates the speed and direction of movement of the mobile robot R from the output of the new position calculation circuit 605.

$$speed = (xi^2 + yi^2)^{\frac{1}{2}}$$

$$direction = \tan^{-1}(yi/xi) \quad (27)$$

Here, as described above, (xi, yi) express the current position of the mobile robot R in Cartesian coordinates.

In the above manner, the free space search circuit 46 calculates the speed and the direction of movement of the mobile robot R from the robot position data and the sonar data, and outputs the results as an operation command.

Figure 39:
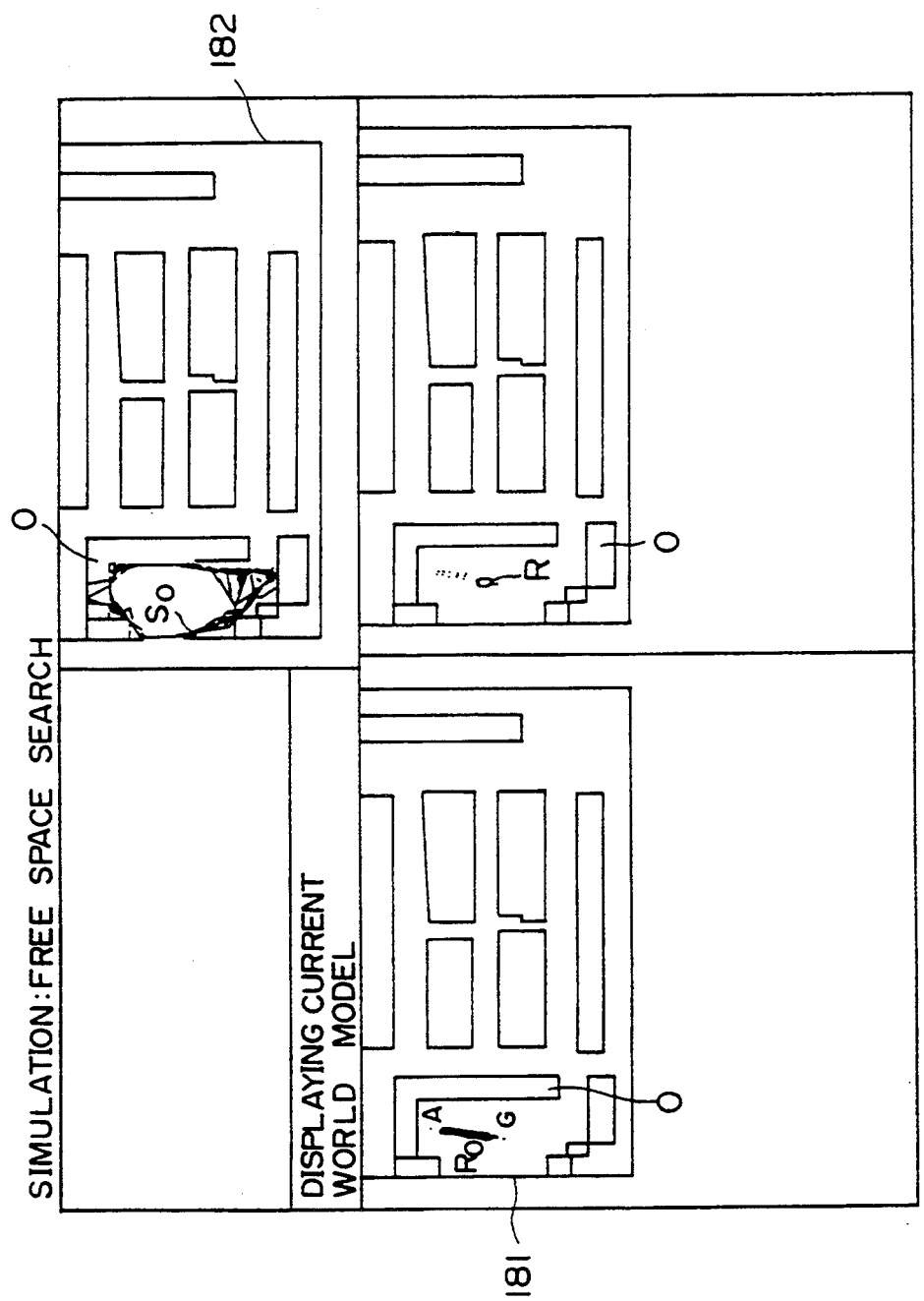
FIG. 39 is a view showing a simulation of free space search in a running control system of a fourth embodiment.

The numeral 181 in FIG. 39 shows the track $R_0$ of the mobile robot R due to the free space search using a simulator. This simulator calculates the pseudo sonar data by a light tracking algorithm. The results show that the free space search moves from the initial position A to a point G which is safe and which has not obstacles. 182 shows the ultrasonic wave scan track $S_0$ generated as the results when the free space search directs the mobile robot R towards the point G.

The obstacle avoidance circuit 45 removes the systematic error in the "Snakes" theory. In order to avoid obstacles, when there is a dangerous object close to the mobile robot R, the safety of the mobile robot R is verified through the use of touch sensors if necessary. After the system error has been removed, the obstacle avoidance circuit 45 uses only the distance measurement value of a plural number of sensor sets and which has been reflected from a close obstacle. The reason for this is that the safety of the robot is guaranteed for larger distance measurement values than those indicated. In order to avoid an obstacle, the force of the distance from a close obstacle is used as the reaction of the robot. Moreover, the force of the distance in the original snake-based motion is opposite in the system of the present invention since it acts as an attraction force. This is to say that the force of the distance is inversely proportional to the distance measurement value. Put another way, the reaction becomes larger for the closer the obstacle.

Figure 28:
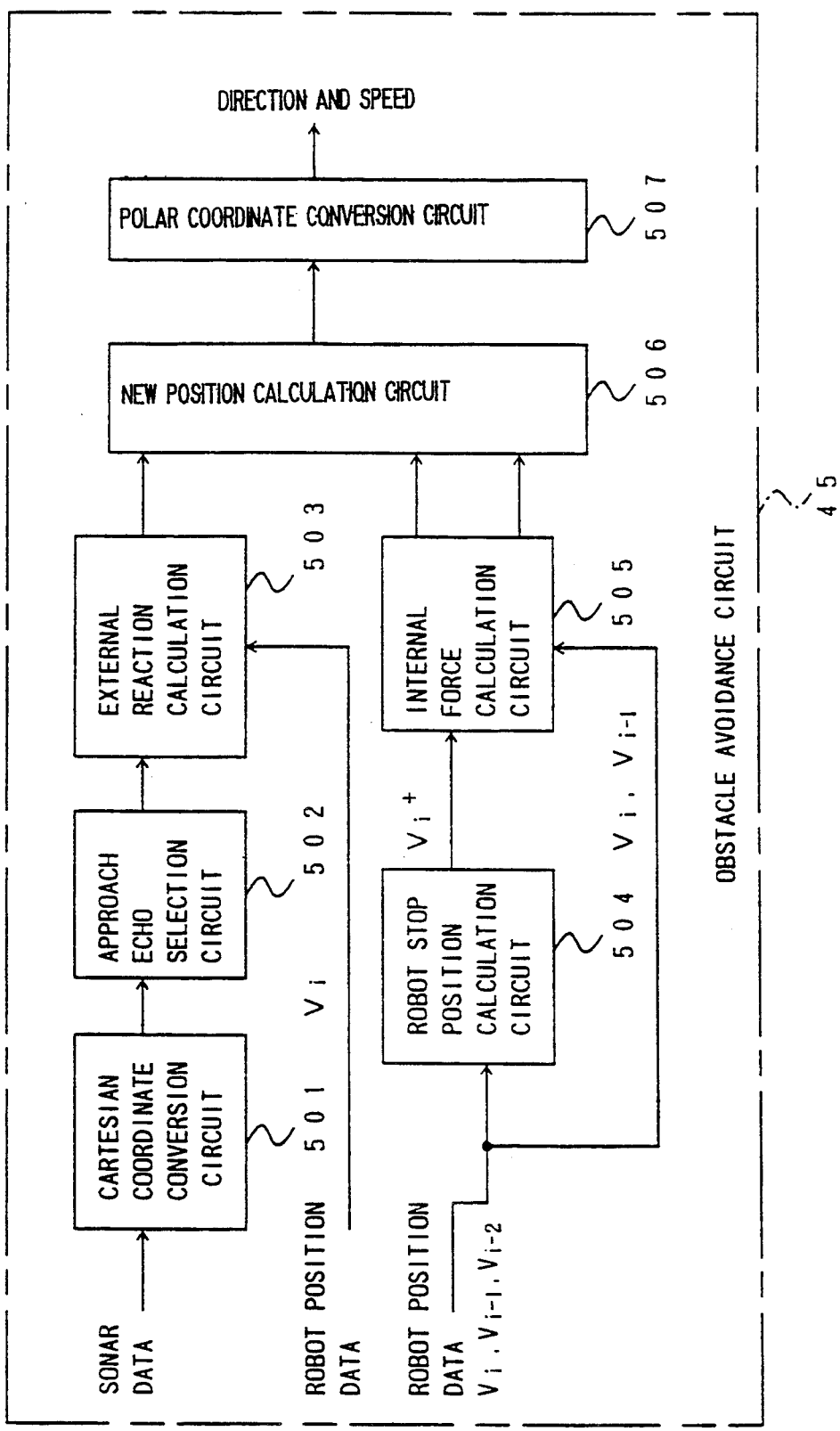
FIG. 28 is a conceptual view for describing the basic principle of each of the obstacle avoidance circuits in a running control system of a fourth embodiment.

As shown in FIG. 28, the obstacle avoidance circuit 45 is provided with a Cartesian coordinate conversion portion 501, an approach echo selection circuit 502, an external reaction calculation circuit 503, a robot stop position calculation circuit 504, an internal force calculation circuit 505, a new position calculation circuit 506 and a polar coordinate conversion circuit 507.

In the same manner as described above, the approach echo selection circuit 502 selects and outputs only the close distance data that has a certain distance as the boundary, from the many distance data which are input after conversion of the input sonar data into Cartesian coordinates by the Cartesian coordinate conversion portion 501. Then, in the external reaction calculation circuit 503, the reaction is determined by the following equation using only the distance data which is selected by the approach echo selection circuit 502.

$$fij\uparrow = -Kj(Sj\uparrow - vi\uparrow); \quad \text{when } |dj| \leq d_{threshold} \quad (28)$$
$$fij\uparrow = 0; \quad \text{when } |dj| \geq d_{threshold}$$

Here, $fij\uparrow$ is expressed as $fij\uparrow = [fxij, fyij]$

In addition, the robot stop position $vi+$ is calculated in the robot stop position calculation circuit 504 using equation (24) and those results are used as the basis for calculation using equation (19) in internal force calculation circuit 505.

When the external force and the internal force are calculated in this manner, the new position $vi+1$ is calculated in the new position calculation circuit 506 using equation (21), and the speed and the direction of movement of the mobile robot R is calculated in the polar coordinate conversion circuit 507 using equation (27).

Figure 35:
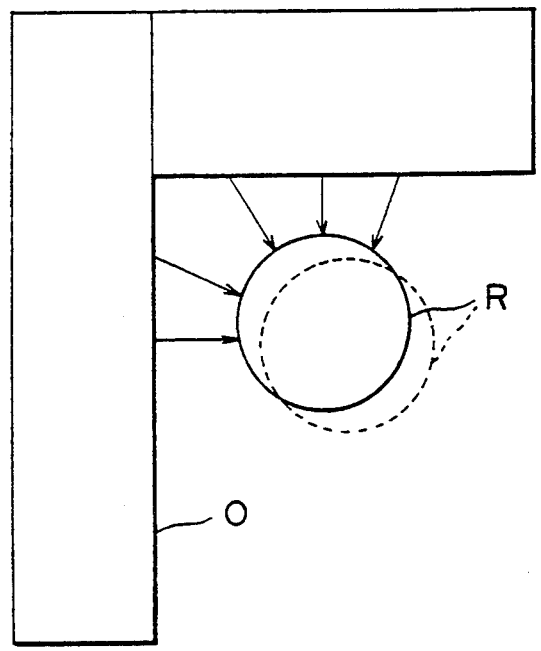
FIG. 35 is a view describing the principle of obstacle avoidance in the running control system of a fourth embodiment.

By performing these calculations, the mobile robot R is moved to a new position shown by the broken line, by the reaction indicated by the arrow in FIG. 35.

Figure 40:
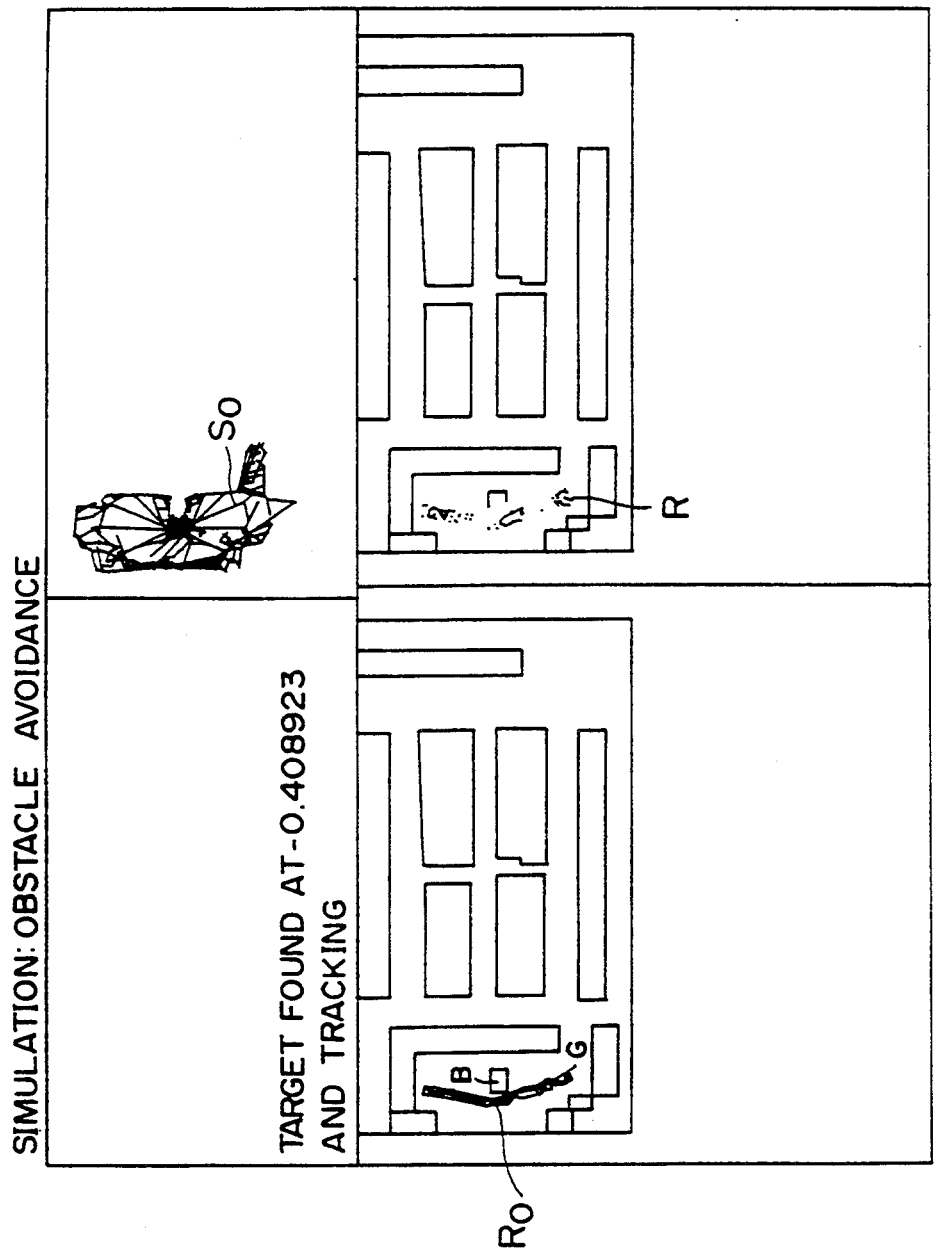
FIG. 40 is a view showing a simulation of obstacle avoidance in a running control system of a fourth embodiment.

FIG. 40 shows the test results of obstacle avoidance using a simulator. The mobile robot R is commanded so as to move to the objective point G. At the position B before the mobile robot R reaches this objective point G, there is a stationary obstacle but this is avoided by obstacle avoidance action.

Figure 36:
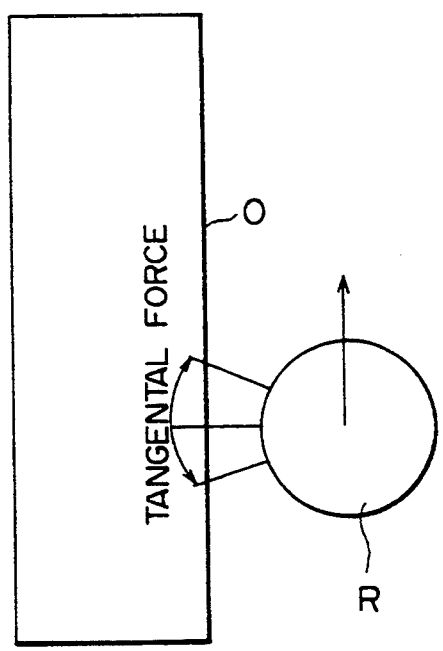
FIG. 36 is a view describing the principle of obstacle circumference follow in a running control system of a fourth embodiment.

The obstacle boundary follow circuit 44 uses the same algorithm as the obstacle avoidance circuit 45. When there is free space search and obstacle avoidance, the force of the distance from close obstacles is either one of attraction or one of repulsion. In the obstacle boundary follow, the distance measurement value for from a close obstacle is used for the calculation of the force of the direction of the contact line. FIG. 36 shows one example of an algorithm for this obstacle boundary follow. The mobile robot R advances only by the force of this tangent.

Here, for as long as a favorable distance measurement value is obtained without systematic error such as that due to specular reflections or the like, the mobile robot R always moves along the direction of the tangent of a close obstacle and so there is never any collision with an obstacle. The mobile robot R maintains a minimum distance measurement value in for the sonar sensors at each position so as to remove erroneous distance measurement values due to specular reflections.

Figure 29:
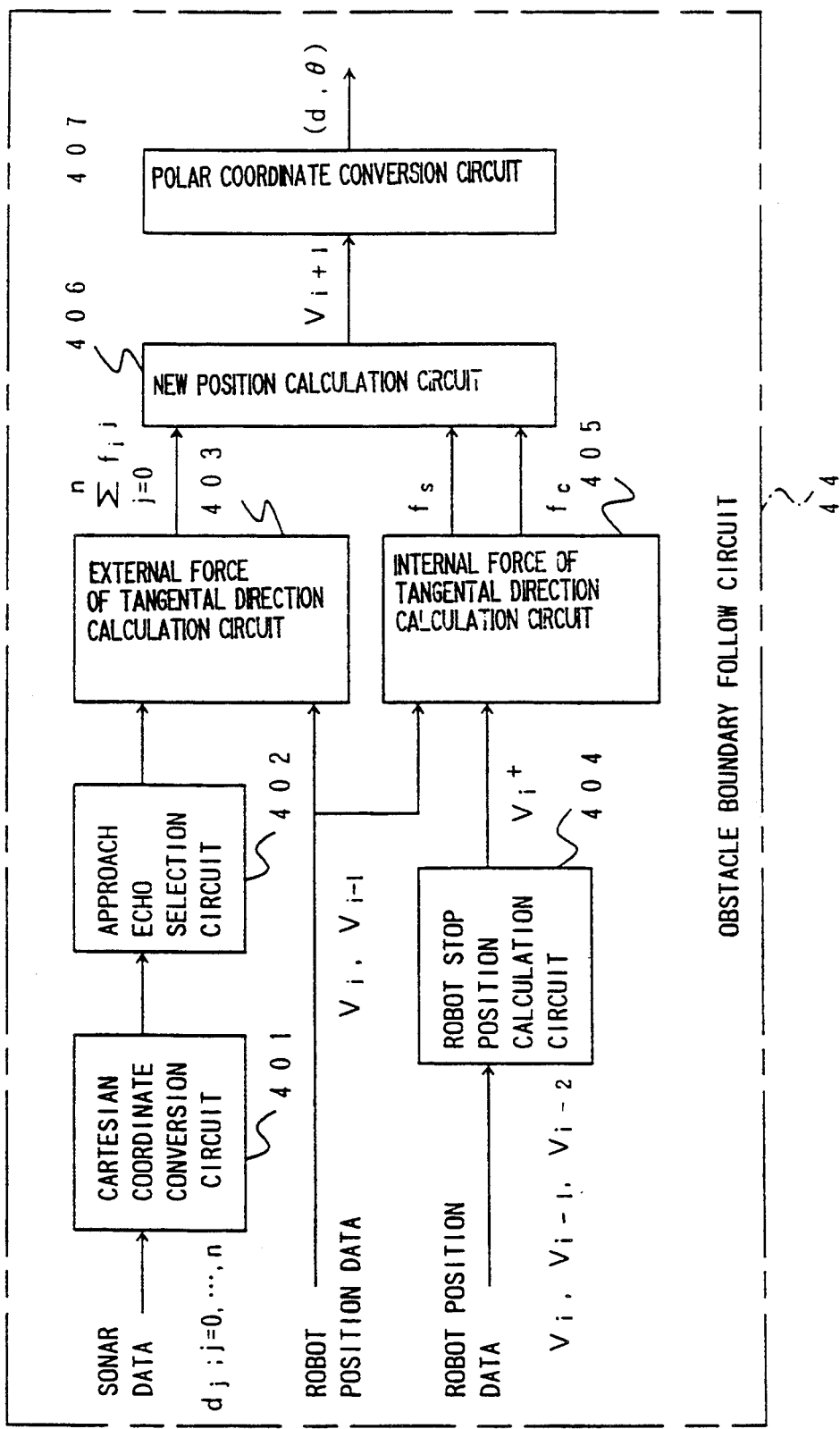
FIG. 29 is a block diagram showing the obstacle avoidance circuit in a running control system of a fourth embodiment.

When compared to the obstacle avoidance circuit 45 shown in FIG. 28, the obstacle boundary follow circuit 44 shown in FIG. 29 differs in that it is provided with a tangent direction external force calculation circuit 503 instead of the reaction external force calculation circuit, and comprises a Cartesian coordinate conversion circuit 401, an approach echo selection circuit 402, a tangent direction external force calculation circuit 403, a robot stop position calculation circuit 404, an internal force calculation circuit 405, a current position calculation circuit 406, and a polar coordinate conversion circuit 407.

The Cartesian coordinate conversion circuit 401 converts the input sonar data into Cartesian coordinates in accordance with equation (22), and in the approach echo selection circuit 402, those converted values are selected and output. The tangent direction external force calculation circuit 403 uses the distance data which has been selected and output in the approach echo selection circuit 402 to determine the external force $fi\uparrow$ in the direction of the tangent.

More specifically, first $$fij\uparrow = -Kj(Sj\uparrow - Sj-1\uparrow); \quad \text{when } |dj| \leq d_{threshold} \quad (29)$$
$$fij\uparrow = 0; \quad \text{when } |dj| \geq d_{threshold}$$

Here, $fij\uparrow = [fxij, fyij]$ is the force in the direction of the tangent due to the j-th sonar at the i-th robot position, $Sj\uparrow = [xsj, ysj]$ is the Cartesian coordinate values of the j-th sonar measurement value $dj$, $d_{threshold}$ is the threshold distance for confirmation of an approaching obstacle, and $Kj$ is a spring constant.

Then, all of these are totalled.

$$fi\uparrow = \sum_{j=0}^{n} fij\uparrow \quad (30)$$

Here, n is the number of sonar sensors.

In this manner, the external force in the direction of the tangent is determined on the one hand, there is the calculation of the equation (24) in the robot stop position calculation circuit 404 and after this the calculation of the internal force in the internal force calculation circuit 405 using equation (21).

When the external force and the internal force are calculated in this manner, the new position $vi+1$ is determined by equation (21) in the current position calculation circuit 406 and the polar coordinate conversion circuit 407 calculates the speed and the direction of the movement of the robot R using equation (28).

Figure 41:
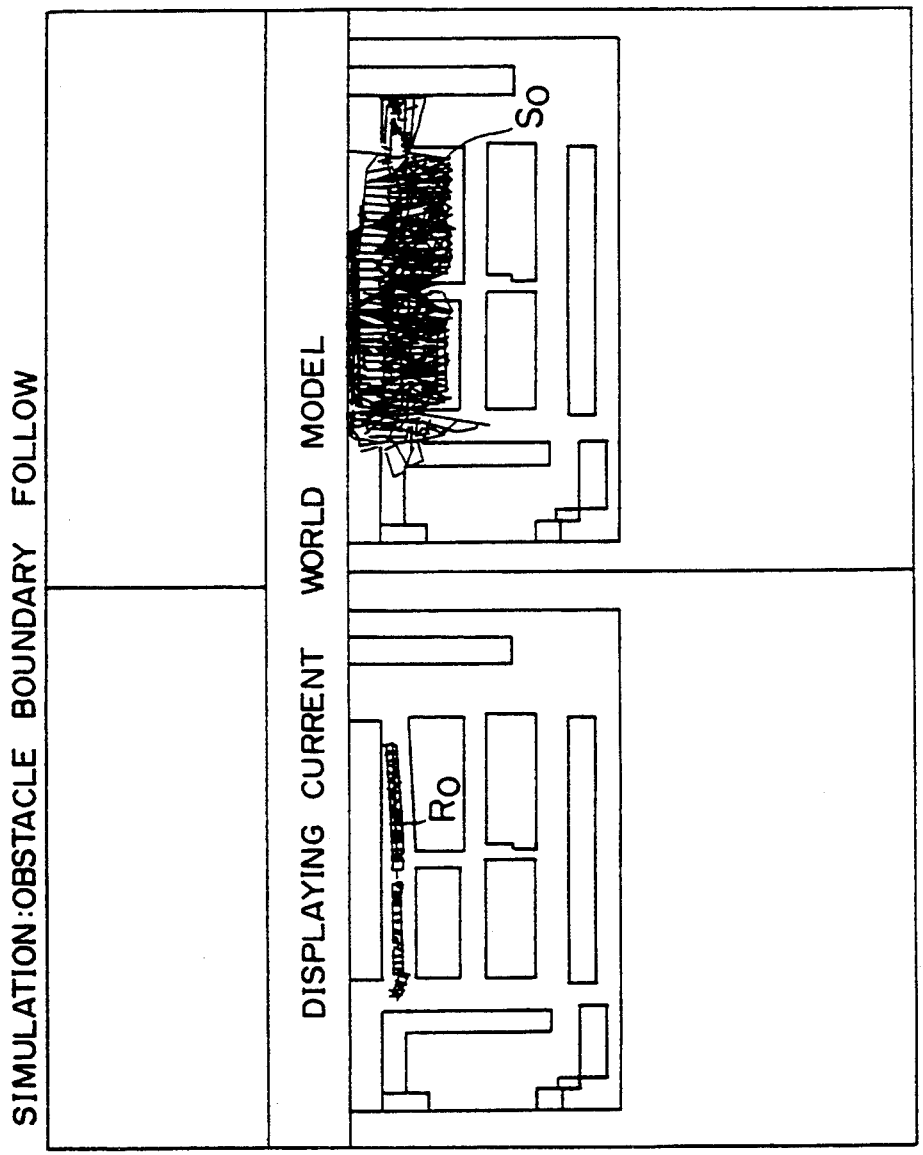
FIG. 41 is a view showing a simulation of obstacle boundary follow in a running control system of a fourth embodiment.
Figure 42:
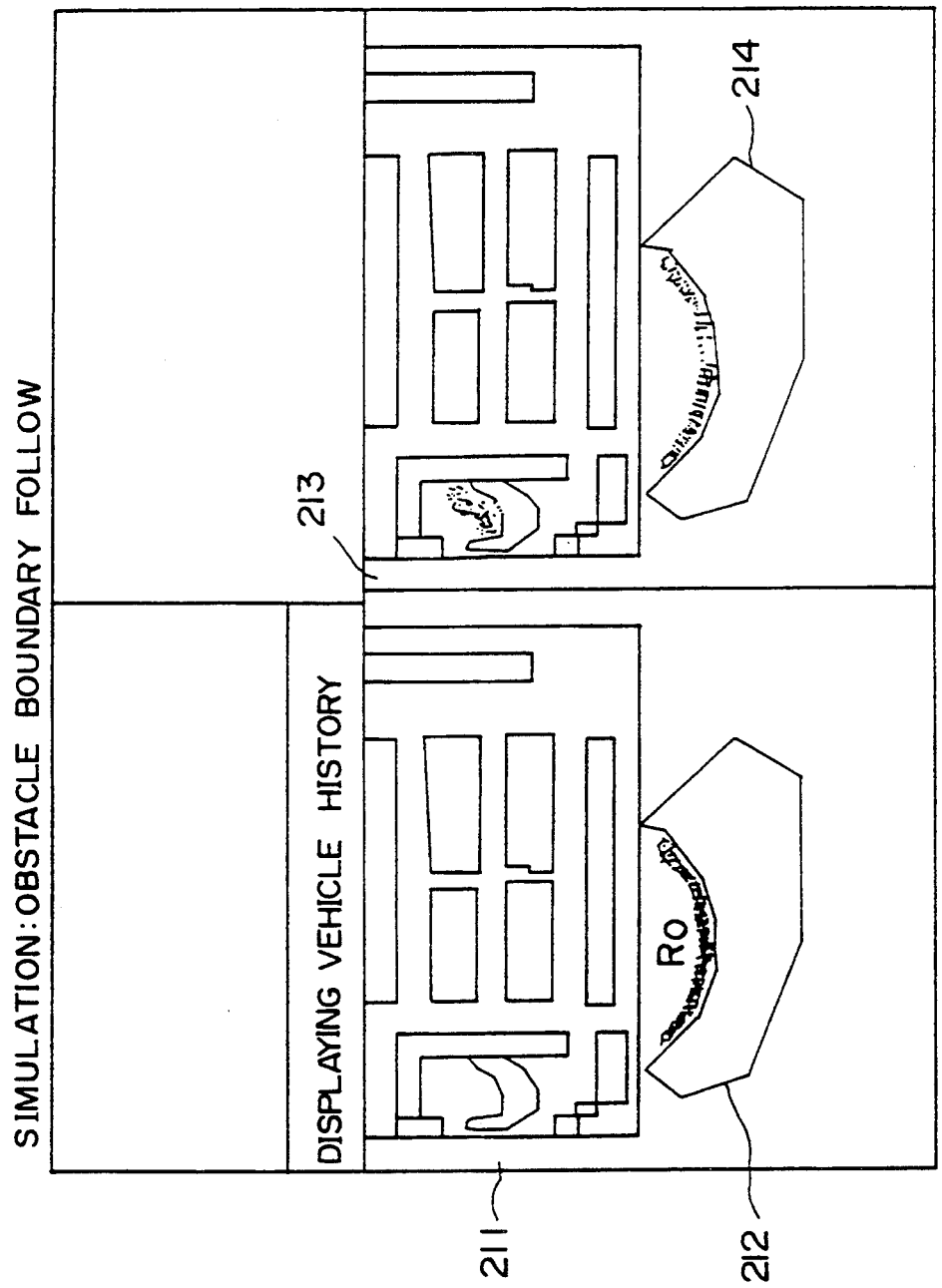
FIG. 42 is a view showing a simulation of obstacle boundary follow in a running control system of a fourth embodiment.

FIG. 41 shows the test results for when there is obstacle boundary follow of a straight wall. FIG. 42 shows the same test results for a curved wall. As can be confirmed by these test results, it is possible for the mobile robot R to track obstacles having any arbitrary shape. Moreover, in FIG. 42, for the status shown by the numerals 211 and 213, the display is small and difficult to observe and so the main portions are magnified and shown by the numerals 212 and 214 for the convenience of the operator.

The open space search circuit 43 is for the discovery of an exit of a room by the use of only forced return behavior and without the use of a complex algorithm or sensor system. Two algorithms are used in the open space search. More specifically, one is used for obstacle boundary following behavior and the other is used for free space search behavior.

The open space search will be described on the basis of the obstacle boundary follow. It is assumed that a person enters a dark room and can feel around him but cannot see anything. Most persons will attempt to find the closest wall and then feel along it to find a door. The basic concept of the open space search can be described in this manner.

Figure 43:
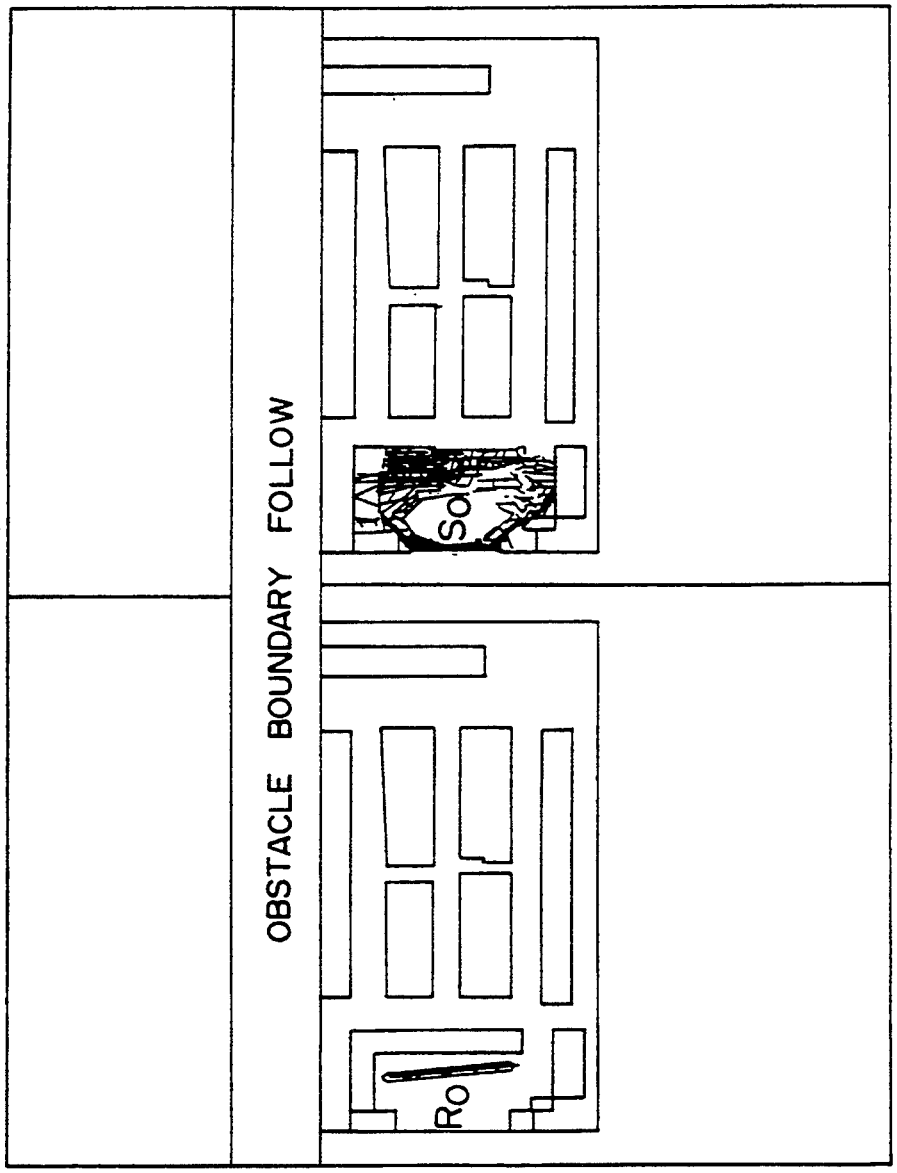
FIG. 43 is a view showing a simulation of empty space search by obstacle boundary follow in a running control system of a fourth embodiment.
Figure 44:
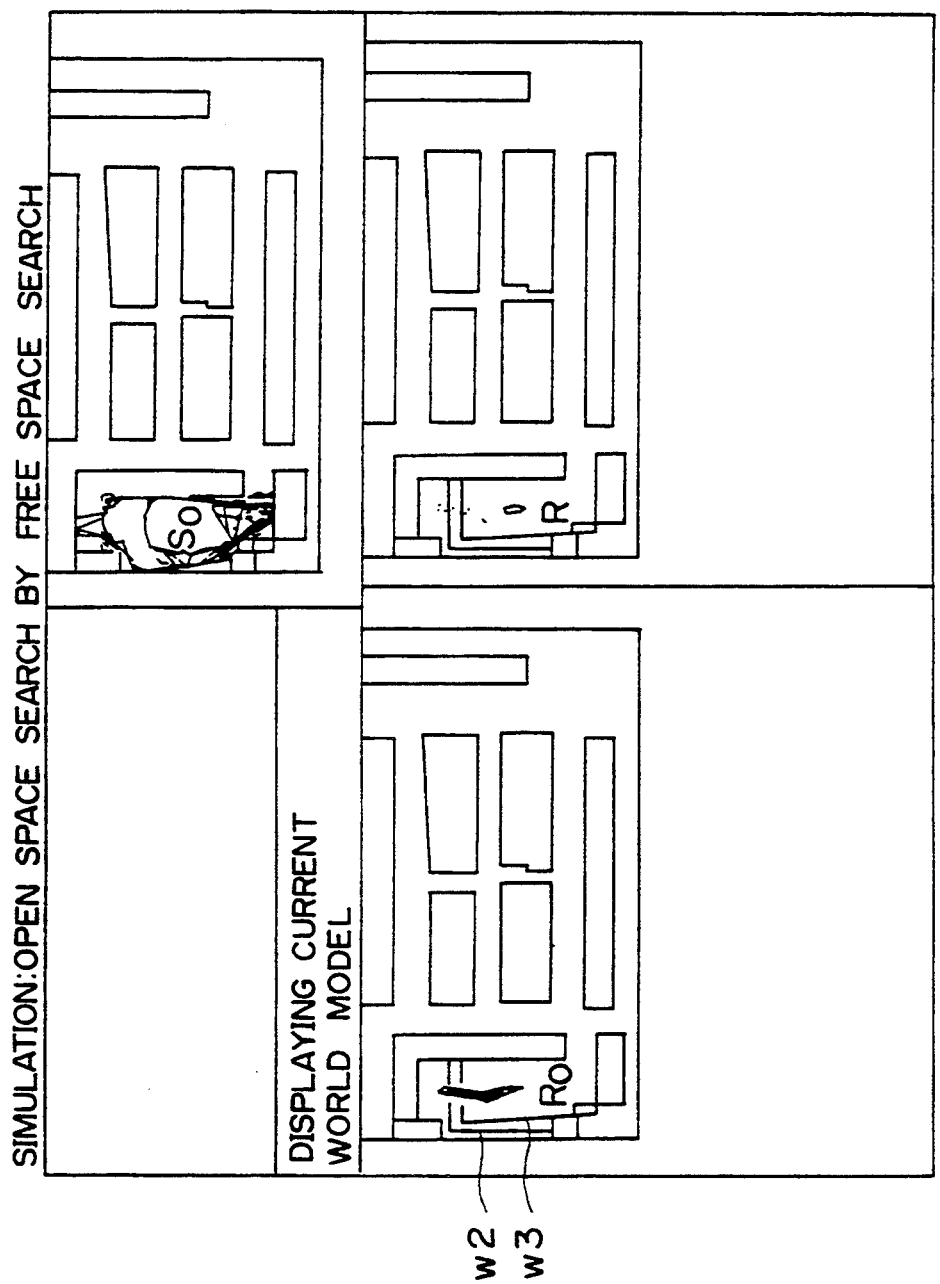
FIGS. 44 through 49 are views showing a simulation of free space search by obstacle boundary follow in a running control system of a fourth embodiment.
Figure 45:
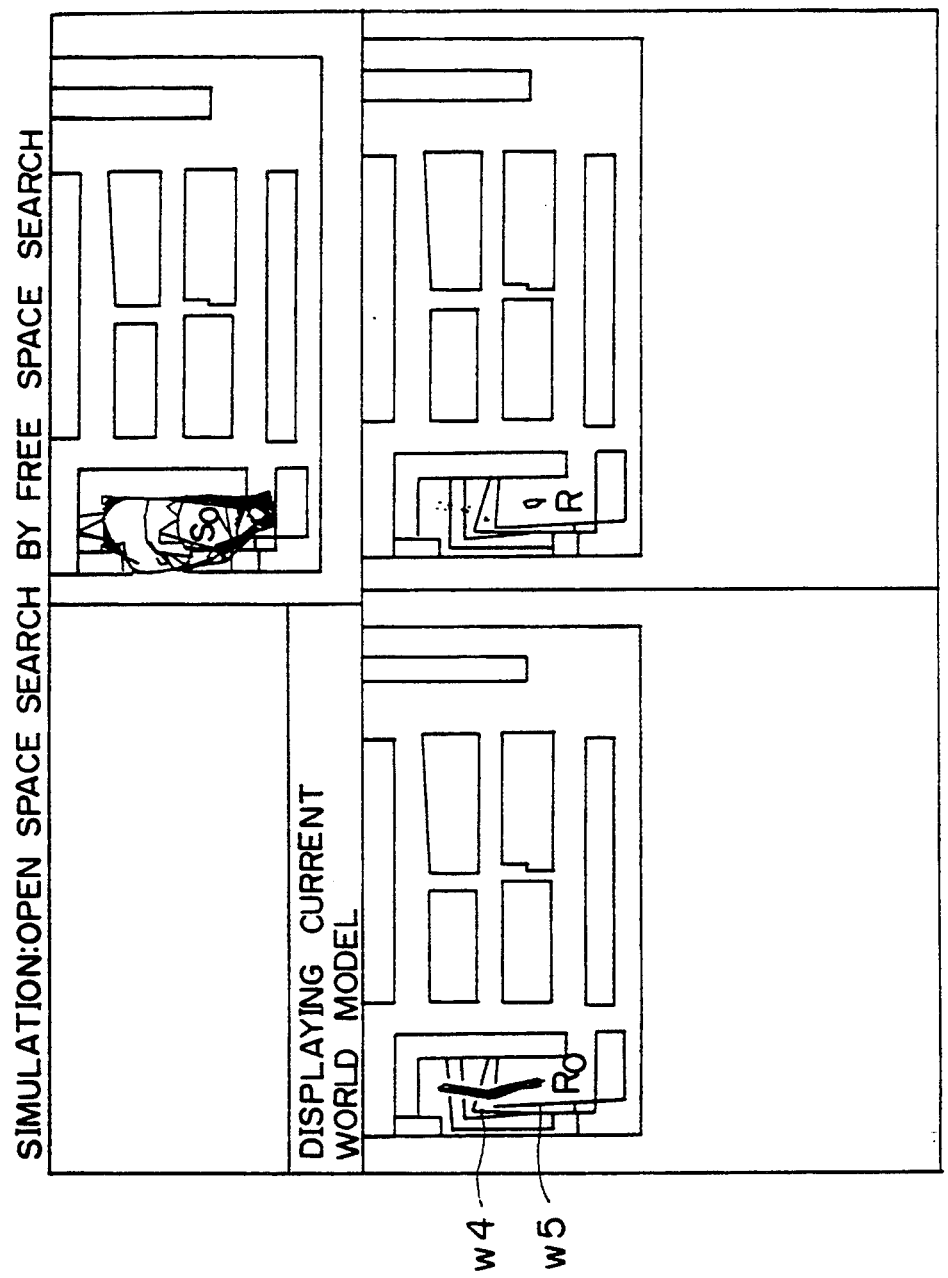
Figure 46:
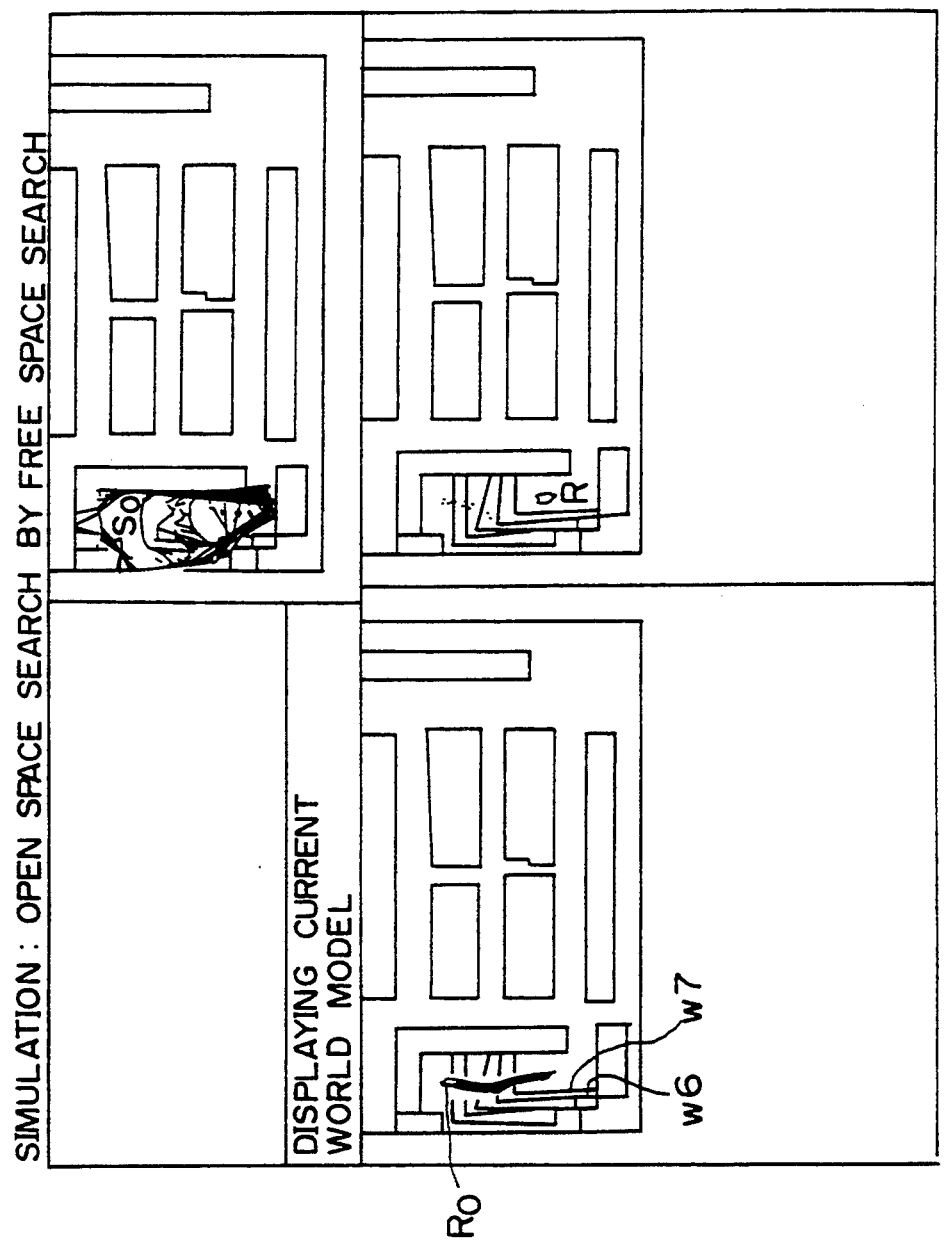
Figure 47:
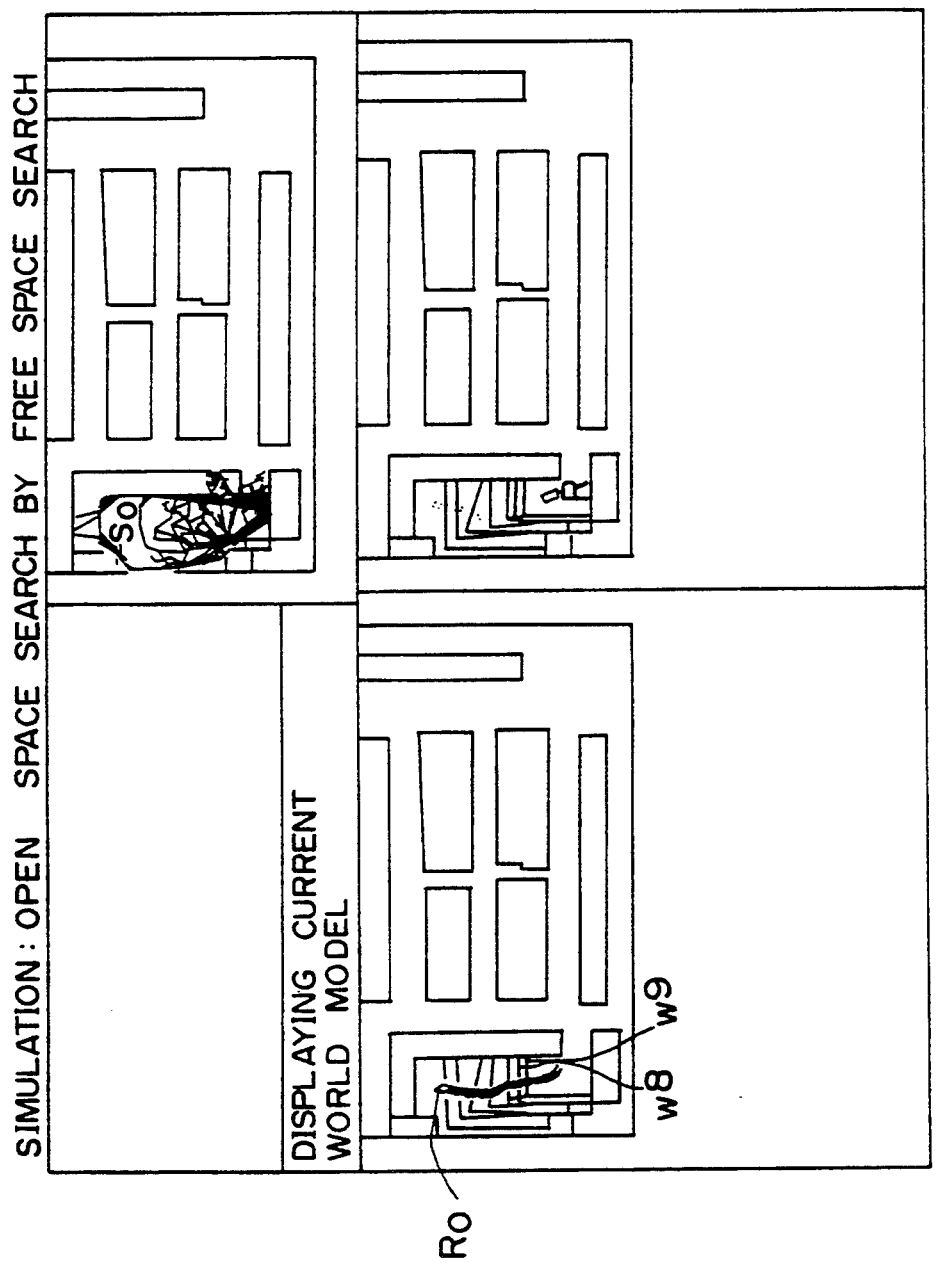
Figure 48:
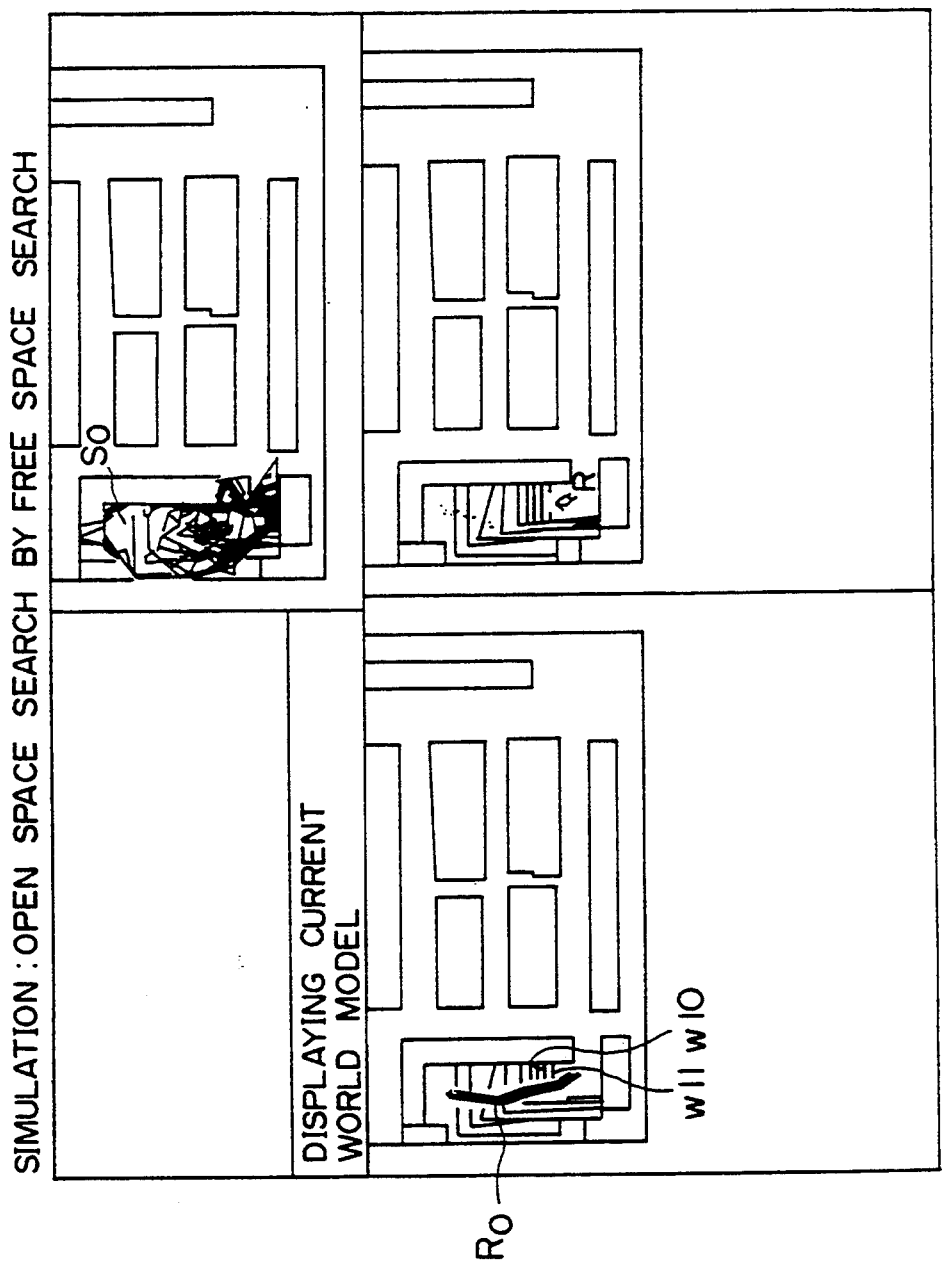
Figure 49:
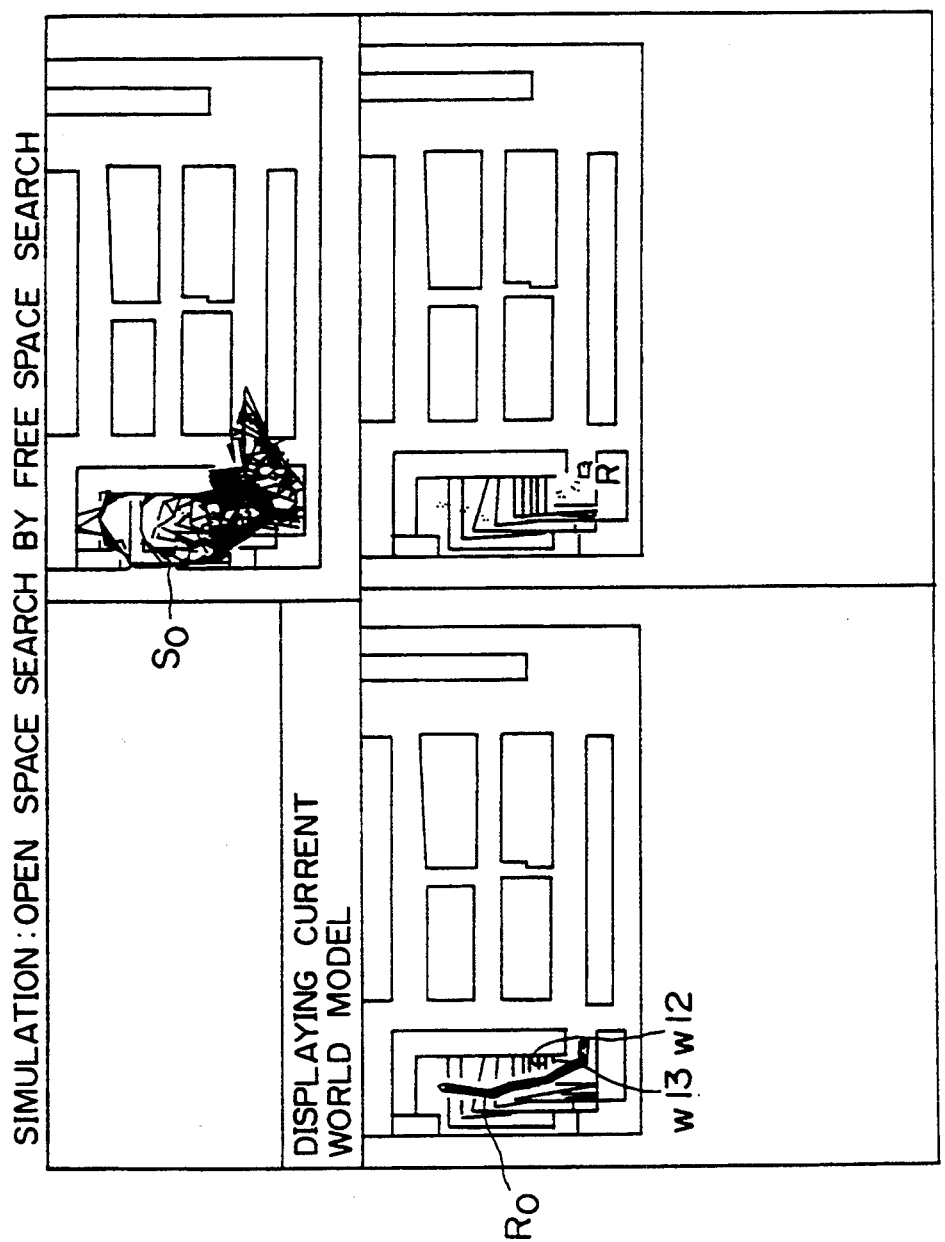

More specifically, the mobile robot R first discovers the closest obstacle and then uses obstacle boundary follow to track this. When the mobile robot R fails in the tracking of that obstacle, the mobile robot R can assume that it has arrived at one open space. For example, FIG. 43 shows the test results of open space search on the basis of this algorithm. At position B, the mobile robot R fails in the obstacle boundary following and stops. When the periphery of the mobile robot R is simple, this method functions favorably. However, this algorithm has a high possibility of failure when there are many complex stationary obstacles or when there are moving obstacles.

Open space search based on free space search, that is, open space search based on obstacle boundary following has not the power to sufficiently respond to interior environments which are complex and moving and so a new open space search activity using free space search is used to eliminate this problem.

Figure 37:
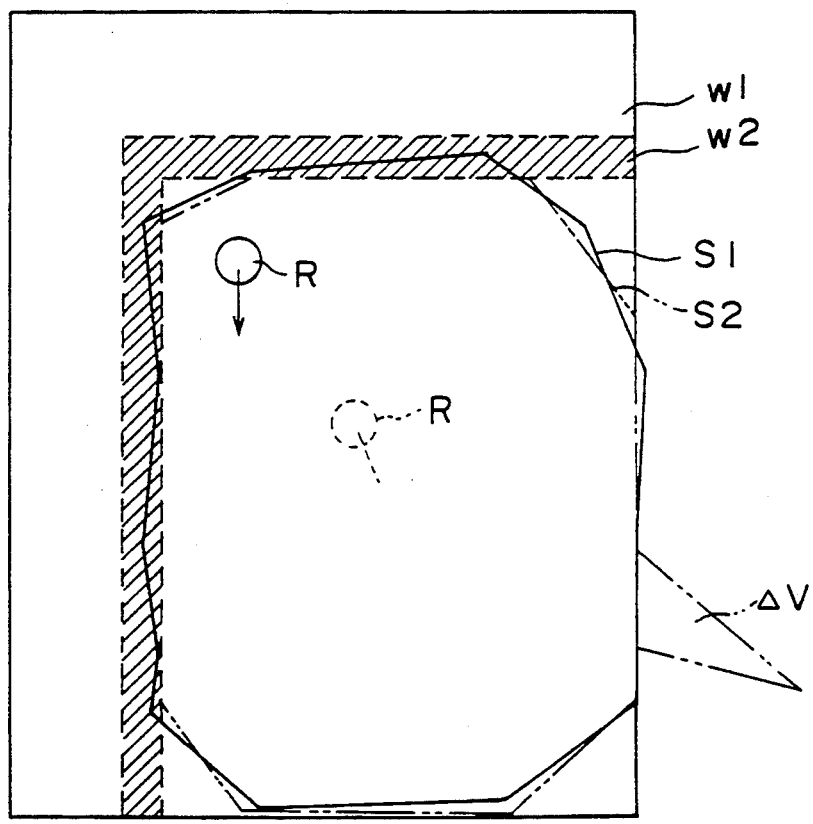
FIG. 37 is a view describing the principle of empty space search in free space search in a running control system of a fourth embodiment.

FIG. 37 shows the principle of this algorithm. More specifically,

ST21: First, the mobile robot R performs free space search to position itself in the center of the room.

ST22: In FIG. 37, it is assumed that the right-angled wall displayed as the partition wall $\omega 1$ and indicated by the dotted line is immediately behind the mobile robot R, and that the volume Vi which is surrounded by the current sonar measurement values is calculated (the value of the region which is surrounded by the solid line s1). In order to eliminate the rough resolution portion of the sonar data, the mobile robot R rotates itself 30° and at each 5° position takes one of a total of 18 ultrasonic wave search measurement values.

ST23: Free space search is used to calculate the volume (Vi+1) at the new position (the value of the region surrounded by the broken line s2).

ST24: The change in the volume is calculated. $\Delta V = Vi = 1 - Vi$ (For example, the triangle which has the shadow in FIG. 37.)

If $\|\Delta V\| \geq Vth$, then there is an open space. The position of the partition wall corresponding to the open space changes as shown by w and steps ST22 through ST24 are repeated.

If there is no difference, then there is either no open space or it cannot be seen and in either case there is return to repeating steps ST22 through ST24.

Here, Vth is the threshold value with respect to the change in volume.

FIG. 30 shows a circuit for the realization of this algorithm, and is provided with a synthetic sonar generation circuit 301, a Cartesian coordinate conversion circuit 302, an external force calculation circuit 303, a robot stop position calculation circuit 304, an internal force calculation circuit 305, a new position calculation circuit 306, a polar coordinate conversion circuit 307 and a sonar amplitude change detection circuit 308.

The input sonar data dj is incremented in the composite sonar data generation circuit 301, and is made the increment sonar data Dj. This sonar data Dj is converted into Cartesian coordinate values in the Cartesian coordinate value conversion circuit 302. The external force calculation circuit 303 determines the reaction force fi or the force in the tangential direction using equation (29) in cases when there is obstacle boundary follow and by using equation (28) in the case when there is free space search operation.

On the other hand, the robot stop position calculation circuit 304 calculates the position $vi^+$ on the basis of the equation (23) and the internal force calculation circuit 305 determines the internal forces fc and fs by using equation (19).

Then, the new position calculation circuit 306 calculates the new position $vi^+$ on the basis of the equation (21) and the polar coordinate conversion circuit 307 calculates the values for the speed and the direction.

In addition to controlling this movement behavior, this open space search circuit 43 performs the detection of free space and performs comparison of the sonar data amplitude by the operation of the sonar amplitude change detection circuit 308.

FIGS. 44 through 49 shows test results for open space search on the basis of an algorithm such as that described above. The mobile robot R finds the free space EX by changing the position so that the partition wall is at positions $\omega 1, \omega 2, \ldots \omega 13$.

The above has been a description of embodiments of the present invention but the present invention is not limited to the embodiments described above as for example, it is possible to have highly accurate behavior for all types of behavior when a 1-D laser scanner is used for taking the distance measurement values. It is also possible to use other types of sensors or a similar algorithm without departure from the scope or intentions of the present invention.

Further advantages and modifications will be evident to a person skilled in the art. Accordingly, the scope of the present invention is not limited to the description in the specification or the examples or drawings of representative apparatus, and many modifications are possible without departing from the scope of the present invention, as described in the claims.

What is claimed is:

1. A running control system at least including a mobile robot having a motion actuator and capable of running, and obstacle sense means provided on the robot for sensing obstacles existing in a predetermined area in which the robot is running, said system comprising:
- danger avoidance means for avoiding said mobile robot from a danger of said obstacles by detecting said danger of said obstacles on the basis of an output of said obstacle sense means and by outputting operation commands for an avoidance;
- safe region advance means for outputting operation commands for advancing said mobile robot for the safest region which is obtained for said mobile robot on the basis of said output of said obstacle sense means;
- interest region follow means for outputting operation commands for following said mobile robot toward an object within an interest region which is determined and includes an objective point to be reached and a moving object to be chased on the basis of said output of said obstacle sense means; and
- motion actuator control means for controlling running of said mobile robot after parallel receiving said operation commands outputted from said danger avoidance means, safe region advance means and interest region follow means to unitedly process said commands and to determine an control amount of said motion actuator provided in said mobile robot.

2. The running control system for said mobile robot according to claim 1, wherein said motion actuator control means comprises:
- an operation analysis circuit for analyzing each of said operation commands supplied from said danger avoidance means, safe region advance means and interest region follow means, thereby dividing operation commands with respect to a direction and operation commands with respect to a distance;
- a steering angle determining circuit for determining a moving direction of said mobile robot on the basis of said operation commands with respect to said direction divided by said operation analysis circuit; and
- a speed determining circuit for determining a running speed of said mobile robot on the basis of said operation commands with respect to said distance divided by said operation analysis circuit.

3. The running control system for said mobile robot according to claim 2, wherein said steering angle determining circuit comprises:
- a weighting memory for storing a plurality of weighting values which are set for correlatively weighting said operation commands to avoid a local-portion optimum condition when the mobile robot becomes in the local-portion optimum condition after analyzing an operation history of said mobile robot, and for outputting a weighting value corresponding to said operation commands with respect to said direction supplied from said operation analysis circuit;
- a plurality of multipliers for respectively multiplying said weighting value outputted from said weighting memory by said operation commands with respect to said direction outputted from said operation analysis circuit; and
- an adder obtaining a steering angle control amount by adding respective outputs of said plurality of multipliers.

4. The running control system for said mobile robot according to claim 1, wherein said safe region advance means comprises:
- an obstacle circumference follow portion for outputting operation commands for moving said mobile robot so as to follow a periphery of an obstacle; and
- an open space detection portion for outputting operation commands for moving said mobile robot in a direction in which there is open space; and wherein said obstacle circumference follow portion and open space detection portion mutually operates as failure notification means and auxiliary function means.

5. The running control system for said mobile robot according to claim 4, wherein said danger avoidance means comprises:
- touch detection means for detecting as to whether said mobile robot touches the other objects or not, and for outputting a stop command to said motion actuator control means when a touch is detected;
- approaching object detection means for outputting a stop command when the other object has entered into the proximity of said mobile robot;
- stationary object avoidance means for transmitting an avoidance operation command of said mobile robot responsive to said other objects to said motion actuator control means: and wherein
- when said stationary object avoidance means activates said obstacle circumference follow portion when said mobile fails avoidance operation, thereby causing said mobile robot to escape from a danger condition for a collision.

6. A running control system at least including a mobile robot having a driving actuator and capable of running, and obstacle sense means provided on the robot for sensing obstacles existing in a predetermined area in which the robot is running, said system comprising:
- imaging means for photographing an image in a running direction of said mobile robot for sensing obstacles of a robot advancing direction as a part of said obstacle sense means;
- observed object pursuit means for pursuing an object to be observed in the image photographed by said imaging means;
- observed object selection means for selecting two observed objects near said mobile robot after judging front and rear relationship on the basis of a motion of said observed object in said image when there are a plurality of object to be observed in the image;
- running control amount calculation means for calculating a running amount in the manner that an advancing direction of said mobile robot is to be center between said two observed objects on the basis of the motion of said observed objects in the image; and
- running control means for controlling running of said mobile robot on the basis of said running control amount calculated by said running control amount calculation means.

7. The running control means for said mobile robot according to claim 6, wherein:
- said running control amount calculation means obtains a steering control angle which is formed by two directions of an advancing direction of said mobile robot and a direction from a present position of said mobile robot to a center position of said two observed objects on the basis of a motion on the image of said two observed objects when said mobile robot straightly advances a predetermined distance, and calculate said running control amount according to said steering control angle in the manner that said mobile robot passes in the center position through said two observed objects.

8. A running control system at least including a mobile robot having a driving actuator and capable of running, and obstacle sense means provided on the robot for sensing obstacles existing in a predetermined area in which the robot is running, said control system comprising:
   a complex sensor system having a plurality of sensor sets including a plurality of kinds of non-touch sensors and touch sensors which are mounted on said mobile robot, and for outputting sensor data from said plurality of sensor sets as control data candidates;
   a system error removing circuit for outputting as control data optimum sensor data which are formed by removing system errors from said sensor data from said plurality of sensor sets of said complex sensor system after an investigation;
   a mobile robot guidance system provided for a prediction of a position of said mobile robot by receiving said control data outputted from said system error removing means and by minimizing an internal energy in said mobile robot corresponding to a control content of said control data on the basis of a reference of a path smoothness and an external force by distance data from said complex sensor system, and including various operation calculation circuits for respectively performing an extraction of the safest running region of said mobile robot, an avoidance of a collision of said mobile robot to said obstacles, follow of said mobile robot along a boundary of a stationary obstacle, and an extraction of an open space for said mobile robot to be moved; and
   an operation determination circuit for selecting any of operation patterns of said mobile robot on the basis of various operation commands outputted from said various operation calculation circuits forming said mobile robot guidance system, and for outputting an operation command with respect to a selected operation pattern to a moving actuator driving controller of said mobile robot.

9. The running control system for said mobile robot according to claim 8, wherein said system error removing circuit comprises:
   first system error removing means for removing a system error of a sonar sensor included in said complex sensor system in the manner that a change of a read value as a measured value is calculated by rotating said sonar sensor or said mobile robot when any of sonars corresponds to a distance shorter than an effectively reflective distance, the shortest distance measurement value as sampled data is used when the change becomes larger than a random error of said sonar sensor, and an estimation with respect to a distance uses an average distance which is calculated by using entire effective sonar data;
   second system error removing means for ordinarily comparing distance values which are respectively obtained from said sonar data supplied from said sonar sensor to said first system error removing means and sensor data sensed by an infrared radiation sensor included in said complex sensor system, for using a read value of said infrared radiation sensor when both distance values are a disagreement, and for using a read value of said sonar sensor when a distance measurement value of said infrared radiation sensor is inferior, thereby removing said system error of said sonar sensor; and
   third system error removing means for removing said system error of said sonar sensor by using both of said sonar data and touch data detected by a touch sensor included in said complex sensor system when both of distance measurement values are inferior which are respectively, obtained from said sonar sensor and said infrared radiation sensor.

10. The running control system for said mobile robot according to claim 8, wherein
   said mobile robot guidance system comprises, as one of said various operation calculation circuits, a free space search circuit for extracting the safest running region for said mobile robot: and wherein
   said free space search circuit comprises a Cartesian coordinate conversion circuit for converting sonar distance measurement data from each of said sensors into coordinate data as values of Cartesian coordinates so as to output said coordinate circuit;
   an external force calculation circuit for calculating external force as a vector value in a "Snakes" theory on the basis of said coordinate data, a present value and an immediately previous value with respect to robot position data supplied from a motion sensor so as to output external force data;
   a robot stop position calculation circuit for calculating robot stop position data for smoothing a path of said mobile robot, in accordance with a principle that when three position data with respect to said present position, one time point previous position and two time points previous position are inputted and when two arcs respectively connecting any of two points in three positions are equal, a curve connecting said three positions is smooth;
   an internal force calculation circuit for calculating a first internal force (fs) for smoothly binding said mobile robot on the path, and a second internal force (fc) with respect to a stop obtained by a robot technology by multiplying respective parameters for controlling a smoothness and a motion characteristic, on the basis of said present position data of said mobile robot, said onetime point previous position data and said two time points previous position data;
   a new position calculation circuit for calculating a new position of said mobile robot on the basis of said external force as said vector value obtained by said external force calculation circuit and both of said internal force (fs, fc) obtained by said internal force calculation circuit so as to output new position data; and
   a polar coordinate conversion circuit for calculating a motion direction and speed of said mobile robot on the basis of said new position data calculated by said new position calculation circuit so as to output said direction and speed as said operation command.

11. The running control system for said mobile robot according to claim 8, wherein:

said mobile robot guidance system comprises, as one of said various operation calculation circuits, an obstacle avoidance circuit for guiding said mobile robot in the direction of avoiding said mobile robot from an obstacle in the manner of preventing a collision of said mobile robot and said obstacle: and wherein said obstacle avoidance circuit comprises a Cartesian coordinate conversion circuit for converting sonar distance measurement data from each of said sensors into coordinate data as values of Cartesian coordinates so as to output said coordinate data;

an approach echo selection circuit for selecting and outputting only close distance data being closer than a certain distance among said sonar distance measurement data supplied with a plurality of data;

an external reaction force calculation circuit for calculating external reaction as a vector value for avoiding said obstacle in accordance with a "Snakes" theory on the basis of said close distance data supplied from said approach echo selection circuit and said present position data as said vector value so as to output external reaction force data as a vector value;

a robot stop position calculation circuit for calculating robot stop position data for smoothing a path of said mobile robot, in accordance with a principle that when three position data with respect to said present position, one time point previous position and two time points previous position are inputted and when two arcs respectively connecting any of two points in three positions are equal, a curve connecting said three positions is smooth;

an internal force calculation circuit for calculating a first internal force (fs) for smoothly binding said mobile robot an the path, and a second internal force (fc) with respect to a stop obtained by a robot technology by multiplying respective parameters for controlling a smoothness and a motion characteristic, on the basis of said present position data of said mobile robot, said onetime point previous position-data and said two time points previous position data;

a new position calculation circuit for calculating a new position of said mobile robot on the basis of said external reaction force data as said vector value obtained by said external reaction force calculation circuit and both of said internal force (fs, fc) obtained by said internal force calculation circuit so as to output new position data; and a polar coordinate conversion circuit for calculating a motion direction and speed of said mobile robot on the basis of said new position data calculated by said new position calculation circuit so as to output said direction and speed as said operation command.

12. The running control system for said mobile robot according to claim 8, wherein:

said mobile robot guidance system comprises, as one of said various operation calculation circuits, an obstacle boundary follow circuit for following said mobile robot along a boundary of a stationary obstacle by using a force of the direction of the contact line which is calculated from said distance data reflected from an obstacle near said mobile robot: and wherein said obstacle boundary follow circuit comprises a Cartesian coordinate conversion circuit for converting sonar distance measurement data from each of said sensors into coordinate data as values of Cartesian coordinates so as to output said coordinate data;

an approach echo selection circuit for selecting and outputting only close distance data being closer than a certain distance among said sonar distance measurement data supplied with a plurality of data;

a contact line direction external force calculation circuit for calculating a contact line direction external force as it vector value in accordance with a "Snakes" theory on the basis of said close distance data supplied from said approach echo selection circuit and said present position data as said vector value so as to output contact line direction external force data as a vector value;

a robot stop position calculation circuit for calculating robot stop position data for smoothing a path of said mobile robot, in accordance with a principle that when three position data with respect to said present position, one time point previous position and two time points previous position are inputted and when two arcs respectively connecting any of two points in three positions are equal, a curve connecting said three positions is smooth;

an internal force calculation circuit for calculating a first internal force (fs) for smoothly binding said mobile robot on the path, and a second internal force (fc) with respect to a stop obtained by a robot technology by multiplying respective parameters for controlling a smoothness and a motion characteristic, on the basis of said present position data of said mobile robot, said onetime point previous position, data and said two time points previous position data;

a new position calculation circuit for calculating a new position of said mobile robot on the basis of said contact line direction external force data as said vector value obtained to said contact line direction external force calculation circuit and both of said internal force (fs, fc) obtained by said internal force calculation circuit so as to output new position data; and a polar coordinate conversion circuit for calculating a motion direction and speed of said mobile robot on the basis of said new position data calculated by said new position calculation circuit so as to output said direction and speed as said operation command.

13. The running control system for said mobile robot according to claim 8, wherein:

said mobile robot guidance system comprises, as one of said various operation calculation circuits, an open space search circuit for extracting an open space such as an open door and an exit of a blind lane: and wherein said open space search circuit comprises a composite sonar data generation circuit for generating increment sonar data by increasing a plurality of ultrasonic search measurement values which are taken in every specified rotation angle while said mobile robot rotates in a predetermined angle, in order to compensate a rough resolution of inputted sonar data;

a Cartesian coordinate conversion circuit for converting said increment sonar data from said composite sensor data generation circuit into coordinate data as values of Cartesian coordinates so as to output said coordinate circuit;

an external force calculation circuit for calculating external force as a vector value in a "Snakes" theory on the basis of said coordinate data and a present value of said mobile robot so as to output external force data;

a robot stop position calculation circuit for calculating robot stop position data for smoothing a path of said mobile robot, in accordance with a principle that when three position data with respect to said present position, one time point previous position and two time points previous position are inputted and when two arcs respectively connecting any of two points in three positions are equal, a curve connecting said three positions is smooth;

an internal force calculation circuit for calculating a first internal force (fs) for smoothly binding said mobile robot on the path, and a second internal force (fc) with respect to a stop obtained by a robot technology by multiplying respective parameters for controlling a smoothness and a motion characteristic, on the basis of said present position data of said mobile robot, said onetime point previous position data and said two time points previous position data;

a new position calculation circuit for calculating a new position of said mobile robot on the basis of said external force as said vector value obtained by said external force calculation circuit and both of said internal force (fs, fc) obtained by said internal force calculation circuit so as to output new position data;

a polar coordinate conversion circuit for calculating a motion direction and speed of said mobile robot on the basis of said new position data calculated by said new position calculation circuit so as to output said direction and speed as said operation command; and a sonar amplitude change detection circuit for detecting said open space by comparing said direction and speed as said operation command with an amplitude of said increment sonar data.

* * * * *